(12) United States Patent
Hebrink et al.

(10) Patent No.: US 9,561,629 B2
(45) Date of Patent: Feb. 7, 2017

(54) OPTICAL BODIES INCLUDING ROUGH STRIPPABLE BOUNDARY LAYERS AND ASYMMETRIC SURFACE STRUCTURES

(71) Applicant: 3M INNOVATIVE PROPERTIES COMPANY, St. Paul, MN (US)

(72) Inventors: Timothy J. Hebrink, Scandia, MN (US); Carl A. Stover, St. Paul, MN (US); Martin E. Denker, Vadnais Heights, MN (US); Jeffery N. Jackson, Woodbury, MN (US); Kristopher J. Derks, Woodbury, MN (US); Michael F. Weber, Shoreview, MN (US); Anna A. Wetzels, Bergeijk (NL); Joan M. Strobel, Maplewood, MN (US); Barry S. Rosell, Lake Elmo, MN (US); John P. Purcell, Oakdale, MN (US); Kevin M. Hamer, St. Paul, MN (US); Robert D. Taylor, Stacy, MN (US); William B. Black, Eagan, MN (US); Richard J. Thompson, Lino Lakes, MN (US); Gregory L. Bluem, St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 535 days.

(21) Appl. No.: 14/041,486

(22) Filed: Sep. 30, 2013

(65) Prior Publication Data
US 2014/0027934 A1    Jan. 30, 2014

Related U.S. Application Data

(62) Division of application No. 11/398,338, filed on Apr. 5, 2006, now Pat. No. 8,568,869.
(Continued)

(51) Int. Cl.
*B32B 27/00*       (2006.01)
*B29D 11/00*       (2006.01)
(Continued)

(52) U.S. Cl.
CPC ........... *B29D 11/00788* (2013.01); *B32B 3/26* (2013.01); *B32B 7/06* (2013.01); *G02B 1/12* (2013.01);
(Continued)

(58) Field of Classification Search
CPC ........ B29C 39/206; B29C 41/24; B29C 55/10; B29D 11/00788; B32B 7/06
See application file for complete search history.

(56) References Cited

U.S. PATENT DOCUMENTS 540,768 A   6/1895   Western
3,124,639 A   3/1964   Kahn
(Continued)

FOREIGN PATENT DOCUMENTS

CA          1328553        4/1994
DE      102 27 039 A1      3/2003
(Continued)

OTHER PUBLICATIONS

Schrenk, W.J., et al., "Nanolayer Polymeric Optical Films", *Tappi Journal* (Jun. 1992); pp. 169-174.
(Continued)

*Primary Examiner* — Galen Hauth
(74) *Attorney, Agent, or Firm* — Daniel J. Iden

(57) ABSTRACT

Optical bodies are disclosed that include an optical film and at least one rough strippable skin layer. The at least one rough strippable skin layer can include a continuous phase and a disperse phase. In some embodiments, the at least one rough strippable skin layer can include a first polymer, a second polymer different from the first polymer and an
(Continued)

additional material that is substantially immiscible in at least one of the first and second polymers. In some exemplary embodiments, a surface of the at least one rough strippable skin layer adjacent to the optical film comprises a plurality of protrusions and the adjacent surface of the optical film comprises a plurality of asymmetric depressions substantially corresponding to said plurality of protrusions. Methods of making such exemplary optical bodies are also disclosed.

15 Claims, 16 Drawing Sheets

Related U.S. Application Data

(60) Provisional application No. 60/668,700, filed on Apr. 6, 2005.

(51) Int. Cl.
  B32B 3/26 (2006.01)
  B32B 7/06 (2006.01)
  G02B 1/12 (2006.01)
  G02B 5/02 (2006.01)
  G02B 5/30 (2006.01)
  G02B 27/28 (2006.01)

(52) U.S. Cl.
  CPC ........... *G02B 5/0221* (2013.01); *G02B 5/0257* (2013.01); *G02B 5/0268* (2013.01); *G02B 5/0278* (2013.01); *G02B 5/305* (2013.01); *G02B 27/283* (2013.01); *Y10T 428/24355* (2015.01); *Y10T 428/24372* (2015.01); *Y10T 428/25* (2015.01); *Y10T 428/254* (2015.01)

(56) References Cited

U.S. PATENT DOCUMENTS

| | | |
|---|---|---|
| 3,610,729 A | 10/1971 | Rogers |
| 3,711,176 A | 1/1973 | Alfrey, Jr. |
| 3,860,036 A | 1/1975 | Newman, Jr. |
| 4,264,664 A | 4/1981 | Kunz |
| 4,367,312 A | 1/1983 | Bontinck |
| 4,446,305 A | 5/1984 | Rogers |
| 4,520,189 A | 5/1985 | Rogers |
| 4,521,588 A | 6/1985 | Rogers |
| 4,525,413 A | 6/1985 | Rogers |
| 4,569,609 A | 2/1986 | Snyder, Jr. |
| 4,720,426 A | 1/1988 | Englert |
| 4,837,088 A | 6/1989 | Freedman |
| 5,188,760 A | 2/1993 | Hikmet |
| 5,211,878 A | 5/1993 | Reiffenrath |
| 5,235,443 A | 8/1993 | Barnik |
| 5,262,894 A | 11/1993 | Wheatley |
| 5,269,995 A | 12/1993 | Ramanathan |
| 5,294,657 A | 3/1994 | Melendy |
| 5,316,703 A | 5/1994 | Schrenk |
| 5,319,478 A | 6/1994 | Fünfschilling |
| 5,339,198 A | 8/1994 | Wheatly |
| 5,389,324 A | 2/1995 | Lewis |
| 5,448,404 A | 9/1995 | Schrenk |
| 5,486,935 A | 1/1996 | Kalmanash |
| 5,486,949 A | 1/1996 | Schrenk |
| 5,520,760 A | 5/1996 | Freedman |
| 5,552,927 A | 9/1996 | Wheatly |
| 5,607,764 A | 3/1997 | Konno |
| 5,612,820 A | 3/1997 | Schrenk |
| 5,629,055 A | 5/1997 | Revol |
| 5,677,024 A | 10/1997 | Abe |
| 5,685,128 A | 11/1997 | Chum |
| 5,686,979 A | 11/1997 | Weber |
| 5,699,188 A | 12/1997 | Gilbert |
| 5,721,603 A | 2/1998 | De Vaan |
| 5,744,534 A | 4/1998 | Ishiharada |
| 5,751,388 A | 5/1998 | Larson |
| 5,767,935 A | 6/1998 | Ueda |
| 5,770,306 A | 6/1998 | Suzuki |
| 5,783,120 A | 7/1998 | Ouderkirk |
| 5,793,456 A | 8/1998 | Broer |
| 5,808,794 A | 9/1998 | Weber |
| 5,825,542 A | 10/1998 | Cobb, Jr. |
| 5,825,543 A | 10/1998 | Ouderkirk |
| 5,867,316 A | 2/1999 | Carlson |
| 5,882,774 A | 3/1999 | Jonza |
| 5,914,165 A | 6/1999 | Freedman |
| 5,940,149 A | 8/1999 | Vanderwerf |
| 5,962,114 A | 10/1999 | Jonza |
| 5,965,247 A | 10/1999 | Jonza |
| 6,006,913 A | 12/1999 | Lüdemann |
| 6,045,894 A | 4/2000 | Jonza |
| 6,080,467 A | 6/2000 | Weber |
| 6,082,876 A | 7/2000 | Hanson |
| 6,117,530 A | 9/2000 | Jonza |
| 6,141,149 A | 10/2000 | Carlson |
| 6,157,490 A | 12/2000 | Wheatley |
| 6,166,790 A | 12/2000 | Kameyama |
| 6,171,422 B1 | 1/2001 | Cahill |
| 6,179,948 B1 | 1/2001 | Merrill |
| 6,185,039 B1 | 2/2001 | Allen |
| 6,210,785 B1 | 4/2001 | Weber |
| 6,245,844 B1 | 6/2001 | Kurian |
| 6,262,842 B1 | 7/2001 | Ouderkirk |
| 6,268,961 B1 * | 7/2001 | Nevitt ............... G02B 5/0226 349/84 |
| 6,296,927 B1 | 10/2001 | Jonza |
| 6,307,676 B1 | 10/2001 | Merrill |
| 6,326,072 B1 | 12/2001 | Ojeda |
| 6,329,046 B1 | 12/2001 | Merrill |
| 6,335,051 B1 | 1/2002 | Kausch |
| 6,352,761 B1 | 3/2002 | Hebrink |
| 6,352,762 B1 | 3/2002 | Shimizu |
| 6,368,699 B1 | 4/2002 | Gilbert |
| 6,391,896 B1 | 5/2002 | Van Hes |
| 6,396,631 B1 | 5/2002 | Ouderkirk |
| 6,406,763 B1 | 6/2002 | Wolf |
| 6,407,862 B2 | 6/2002 | Moshrefzadeh |
| 6,449,092 B1 | 9/2002 | Weber |
| 6,449,093 B2 | 9/2002 | Hebrink |
| 6,451,414 B1 | 9/2002 | Wheatley |
| 6,459,514 B2 | 10/2002 | Gilbert |
| 6,486,997 B1 | 11/2002 | Bruzzone |
| 6,498,683 B2 | 12/2002 | Condo |
| 6,543,143 B2 | 4/2003 | Moore |
| 6,590,034 B2 | 7/2003 | Wanic |
| 6,590,707 B1 | 7/2003 | Weber |
| 6,654,085 B1 | 11/2003 | Koike et al. |
| 6,673,425 B1 | 1/2004 | Hebrink |
| 6,741,307 B2 | 5/2004 | Matsunaga |
| 6,760,156 B2 | 7/2004 | Tsuchimoto |
| 6,885,415 B2 | 4/2005 | Kuroda |
| 6,926,952 B1 | 8/2005 | Weber |
| 6,939,499 B2 | 9/2005 | Merrill |
| 6,949,212 B2 * | 9/2005 | Merrill .............. B29C 55/165 264/288.4 |
| 6,963,387 B2 | 11/2005 | Matsuno |
| 7,070,849 B2 | 7/2006 | Mori |
| 2001/0013668 A1 | 8/2001 | Neavin |
| 2002/0034634 A1 | 3/2002 | Denehy |
| 2002/0190406 A1 | 12/2002 | Merrill |
| 2003/0031845 A1 | 2/2003 | Umeya |
| 2003/0062114 A1 | 4/2003 | Yamaguchi |
| 2003/0179460 A1 | 9/2003 | Hino |
| 2003/0214718 A1 | 11/2003 | Kaminsky |
| 2004/0062513 A1 | 4/2004 | Sung |
| 2004/0219338 A1 | 11/2004 | Hebrink |
| 2004/0234724 A1 | 11/2004 | Kaminsky |

(56) References Cited

U.S. PATENT DOCUMENTS

| | | |
|---|---|---|
| 2006/0093809 A1 | 5/2006 | Hebrink |
| 2006/0227421 A1 | 10/2006 | Stover |
| 2008/0217799 A1 | 9/2008 | Stover |

FOREIGN PATENT DOCUMENTS

| | | |
|---|---|---|
| EP | 0 345 884 A2 | 12/1989 |
| JP | 56-123825 A | 9/1981 |
| JP | 59-138452 A | 8/1984 |
| JP | 60-040279 A | 3/1985 |
| JP | 62-231731 A | 12/1987 |
| JP | 04-135729 A | 5/1992 |
| JP | 04-140197 A | 5/1992 |
| JP | 05-157914 A | 6/1993 |
| JP | 06-016851 A | 1/1994 |
| JP | 06-312467 A | 11/1994 |
| JP | 08-039649 A | 2/1996 |
| JP | 10-253827 A | 9/1998 |
| JP | 11-077916 A | 3/1999 |
| JP | 2000-301649 A | 10/2000 |
| JP | 2001-030351 A | 2/2001 |
| JP | 2001-281454 A | 10/2001 |
| JP | 2002-267844 A | 9/2002 |
| JP | 2002-355913 A | 12/2002 |
| JP | 2002-357704 A | 12/2002 |
| JP | 2003-240951 A | 8/2003 |
| JP | 2003-240953 A | 8/2003 |
| JP | 2004-034503 A | 2/2004 |
| JP | 2004-122701 A | 4/2004 |
| WO | WO 95/17691 | 6/1995 |
| WO | WO 95/17692 | 6/1995 |
| WO | WO 95/17699 | 6/1995 |
| WO | WO 95/27919 | 10/1995 |
| WO | WO 96/19347 | 6/1996 |
| WO | WO 99/36248 | 7/1999 |
| WO | WO 00/75560 | 12/2000 |
| WO | WO 01/38448 | 5/2001 |
| WO | WO 01/40708 | 6/2001 |
| WO | WO 01/79340 | 10/2001 |
| WO | WO 01/96104 | 12/2001 |
| WO | WO 02/16976 | 2/2002 |
| WO | WO 02/31539 | 4/2002 |
| WO | WO 02/32644 | 4/2002 |
| WO | WO 02/34514 | 5/2002 |
| WO | WO 2004/099832 | 11/2004 |
| WO | WO 2006/049715 | 5/2006 |
| WO | WO 2006/049949 | 5/2006 |
| WO | WO 2006/107969 | 10/2006 |

OTHER PUBLICATIONS

Maier, C. et al., "Polypropylene—The Definitive User's Guide and Databook", *Additives* Chapter 3 (1998), Plastics Design Library, William Andrew Publishing; 21 pp.

Weber, M.F., et al., "Giant Birefringent Optics in Multilayer Polymer Mirrors", *Science* (Mar. 31, 2000), vol. 287, No. 5462; pp. 2451-2456.

Van Horn, B., et al., "Conoscopic Measurement of Birefringence and Orientation in Biaxially Stretched Polymer Films and Sheets", *Macromolecules* (2003), vol. 36, pp. 8513-8521, American Chemical Society.

Cambridge Polymer Group Inc., "The Theory of Birefringence", CPGAN #014 (2004), 5 pp.

Ajji, A., et al., "Biaxial Orientation in LLDPE Films: Comparison of Infrared Spectroscopy, X-Ray Pole Figures, and Birefringence Techniques", *Polymer Engineering and Science* (Sep. 2006); vol. 46, No. 9, pp. 1182-1189; Research Library.

* cited by examiner

| Rq | 0.48 µm | Angle | -6.94 mrad |
| Ra | 0.43 µm | Curve | 59.21 µm |
| Rt | 1.58 µm | Terms | None |
| Rp | 0.60 µm | Avg Ht | -0.21 µm, |
| Rv | -0.98 µm | Area | -5.42 µm2 |

| Immiscible Polymer Blend Skins | | | | | | Embossed Polymer Substrate | %Haze | Average Peel Force (g/in) |
|---|---|---|---|---|---|---|---|---|
| Major Phase Polymer | Minor Phase 1 Polymer 1 | Minor Phase 1 Weight% | Minor Phase 2 Polymer 2 | Minor Phase 2 Weight% | | | | |
| sPP1571 | Marflex TR130 | 20% | SAN | 20% | | SAN | 15.8 | 10.8 |
| sPP1571 | Marflex TR130 | 30% | SAN | 10% | | SAN | 15.4 | 5.4 |
| sPP1571 | Marflex TR130 | 30% | SAN | 30% | | SAN | 32.6 | 20.2 |
| sPP1571 | Marflex TR130 | 10% | SAN | 10% | | SAN | 6.45 | 5.6 |
| sPP1571 | Marflex TR130 | 10% | SAN | 30% | | SAN | 19.5 | 21.4 |
| sPP1571 | Marflex TR130 | 20% | Admer SE810 | 10% | | SAN | 4.7 | 5.6 |
| sPP1571 | Marflex TR130 | 30% | Admer SE810 | 5% | | SAN | 7.9 | 5.4 |
| sPP1571 | Marflex TR130 | 30% | Admer SE810 | 15% | | SAN | 7.9 | 28.4 |
| sPP1571 | Marflex TR130 | 10% | Admer SE810 | 5% | | SAN | 1.47 | 3.8 |
| sPP1571 | Marflex TR130 | 10% | Admer SE810 | 15% | | SAN | 1.71 | 11.4 |
| sPP1571 | Marflex TR130 | 20% | Xylex 7200 | 10% | | Xylex 7200 | 45.3 | 65.2 |
| sPP1571 | Marflex TR130 | 30% | Xylex 7200 | 5% | | Xylex 7200 | 41.8 | 61.8 |
| sPP1571 | Marflex TR130 | 30% | Xylex 7200 | 15% | | Xylex 7200 | 93.1 | 146.2 |
| sPP1571 | Marflex TR130 | 10% | Xylex 7200 | 5% | | Xylex 7200 | 14.5 | 57.4 |
| sPP1571 | Marflex TR130 | 10% | Xylex 7200 | 15% | | Xylex 7200 | 21 | 130.4 |
| PP8650 | Pelestat 300 | 5% | | | | SAN / 8% PETG | | 7 |
| PP8650 | Pelestat 300 | 11% | | | | SAN / 8% PETG | 45% | 14.5 |
| PP8650 | Pelestat 300 | 15% | Pelestat 300 | 1.50% | | SAN / 8% PETG | 48% | 24 |
| PP8650 | Tone 787 | 6% | Pelestat 300 | 1.50% | | Xylex 7200 | 58% | 20 |
| PP8650 | Marflex TR130 | 15% | Tone 787 | 4% | | Xylex 7200 | 48% | 15 |
| PP8650 | Tone 787 | 6% | | | | Xylex 7200 / Pelestat 6321 | 51% | 18 |
| PP8650 | Tone 787 | 6% | | | | Xylex 7200 / Pelestat 6321 | 80% | 21 |
| PP8650 | PMMA-VO44 | 20% | Tone 787 | 6% | | Xylex 7200 | 49% | 31 |

OPTICAL BODIES INCLUDING ROUGH STRIPPABLE BOUNDARY LAYERS AND ASYMMETRIC SURFACE STRUCTURES

CROSS-REFERENCE TO RELATED APPLICATIONS

This application is a divisional of U.S. patent application Ser. No. 11/398,338, filed Apr. 5, 2006, now allowed, which claims the benefit of U.S. Provisional Patent Application No. 60/668,700, filed Apr. 6, 2005, entitled, "OPTICAL BODIES INCLUDING ROUGH STRIPPABLE BOUNDARY LAYERS AND ASYMMETRIC SURFACE STRUCTURES," the disclosures of which are incorporated by reference herein in their entirety.

FIELD OF THE INVENTION

The present disclosure relates to optical bodies and methods of processing optical bodies.

BACKGROUND

Optical films, including polymeric single layer optical films, polymeric multilayer optical films and polymeric optical films including disperse and continuous phases, are widely used for various purposes. Exemplary applications of polymeric optical films include display devices, such as liquid crystal displays (LCDs) placed in mobile telephones, personal data assistants, computers, televisions and other devices. Well known polymeric optical films include reflective polarizer films, such as Vikuiti™ Dual Brightness Enhancement Film (DBEF) and Vikuiti™ Diffuse Reflective Polarizer Film (DRPF), both available from 3M Company. Other well known polymeric optical films include reflectors, such as Vikuiti™ Enhanced Specular Reflector (ESR), also available from 3M Company.

Polymeric multilayer optical films used as polarizers or mirrors, usually include one or more first optical layers and one or more second optical layers. In addition to the first and second optical layers, some traditional multilayer films include one or more non-optical layers, such as one or more protective boundary layers located over or between packets of optical layers. The non-optical layers are usually integrated into the polymeric multilayer optical films so that at least a portion of the light to be transmitted, polarized, or reflected by the first and second optical layers also travels through these non-optical layers. Such non-optical layers can protect the optical layers from damage, aid in coextrusion processing and/or enhance post-processing mechanical properties of the optical films. Thus, in such traditional optical films, it is usually important that the non-optical layers do not substantially affect the reflective properties of the optical films over the wavelength region of interest.

SUMMARY OF THE INVENTION

The present disclosure is directed to optical bodies and methods of making optical bodies. In one exemplary implementation, an optical body includes a first optical film, a second optical film and at least one rough strippable boundary layer disposed between the first and second optical films adjacent to a surface of at least one of the first and second optical films. A surface of the rough strippable boundary layer disposed adjacent to an optical film comprises a first plurality of surface structures and the adjacent surface of the optical film comprises a second plurality of asymmetric surface structures substantially corresponding to said first plurality of surface structures.

In another exemplary implementation, an optical body includes a first optical film, a second optical film and at least one strippable boundary layer disposed between the first and second optical films adjacent to a surface of at least one of the first and second optical films. The strippable boundary layer comprises a first polymer and a second polymer that is substantially immiscible in the first polymer. A surface of the strippable boundary layer disposed adjacent to an optical film comprises a first plurality of surface structures and the adjacent surface of the optical film comprises a second plurality of asymmetric surface structures substantially corresponding to said first plurality of surface structures.

In yet another exemplary implementation, a method of processing an optical body includes the steps of providing an optical body comprising at least one strippable boundary layer between a first optical film and a second optical film and stretching the optical body.

In the stretched optical body, a surface of the strippable boundary layer disposed adjacent to an optical film comprises a first plurality of surface structures and the adjacent surface of the optical film comprises a second plurality of asymmetric surface structures substantially corresponding to said first plurality of surface structures.

BRIEF DESCRIPTION OF THE DRAWINGS

So that those of ordinary skill in the art to which the subject invention pertains will more readily understand how to make and use the subject invention, exemplary embodiments thereof are described in detail below with reference to the drawings, wherein:

FIG. 17 shows a table summarizing various properties of some exemplary embodiments of the present disclosure.

DETAILED DESCRIPTION

As summarized above, the present disclosure provides an optical body that includes one or more strippable layers, such as strippable boundary layers, and methods of making such optical bodies. According to the principles of the present disclosure, a strippable layer is connected to at least one optical film. In some exemplary embodiments, one or more strippable layers, such as strippable boundary layers, can be made rough and used to impart a surface texture into one or more optical films, for example, by co-extruding or orienting the optical film or films with a rough strippable boundary layer or by other suitable methods. The surface texture can include surface structures, and, in some exemplary embodiments, asymmetric surface structures. In some applications, such asymmetric surface structures can provide improved optical performance of the optical films included into the optical body. The one or more rough strippable boundary layers can be constructed and used substantially in the same manner as rough strippable skin layers described in the commonly owned U.S. Publication No. 2006-0093809 entitled "Optical Bodies and Methods for Making Optical Bodies", filed on Oct. 29, 2004, the disclosure of which is hereby incorporated by reference herein to the extent it is not inconsistent with the present disclosure. Optical bodies including rough strippable boundary layers are also generally described in the commonly owned U.S. Patent Publication No. 2006-0228592 entitled "Optical Bodies Including Rough Strippable Boundary Layers," filed on Apr. 6, 2005, the disclosure of which is hereby incorporated by reference herein.

In typical embodiments of the present disclosure, the strippable layers are connected to one or more optical films, such that they are capable of remaining adhered to the one or more optical films during initial processing, such as stretching, or in some exemplary embodiments, also during subsequent storage, handling, packaging, transporting and/or conversion, but can be stripped or removed by a user when desired. For example, the strippable boundary layers can be removed and the optical films separated shortly after stretching the optical body or shortly prior to installation of one or more of the constituent optical films into a display device. Preferably, the one or more strippable layers and the one or more optical films are separated without applying excessive force, damaging the optical films, or contaminating the optical films with a substantial residue of particles from the strippable layers. In other exemplary embodiments, optical bodies may be installed into a display device with at least one strippable boundary layer still intact. This feature provides additional flexibility as to the form in which the optical bodies of the present disclosure may be used.

Figure 1:
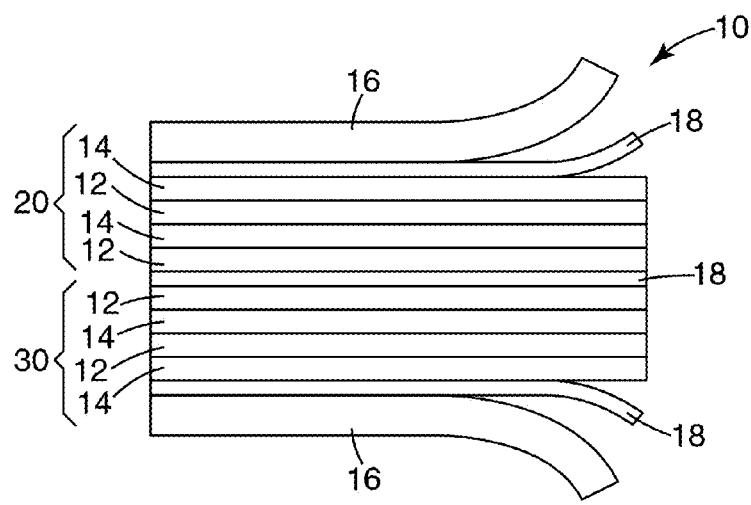
FIG. 1 is a schematic partial cross-sectional view of an optical body constructed in accordance with an exemplary embodiment of the present disclosure.
Figure 2:
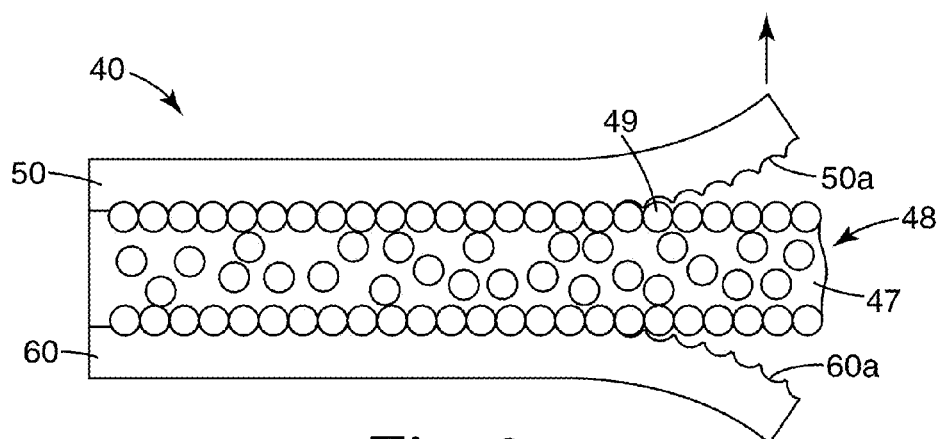
FIG. 2 is a schematic partial cross-sectional view of an optical body constructed in accordance with another exemplary embodiment of the present disclosure.
Figure 3:
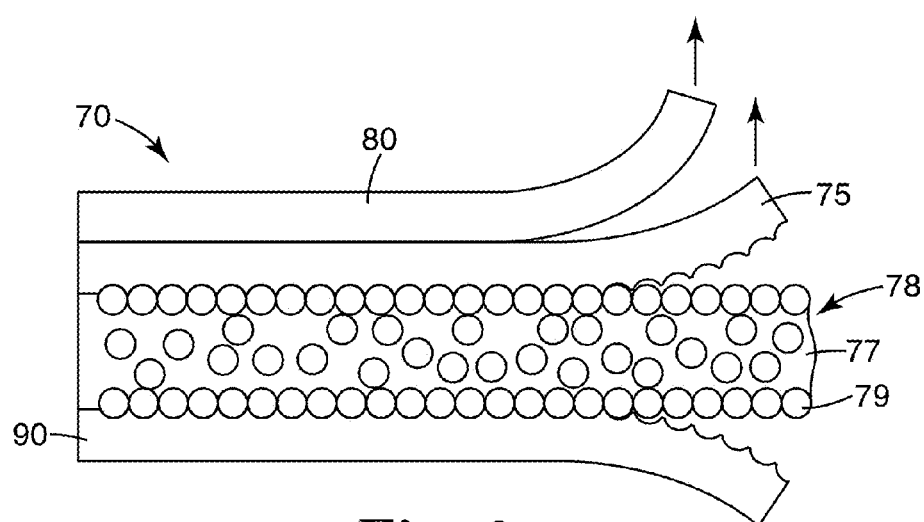
FIG. 3 is a schematic partial cross-sectional view of an optical body constructed in accordance with yet another embodiment of the present disclosure.

Reference is now made to FIGS. 1, 2 and 3 showing exemplary embodiments of the present disclosure in simplified schematic form. FIG. 1 is a partial schematic cross-sectional view showing an optical body 10, which includes a first optical film 20, a second optical film 30 and at least one strippable boundary layer 18 disposed between the first and second optical films. A first surface of the strippable boundary layer may be disposed adjacent to the optical film 20 and a second surface of the strippable boundary layer may be disposed adjacent to the optical film 30. In other exemplary embodiments, the strippable boundary layer may be disposed adjacent to one optical film and separated from another optical film by an additional layer, which may be an additional strippable layer or layers or the additional layer may be attached to the adjacent optical film. When desired, two strippable boundary layers may be provided between the optical films 20 and 30, for example, to provide different amounts of adhesion of a strippable boundary layer to the adjacent optical film 20 or 30. The optical body 10 may optionally further include one or more additional strippable boundary layers 18 disposed at outer surfaces of the optical films 20 and 30 and disposed adjacent to only one optical film, and one or more outer skin layers 16.

One example of materials that can be advantageously used in a construction shown in FIG. 1 is as follows: (1) first optical layers 12 made of 55 mol % of a diacid such as naphthalene dicarboxylate, 45% mol % of a diacid such as dimethyl terephthalate, 4 mol % hexane diol in the diol and 96 mol % ethylene glycol; (2) second optical layers 14 made of polyethylene napthalate; (3) strippable boundary layers 18 made of polypropylene; and (3) outer skin layers 16 made of 75 mol % of a diacid such as naphthalene dicarboxylate, 25% mol % of a diacid such as dimethyl terephthalate, 4 mol % hexane diol in the diol and 96 mol % ethylene glycol.

Exemplary optical bodies including more than two optical films may also further include additional strippable boundary layers (not shown) disposed between first and second optical films 20 and 30 and such additional optical films or between additional optical films (not shown). For example, the optical body 10 may further include a third optical film disposed next to the second optical film and a second strippable boundary layer disposed between the second optical film and the third optical film. Other exemplary embodiments may include more than three optical films, e.g., 6, 10 or more. The number of optical films used in an optical body constructed according to the present disclosure will depend on the equipment and materials used, as well as other relevant factors. Furthermore, the optical body 10 may include any other additional layers when suitable for a particular application. For example, one or both optical films 20 and 30 may further include one or more under-skin layers disposed between the optical film and the strippable boundary layer and forming a part of the optical film.

In some exemplary embodiments, one of or both optical films 20 and 30 may be or may include polymeric multilayer optical films, such as multilayer reflective polarizers. For example, one or both optical films may include one or more first optical layers 12 and one or more second optical layers 14. The first optical layers 12 may be birefringent polymer layers that are uniaxially or biaxially oriented. The second optical layers 14 may also be polymer layers that are birefringent and uniaxially or biaxially oriented. In other exemplary embodiments, the second optical layers 14 have an isotropic index of refraction that is different from at least one of the indices of refraction of the first optical layers 12 after orientation. One or both of the optical films 20 and 30 may be or may include polymeric optical films including a disperse phase and a continuous phase, such as a diffuse reflective polarizer. In yet other exemplary embodiments, one or more of the optical films 20 and 30 may be single-layer optical films.

FIG. 2 shows a partial schematic cross-sectional view of an optical body 40 constructed according to another exemplary embodiment of the present disclosure. The optical body 40 includes a first optical film 50, a second optical film 60 and a strippable boundary layer 48 disposed between the first and second optical films 50 and 60. In this exemplary embodiment, the strippable boundary layer 48 is a rough strippable boundary layer including a continuous phase 47 and a disperse phase 49. The disperse phase 49 can be formed by blending particles in the continuous phase 47 or by mixing in a material or materials that are immiscible in the continuous phase 47 at the appropriate stages of processing, which preferably then phase-separate and form a rough surface at the interface between the strippable boundary layer material and the optical film. For some applications, it may be desirable to form a boundary layer with one or more layers having continuous and disperse phases in which the interface between the two phases will be sufficiently weak to result in voiding when the film is oriented or otherwise processed. Such voids can contribute into creating the rough interface between the boundary layer and the adjacent optical film, and in some exemplary embodiments, the voids can contribute into creating asymmetric surface structures. The average dimensions and aspect ratio of the voids may be controlled through careful manipulation of processing parameters and stretch ratios, or through selective use of compatibilizers.

The continuous phase 47 and disperse phase 49 are shown in a generalized and simplified view in FIG. 2, while in practice the two phases can be less uniform and more irregular in appearance. For example, the schematic representation in FIG. 2 will be understood to cover the embodiment in which the strippable boundary layer includes a first polymer and a second polymer that is substantially immiscible in the first polymer but does not form clearly dispersed regions. In some exemplary embodiments, the strippable boundary layer 48 may contain multiple sub-phases of the disperse or/and the continuous phase. The strippable boundary layer 48 can be used to impart a surface texture including depressions 50a into a surface of the optical film 50 that is disposed adjacent to the strippable boundary layer 48, and a surface texture including depressions 60a into a surface of the optical film 60 that is disposed adjacent to the strippable boundary layer 48. The surface texture can be thus imparted during coextrusion, lamination and/or subsequent stretching of the optical films with the strippable boundary layers. The optical body 40 may further include any number of films or layers shown or described in reference to FIG. 1 and any other additional layers when suitable for a particular application.

FIG. 3 shows a partial schematic cross-sectional view of an optical body 70 constructed according to yet another exemplary embodiment of the present disclosure. The optical body 70 includes a first optical film 80, a second optical film 90, a strippable boundary layer 78 including a continuous phase 77 and a disperse phase 79 and a smooth strippable boundary layer 75, which can be formed integrally and removed with the rough strippable boundary layer 78. Alternatively, the smooth strippable boundary layer 75 can be formed and/or removed separately from the rough strippable boundary layer 78. In some exemplary embodiments, the smooth boundary layer 75 can include at least one of the same materials as the continuous phase 77.

The strippable boundary layer 48 can be used to impart a surface texture including depressions 50a into a surface of the optical film 50 that is disposed adjacent to the strippable boundary layer 48, and a surface texture including depressions 60a into a surface of the optical film 60 that is disposed adjacent to the strippable boundary layer 48. The surface texture can be thus imparted during the coextrusion, lamination and/or subsequent stretching of the optical films with the strippable boundary layers. When desired, two rough strippable layers may be provided between the optical films 80 and 90, for example, with different amounts of disperse phase to impart different amounts of roughness into different optical films. Furthermore, the optical body 70 may include any number of films or layers shown or described in reference to FIGS. 1 and 2 and any other additional layers when suitable for a particular application.

Strippable boundary layers included into the optical bodies constructed according to the present disclosure may have a first major surface that is removably attached to a first optical film and a second major surface that is removably attached to a second optical film. However, some exemplary optical bodies constructed according to the present disclosure may include at least one boundary layer that has a first major surface that is removably attached to a first optical film and a second major surface that is permanently attached to a second optical film via a material selection that provides an acceptable bond between the boundary layer and the second optical film so that the strippable boundary layer may be removed from the first optical film but not from the second optical film. In some embodiments, one of the optical films may serve as a skin layer added to satisfy processing requirements (coextrusion process or film handling and/or converting), which can be removed at some point of the process and discarded.

In another embodiment, a boundary layer may adhere to both the first and second optical films and, upon stripping, it may split to produce additional layers on the first and second optical films that are composed of boundary layer material.

One way of obtaining these effects is to have a boundary layer that is a multilayer material composed of two or more materials, as explained above. In some of such exemplary embodiments that material selection will include material that have stronger or weaker adhesion to the adjacent optical film. The selection of these materials will be governed by the material composition of the adjacent optical film.

The optical films and layers depicted in FIGS. 1, 2 and 3 can be constructed to have different relative thicknesses than those illustrated.

Additional aspects of the invention will now be explained in greater detail.

Optical Films

Various optical films are suitable for use in the embodiments of the present disclosure. Optical films suitable for use in some embodiments of the present disclosure can include dielectric multilayer optical films (whether composed of all birefringent optical layers, some birefringent optical layers, or all isotropic optical layers), such as DBEF and ESR, and continuous/disperse phase optical films, such as DRPF, which can be characterized as polarizers or mirrors. Optical films suitable for use in embodiments of the present disclosure can be or can include a diffuse micro-voided reflective film, such as BaSO4-filled PET, or diffuse "white" reflective film such as $TiO_2$-filled PET. Alternatively, the optical film can be a single layer of a suitable optically clear isotropic or birefringent material, e.g., polycarbonate, and it may or may not include volume diffusers. Those of ordinary skill in the art will readily appreciate that the structures, methods, and techniques described herein can be adapted and applied to other types of suitable optical films. The optical films specifically mentioned herein are merely illustrative examples and are not meant to be an exhaustive list of optical films suitable for use with exemplary embodiments of the present disclosure.

More particularly, exemplary optical films that are suitable for use in embodiments of the present disclosure include multilayer reflective films such as those described in, for example, U.S. Pat. Nos. 5,882,774 and 6,352,761 and in PCT Publication Nos. WO95/17303; WO95/17691; WO95/17692; WO95/17699; WO96/19347; and WO99/36262, all of which are incorporated herein by reference. Both multilayer reflective polarizer optical films and continuous/disperse phase reflective polarizer optical films rely on index of refraction differences between at least two different materials (typically polymers) to selectively reflect light of at least one polarization orientation. Suitable diffuse reflective polarizers include the continuous/disperse phase optical films described in, for example, U.S. Pat. No. 5,825,543, incorporated herein by reference, as well as the diffusely reflecting optical films described in, for example, U.S. Pat. No. 5,867,316, incorporated herein by reference. Other materials and optical films including a disperse phase and a continuous phase, suitable for use in some embodiments of the present disclosure are also described in a commonly owned Patent Publication No. 2006-0226562 entitled "Diffuse Reflective Polarizing Films With Orientable Polymer Blends," the disclosure of which is hereby incorporated by reference herein to the extent it is not inconsistent with the present disclosure.

In some embodiments one or more of the optical films is a multilayer stack of polymer layers with a Brewster angle (the angle at which reflectance of p-polarized light turns to zero) that is very large or nonexistent. As it is known by those of ordinary skill in the art, multilayer optical films can be made into a multilayer mirror or polarizer whose reflectivity for p-polarized light decreases slowly with angle of incidence, is independent of angle of incidence, or increases with angle of incidence away from the normal. Multilayer reflective optical films are used herein as an example to illustrate optical film structures and methods of making and using the optical films of the invention. As mentioned above, the structures, methods, and techniques described herein can be adapted and applied to other types of suitable optical films.

For example, a suitable multilayer optical film can be made by alternating (e.g., interleaving) uniaxially- or biaxially-oriented birefringent first optical layers with second optical layers. In some embodiments, the second optical layers have an isotropic index of refraction that is approximately equal to one of the in-plane indices of the oriented layer. The interface between the two different optical layers forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers.

A film having multiple layers can include layers with different optical thicknesses to increase the reflectivity of the film over a range of wavelengths. For example, a film can include pairs of layers that are individually tuned (for normally incident light, for example) to achieve optimal reflection of light having particular wavelengths. Generally, multilayer optical films suitable for use with certain embodiments of the invention have about 2 to 5000 optical layers, typically about 25 to 2000 optical layers, and often about 50 to 1500 optical layers or about 75 to 1000 optical layers. Some exemplary embodiments include about 825 optical layers or less, about 600 optical layers or less, about 275 layers or less, or even about 100 optical layers or less. The number of optical layers depends on the application of the optical film. It should further be appreciated that, although only a single multilayer stack may be described, the multilayer optical film can be made from multiple stacks or different types of optical film that are subsequently combined to form the film.

A reflective polarizer can be made by combining a uniaxially oriented first optical layer with a second optical layer having an isotropic index of refraction that is approximately equal to one of the in-plane indices of the oriented layer. Alternatively, both optical layers are formed from birefringent polymers and are oriented in a draw process so that the indices of refraction in a single in-plane direction are approximately equal. The interface between the two optical layers forms a light reflection plane for one polarization of light. Light polarized in a plane parallel to the direction in which the indices of refraction of the two layers are approximately equal will be substantially transmitted. Light polarized in a plane parallel to the direction in which the two layers have different indices will be at least partially reflected.

For polarizers having second optical layers with isotropic indices of refraction or low in-plane birefringence (e.g., no more than about 0.07 at 632.8 nm), the in-plane indices ($n_x$ and $n_y$) of refraction of the second optical layers are approximately equal to one in-plane index (e.g., $n_y$) of the first optical layers. Thus, the in-plane birefringence of the first optical layers is an indicator of the reflectivity of the multilayer optical film. Typically, it is found that the higher the in-plane birefringence, the better the reflectivity of the multilayer optical film. Typically, the first optical layers have an in-plane birefringence ($n_x$–$n_y$) after orientation of about 0.04 or greater at 632.8 nm, about 0.1 or greater at 632.8 nm, about 0.15 or greater at 632.8 nm, preferably about 0.2 or greater at 632.8 nm, and more preferably about 0.3 or greater at 632.8 nm. If the out-of-plane indices ($n_z$) of refraction of the first and second optical layers are equal or nearly equal, the multilayer optical film also has better off-angle reflectivity. The same or similar design considerations apply to diffuse reflective polarizers including disperse and continuous polymeric phases.

A mirror can be made using at least one uniaxially birefringent material, in which two indices (typically along the x and y axes, or $n_x$ and $n_y$) are approximately equal, and different from the third index (typically along the z axis, or $n_z$). The x and y axes are defined as the in-plane axes, in that they represent the plane of a given layer within the multilayer film, and the respective indices $n_x$ and $n_y$ are referred to as the in-plane indices. One method of creating a uniaxially birefringent system is to biaxially orient (stretch along two axes) the multilayer polymeric film. If the adjoining layers have different stress-induced birefringence, biaxial orientation of the multilayer film results in differences between refractive indices of adjoining layers for planes parallel to both axes, resulting in the reflection of light of both planes of polarization.

Where the first optical layers are birefringent polymer layers that are uniaxially- or biaxially-oriented, the polymers of the first optical layers are typically selected to be capable of developing a large birefringence when stretched. Depending on the application, the birefringence may be developed between two orthogonal directions in the plane of the film, between one or more in-plane directions and the direction perpendicular to the film plane, or a combination of these. The first polymer should maintain birefringence after stretching, so that the desired optical properties are imparted to the finished film. The second optical layers can be polymer layers that are birefringent and uniaxially- or biaxially-oriented, or the second optical layers can have an isotropic index of refraction that is different from at least one of the indices of refraction of the first optical layers after orientation. In the latter case, the polymer of the second layers should develop little or no birefringence when stretched, or develops birefringence of the opposite sense (positive-negative or negative-positive), such that its film-plane refractive indices differ as much as possible from those of the polymer of the first optical layers in the finished film.

Materials suitable for making optical films for use in exemplary embodiments of the present disclosure include polymers such as, for example, polyesters, copolyesters and modified copolyesters. In this context, the term "polymer" will be understood to include homopolymers and copolymers, as well as polymers or copolymers that may be formed in a miscible blend, for example, by co-extrusion or by reaction, including, for example, transesterification. The terms "polymer" and "copolymer" include both random and block copolymers.

Exemplary polymers useful in the optical films of the present disclosure include polyethylene naphthalate (PEN). PEN is frequently chosen for use in the first optical layers. Other polymers suitable for use in the first optical layers include, for example, polybutylene 2,6-naphthalate (PBN), polyethylene terephthalate (PET), and copolymers thereof. Other materials suitable for use in optical films and, particularly, in the first optical layers, are described, for example, in U.S. Pat. Nos. 5,882,774, 6,352,761 and 6,498,683 and U.S. patent application Ser. Nos. 09/229,724 and 09/399,531, which are incorporated herein by reference. An exemplary coPEN suitable for use in the first optical layers is coPEN having carboxylate subunits derived from 90 mol % dimethyl naphthalene dicarboxylate and 10 mol % dimethyl terephthalate and glycol subunits derived from 100 mol % ethylene glycol subunits and an intrinsic viscosity (IV) of 0.48 dL/g. Another useful polymer is a PET having an intrinsic viscosity of 0.74 dL/g, available from Eastman Chemical Company (Kingsport, Tenn.).

Polymer or polymers suitable for use in the second optical layers should be chosen so that in the finished film, the refractive index, in at least one direction, differs significantly from the index of refraction of the first optical layers in the same direction. In addition, it will be understood that the choice of a second polymer is dependent not only on the intended application of the optical film in question, but also on the choice made for the first polymer, as well as processing conditions.

The second optical layers can be made from a variety of polymers having glass transition temperatures compatible with that of the first optical layers and having a refractive index similar to the isotropic refractive index of the first polymer. Examples of other polymers suitable for use in optical films and, particularly, in the second optical layers, other than the coPEN polymers mentioned above, include vinyl polymers and copolymers made from monomers such as vinyl naphthalenes, styrene, maleic anhydride, acrylates, and methacrylates. Examples of such polymers include polyacrylates, polymethacrylates, such as poly(methyl methacrylate) (PMMA), and isotactic or syndiotactic polystyrene. Other polymers include condensation polymers such as polysulfones, polyamides, polyurethanes, polyamic acids, and polyimides. In addition, the second optical layers can be formed from polymers and copolymers such as polyesters and polycarbonates.

Other exemplary suitable polymers, especially for use in the second optical layers, include homopolymers of polymethylmethacrylate (PMMA), such as those available from Ineos Acrylics, Inc., Wilmington, Del., under the trade designations CP71 and CP80, or polyethyl methacrylate (PEMA), which has a lower glass transition temperature than PMMA. Additional second polymers include copolymers of PMMA (coPMMA), such as a coPMMA made from 75 wt % methylmethacrylate (MMA) monomers and 25 wt % ethyl acrylate (EA) monomers, (available from Ineos Acrylics, Inc., under the trade designation Perspex CP63), a coPMMA formed with MMA comonomer units and n-butyl methacrylate (nBMA) comonomer units, or a blend of PMMA and poly(vinylidene fluoride) (PVDF) such as that available from Solvay Polymers, Inc., Houston, Tex. under the trade designation Solef 1008.

Yet other suitable polymers, especially for use in the second optical layers, include polyolefin copolymers such as poly(ethylene-co-octene) (PE-PO) available from Dow-Dupont Elastomers under the trade designation Engage 8200, poly(propylene-co-ethylene) (PPPE) available from Fina Oil and Chemical Co., Dallas, Tex., under the trade designation Z9470, and a copolymer of atatctic polypropylene (aPP) and isotactic polypropylene (iPP). The optical films can also include, for example in the second optical layers, a functionalized polyolefin, such as linear low density polyethylene-g-maleic anhydride (LLDPE-g-MA) such as that available from E.I. duPont de Nemours & Co., Inc., Wilmington, Del., under the trade designation Bynel 4105.

Exemplary combinations of materials in the case of polarizers include PEN/coPEN, polyethylene terephthalate (PET)/co-PEN, PEN/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co. Exemplary combinations of materials in the case of mirrors include PET/coPMMA, PEN/PMMA or PEN/coPMMA, PET/ECDEL, PEN/ECDEL, PEN/sPS, PEN/THV, PEN/co-PET, and PET/sPS, where "co-PET" refers to a copolymer or blend based upon terephthalic acid (as described above), ECDEL is a thermoplastic polyester commercially available from Eastman Chemical Co., and THV is a fluoropolymer commercially available from 3M. PMMA refers to polymethyl methacrylate and PETG refers to a copolymer of PET employing a second glycol (usually cyclohexanedimethanol). sPS refers to syndiotactic polystyrene. Non-polyester polymers may be used in creating polarizer films. For example, polyether imides can be used with polyesters, such as PEN and coPEN, to generate a multilayer reflective mirror. Other polyester/non-polyester combinations, such as polyethylene terephthalate and polyethylene (e.g., those available under the trade designation Engage 8200 from Dow Chemical Corp., Midland, Mich.), can be used.

Optical films included in the optical bodies constructed according to the present disclosure are typically thin, but in other exemplary embodiments they may be as thick as desired. Suitable films may have various thicknesses, but usually they include films with thicknesses of less than 15 mils (about 380 micrometers), typically less than 10 mils (about 250 micrometers), more typically less than 7 mils (about 180 micrometers), sometimes, less than 5 mils, less than 1.5 mils, or even less than 1 mil, e.g., 0.7 mils. During processing, a dimensionally stable layer may be included into the optical film by extrusion coating or coextrusion. Optical films of the present disclosure can also include optional other optical or non-optical layers, such as one or more non-strippable protective boundary layers between packets of optical layers. The non-optical layers may be of any appropriate material suitable for a particular application and can be or can include at least one of the materials used in the remainder of the optical film.

In some exemplary embodiments, an intermediate layer or an underskin layer can be integrally formed with the optical film or on one or more of its outer surfaces. One or more under-skin layers are typically formed by co-extrusion with the optical film, for example, to integrally form and bind the first and second optical layers. The underskin layer or layers can include immiscible blends with a continuous phase and a disperse phase which also can aid in creating surface roughness and haze. The disperse phase of the underskin layers can be polymeric or inorganic and, where a substantially clear optical film is desired, have about the same or similar refractive index as the continuous phase. In some exemplary embodiments of such clear optical films, the refractive indexes of the materials making up the disperse and continuous phases differ from each other by no more than about 0.02. An example of underskin layer with refractive index matched blend is a continuous phase comprising SAN and a disperse phase comprising PETG (copolyester commercially available from Eastman Chemical under the tradename Eastar 6763). An example of underskins with a refractive index mismatched blend is a continuous phase of Xylex 7200 and a disperse phase of polystyrene.

Strippable Boundary Layers

By selecting the materials comprised in the one or more strippable boundary layers, the interfacial adhesion between the strippable boundary layer(s) and the adjacent optical film can be controlled so that the strippable boundary layers are capable of remaining adhered to the optical film(s) for as long as desired for a particular application, but can also be cleanly stripped or removed from the optical film(s) before use without applying excessive force or, in the appropriate embodiments, without leaving a substantial residue of particles from the boundary layer on the adjacent optical film.

In some exemplary embodiments of the present disclosure, the materials comprised in the optical bodies with the strippable boundary layer(s) connected to the optical film(s) are substantially transparent or clear, so that the optical bodies can be inspected for defects using standard inspection equipment. Such exemplary clear optical bodies usually have strippable boundary layers in which the constituent materials have approximately the same or sufficiently similar refractive indexes. In some exemplary embodiments of such clear optical bodies, the refractive indexes of the materials making up the strippable boundary layers differ from each other by no more than about 0.02.

A boundary layer adhered to an adjacent surface of an optical film in exemplary optical bodies of the present disclosure, can be constructed so that the adhesion of the strippable boundary layer(s) to the optical film(s) is characterized by a peel force of about 2 g/in or more between a strippable boundary layer and the adjacent optical film. Other exemplary optical bodies constructed according to the present disclosure can be characterized by a peel force of about 4, 5, 10 or 15 g/in or more. In some exemplary embodiments, the optical bodies can be characterized by a peel force as high as about 100 g/in or even about 120 g/in. In other exemplary embodiments, the optical bodies can be characterized by a peel force of about 50, 35, 30 or 25 g/in or less. In some exemplary implementations the adhesion can be in the range from 2 g/in to 120 g/in, from 4 g/in to 50 g/in, from 5 g/in to 35 g/in, from 10 g/in to 25 g/in, or from 15 g/in to 25 g/in. In other exemplary embodiments, the adhesion can be within other suitable ranges. Peel forces over 120 g/in can be tolerated for some applications depending on the materials used.

In some exemplary embodiments that are characterized by higher values of peel forces, various steps can be taken to aid in removal of the strippable boundary layers from one or more optical films. For example, an optical body of the present disclosure may be subjected to heat-setting, maintained at a particular temperature during the removal, subjected to tension, or/and allowed to age, which may permit any lubricants to reach a surface of film or layer.

The peel force that can be used to characterize exemplary embodiments of the present disclosure can be measured as follows. In particular, the present test method provides a procedure for measuring the peel force needed to remove a strippable boundary layer from an optical film (e.g., multilayer film, polycarbonate, etc.). Test-strips are cut from the optical body with a strippable boundary layer adhered to an optical film. The strips are typically about 1" width, and more than about 6" in length. The strips may be preconditioned for environmental aging characteristics (e.g., hot, hot & humid, cold, thermal-shock).

Typically, the samples should dwell for more than about 24 hours prior to testing. The 1" strips are then applied to rigid plates, for example, using double-sided tape (such as Scotch™ double sided tape available from 3M), and the plate/test-strip assembly is fixed in place on the peel-tester platen. The leading edge of the strippable boundary layer is then separated from the optical film and clamped to a fixture connected to the peel-tester load-cell. The platen holding the plate/test-strip assembly is then carried away from the load-cell at constant speed of about 90 inches/minute, effectively peeling the strippable boundary layer from the substrate optical film at about a 180 degree angle. As the platen moves away from the clamp, the force required to peel the strippable boundary layer off the film is sensed by the load cell and recorded by a microprocessor. The force required for peel is then averaged over 5 seconds of steady-state travel (preferably ignoring the initial shock of starting the peel) and recorded.

It has been found that these and related goals can be accomplished by careful selection of the materials for making the strippable boundary layers and ensuring their compatibility with at least some of the materials used to make the optical film, especially the materials of the outer surfaces of the optical film or, in the appropriate exemplary embodiments, of the under-skin layers. In accordance with one implementation of the present disclosure, the strippable boundary layers may include a sufficient amount of material with low crystallinity or an amorphous material, in order to remain adhered to the optical film for a desired period of time. In some exemplary embodiments, two or more different materials with different adhesions can be used in the strippable boundary layers to achieve a desired amount of adhesion.

Materials suitable for use in the strippable boundary layer(s) include, for example, fluoropolymers such as polyvinylidene fluoride (PVDF), ethylene-tetrafluoroethylene fluoropolymers (ETFE), polytetrafluoroethylene (PTFE), copolymers of PMMA (or a coPMMA) and PVDF, or any of the THV or PFA materials available from 3M (St. Paul, Minn.). Processing aids such as Dynamar (available from 3M) or Glycolube (available from Lonza Corporation in Fair Lawn N.J.) may enhance release characteristics of strippable boundary layers.

Materials suitable for use in the strippable boundary layer(s) generally include polyolefins, such as polypropylene and modified polypropylenes. Aliphatic polyolefins can be used. One suitable group of polypropylenes includes high density polypropylenes which exhibit particularly low adhesion to polyester and acrylic materials, and which are commonly used to make multilayer optical films. Polyethylene and their copolymers are also may be useful, including copolymers and propylene and ethylene. Other exemplary materials include polymethylpentene, cyclic olefin copolymers such as Topas available from Ticona Engineering Polymers (Florence, Ky.), copolymers of olefins with maleic anhydride, acrylic acid, or glycidyl methacrylate, or any of the Hytrel (thermoplastic polyester elastomer) or Bynel (modified ethylene vinyl acetate) materials available from DuPont Corporation (Wilmington, Del.).

Syndiotactic and atactic Vinyl aromatic polymers, which may be useful in some embodiments of the present disclosure, include poly(styrene), poly(alkyl styrene), poly(styrene halide), poly(alkyl styrene), poly(vinyl ester benzoate), and these hydrogenated polymers and mixtures, or copolymers containing these structural units. Examples of poly (alkyl styrenes) include: poly(methyl styrene), poly(ethyl styrene), poly(propyl styrene), poly(butyl styrene), poly (phenyl styrene), poly(vinyl naphthalene), poly(vinylstyrene), and poly(acenaphthalene) may be mentioned. As for the poly(styrene halides), examples include: poly(chlorostyrene), poly(bromostyrene), and poly(fluorostyrene). Examples of poly(alkoxy styrene) include: poly(methoxy styrene), and poly(ethoxy styrene). Among these examples, as particularly preferable styrene group polymers, are: polystyrene, polyp-methyl styrene), poly(m-methyl styrene), poly(p-tertiary butyl styrene), poly(p-chlorostyrene), poly (m-chloro styrene), polyp-fluoro styrene), and copolymers of styrene and p-methyl styrene may be mentioned. Furthermore, as comonomers of syndiotactic vinyl-aromatic group copolymers, besides monomers of above explained styrene group polymer, olefin monomers such as ethylene, propylene, butene, hexene, or octene; diene monomers such as butadiene, isoprene; polar vinyl monomers such as cyclic diene monomer, methyl methacrylate, maleic acid anhydride, or acrylonitrile may be mentioned.

Aliphatic copolyesters and aliphatic polyamides may also be useful materials for strippable boundary layers. As for polyester polymers and copolymers, the diacids can be chosen from terephthalic acid, isophthalic acid, phthalic acid, all isomeric naphthalenedicarboxylic acids (2,6-, 1,2-, 1,3-, 1,4-, 1,5-, 1,6-, 1,7-, 1,8-, 2,3-, 2,4-, 2,5-, 2,7-, and 2,8-), bibenzoic acids such as 4,4'-biphenyl dicarboxylic acid and its isomers, trans-4,4'-stilbene dicarboxylic acid and its isomers, 4,4'-diphenyl ether dicarboxylic acid and its isomers, 4,4'-diphenylsulfone dicarboxylic acid and its isomers, 4,4'-benzophenone dicarboxylic acid and its isomers, halogenated aromatic dicarboxylic acids such as 2-chloroterephthalic acid and 2,5-dichloroterephthalic acid, other substituted aromatic dicarboxylic acids such as tertiary butyl isophthalic acid and sodium sulfonated isophthalic acid, cycloalkane dicarboxylic acids such as 1,4-cyclohexanedicarboxylic acid and its isomers and 2,6decahydronaphthalene dicarboxylic acid and its isomers, bi- or multi-cyclic dicarboxylic acids (such as the various isomeric norbornane and norbornene dicarboxylic acids, adamantane dicarboxylic acids, and bicyclo-octane dicarboxylic acids), alkane dicarboxylic acids (such as sebacic acid, adipic acid, oxalic acid, malonic acid, succinic acid, glutaric acid, azelaic acid, and dodecane dicarboxylic acid.), and any of the isomeric dicarboxylic acids of the fused-ring aromatic hydrocarbons (such as indene, anthracene, pheneanthrene, benzonaphthene, fluorene and the like). Alternatively, alkyl esters of these monomers, such as dimethyl terephthalate, may be used.

Suitable diol comonomers include but are not limited to linear or branched alkane diols or glycols (such as ethylene glycol, propanediols such as trimethylene glycol, butanediols such as tetramethylene glycol, pentanediols such as neopentyl glycol, hexanediols, 2,2,4-trimethyl-1,3-pentanediol and higher diols), ether glycols (such as diethylene glycol, triethylene glycol, and polyethylene glycol), chainester diols such as 3hydroxy-2,2-dimethylpropyl-3-hydroxy-2,2-dimethyl propanoate, cycloalkane glycols such as 1,4-cyclohexanedimethanol and its isomers and 1,4-cyclohexanediol and its isomers, bior multicyclic diols (such as the various isomeric tricyclodecane dimethanols, norbornane dimethanols, norbornene dimethanols, and bicyclooctane dimethanols), aromatic glycols (such as 1,4-benzenedimethanol and its isomers, 1,4-benzenediol and its isomers, bisphenols such as bisphenol A, 2,2'-dihydroxy biphenyl and its isomers, 4,4' dihydroxymethyl biphenyl and its isomers, and 1,3-bis(2-hydroxyethoxy)benzene and its isomers), and lower alkyl ethers or diethers of these diols, such as dimethyl or diethyl diols.

In the exemplary embodiment where at least one boundary layer is designed to permanently adhere to at least one adjacent optical film, the constituent materials must be provided with sufficient adhesion to that adjacent optical film. These materials will be chosen with regard to their adhesive properties to an optical film and, optionally, to another component of the boundary layer (in case of a multilayer boundary layer). Some materials that may be useful are those listed above and polymers of the same classes that have been modified to adhere to an optical film.

In some exemplary embodiments, the strippable boundary layer(s) may include low melting and low crystallinity polypropylenes and their copolymers; low melting and low crystallinity polyethylenes and their copolymers, low melting and low crystallinity polyesters and their copolymers, or any suitable combination thereof. Such low melting and low crystallinity polypropylenes and their copolymers consist of propylene homopolymers and copolymers of propylene and ethylene or alpha-olefin materials having between 4 to 10 carbon atoms. The term "copolymer" includes not only the copolymer, but also terpolymers and polymers of four or more component polymers. Suitable low melting and low crystallinity polypropylenes and their copolymers include, for example, syndiotactic polypropylene (such as, Finaplas 1571 from Total Petrochemicals, Inc.), which is a random copolymer with an extremely low ethylene content in the syndiotactic polypropylene backbone, and random copolymers of propylene (such as PP8650 or PP6671 from Atofina, which is now Total Petrochemicals, Inc.). The described copolymers of propylene and ethylene can also be extrusion blended with homopolymers of polypropylene to provide a higher melting point strippable boundary layer if needed.

Other suitable low melting and low crystallinity polyethylenes and polyethylene copolymers include, for example, linear low-density polyethylene and ethylene vinyl alcohol copolymers. Suitable polypropylenes include, for example, random copolymers of propylene and ethylene (for example, PP8650 from Total Petrochemicals, Inc.), or ethylene octene copolymers (for example, Affinity PT 1451 from Dow Chemical Company). In some embodiments of the present disclosure, the continuous phase includes an amorphous polyolefin, such as an amorphous polypropylene, amorphous polyethylene, an amorphous polyester, or any suitable combination thereof or with other materials. In some embodiments, the materials of the strippable boundary layers can include nucleating agents, such as sodium benzoate to control the rate of crystallization. Additionally, antistatic materials, anti-block materials, coloring agents such as pigments and dyes, polarizing dyes, migratory lubricants, stabilizers and other processing aids may be added. Additionally or alternatively, the rough strippable skin layers may include any other appropriate material. In some exemplary embodiments, migratory antistatic agents can be used in the strippable boundary layers to lower their adhesion to the optical films.

Rough Strippable Boundary Layers

In the exemplary embodiments of the present disclosure that include at least one rough strippable boundary layer, the boundary layer or layers may include any materials described above or any combination thereof. For example, the continuous phase or one of the first and second immiscible polymers may include any material mentioned in reference to the strippable boundary layers described above.

The degree of surface roughness of the rough strippable boundary layers can be adjusted by mixing or blending different materials, for example, polymeric materials, inorganic materials, or both into the disperse phase. In addition, the ratio of disperse phase to continuous phase can be adjusted to control the degree of surface roughness and adhesion and will depend on the particular materials used. Thus, in the exemplary embodiments including a rough strippable boundary layer, one, two or more polymers would function as the continuous phase, while one, two or more materials, which may or may not be polymeric, would provide a disperse phase with a suitable surface roughness for imparting a surface texture. The one or more polymers of the continuous phase can be selected to provide a desired adhesion to the material of the optical film. A material with relatively high crystallinity, such as high density polyethylene (HDPE) or polycaprolactone, can be blended into the rough strippable boundary layers in order to impart rough texture into the surface of an optical film that is adjacent to the rough strippable boundary layer and to affect adhesion. For example, HDPE could be blended into low crystallinity syndiotactic polypropylene (sPP) for improving surface roughness along with a low crystallinity poly(ethylene octene) (PE-PO) for improving adhesion.

Where the disperse phase is capable of crystallization, the roughness of the strippable skin layer or layers can be enhanced by crystallization of this phase at an appropriate extrusion processing temperature, degree of mixing, and quenching, as well as through addition of nucleation agents, such as aromatic carboxylic-acid salts (sodium benzoate); dibenzylidene sorbitol (DBS), such as Millad 3988 from Milliken & Company; and sorbitol acetals, such as Irgaclear clarifiers by Ciba Specialty Chemicals and NC-4 clarifier by Mitsui Toatsu Chemicals. Other nucleators include organophosphate salts and other inorganic materials, such as ADK-stab NA-11 and NA-21 phosphate esters from Asahi-Denka and Hyperform HPN-68, a norbornene carboxylic-acid salt from Milliken & Company. In some exemplary embodiments, the disperse phase includes particles, such as those including inorganic materials, that will protrude from the surface of the rough strippable boundary layers and impart surface structures into the optical film when the optical body is extruded, oriented, laminated or stretched. In some exemplary embodiments, some or all of the particles of the disperse phase may be substantially spherically shaped. The latter may be accomplished with the disperse phase including a plurality of beads. The beads may be made of or may include one or more inorganic or organic materials.

The disperse phase of the rough strippable boundary layers can include particles or other rough features that are sufficiently large (for example, at least 0.1 micrometers average diameter) to be used to impart a surface texture into the outer surface of an adjacent layer of the optical film. At least a substantial portion of protrusions of the disperse phase should typically be larger than the wavelength of the light it is illuminated with but still small enough not to be resolved with an unaided eye. Such particles can include particles of inorganic materials, such as silica particles, talc particles, sodium benzoate, calcium carbonate, a combination thereof or any other suitable particles. Alternatively, the disperse phase can be formed from polymeric materials that are (or become) substantially immiscible in the continuous phase under the appropriate conditions.

The disperse phase can be formed from one or more materials, such as inorganic materials, polymers, or both that are different from at least one polymer of the continuous phase and immiscible therein, with the disperse polymer phases having typically a higher degree of crystallinity than the polymer or polymers of the continuous phase. It is preferred that the disperse phase is only mechanically miscible or immiscible with the continuous phase polymer or polymers. The disperse phase material or materials and the continuous phase material or materials can phase separate under appropriate processing conditions and form distinct phase inclusions within the continuous matrix, and particularly at the interface between the optical film and the rough strippable skin layer.

Exemplary polymers that are particularly suitable for use in the disperse phase include styrene acrylonitrile, modified polyethylene, polycarbonate and copolyester blend, ϵ-caprolactone polymer, such as TONE™ P-787, available from Dow Chemical Company, random copolymer of propylene and ethylene, other polypropylene copolymers, poly(ethylene octene) copolymer, anti-static polymer, high density polyethylene, medium density polyethylene, linear low density polyethylene and polymethyl methacrylate. The disperse phase may include any other appropriate material, such as any suitable crystallizing polymer and it may include the same materials as one or more of the materials used in the optical film.

In some exemplary embodiments, the strippable boundary layer or layers may include at least 3 materials for the purposes of controlling strippable layer adhesion and providing a higher surface feature density. In some exemplary embodiments, more than 2 disperse sub-phases can result in rough features or protrusions of different sizes or compounded protrusions, such as "protrusion-on-protrusion" configurations, i.e., impart smaller concave surface features (depressions) between larger concave surface features (depressions), and, in some exemplary embodiments, smaller concave surface features (depressions) within larger concave surface features (depressions). Such constructions can be beneficial for creating hazier surfaces on optical films.

Materials used in such exemplary embodiments are available from different manufacturers as described: PEN (0.48 IV PEN from 3M Company), SAN (Tyril 880 from Dow Chemical), sPP (1571 available from Atofina, now Total Petrochemicals, Inc.), MDPE (Marflex TR130 available from Chevron-Philips), Admer (SE810 available from Mitsui Petrochemicals, Inc.), Xylex (Xylex 7200 available from GE Plastics Inc.), random propylene-ethylene copolymer (PP8650 available from Atofina, now Total Petrochemicals, Inc.), Pelestat 300 (Pelestat 300 available from Tomen America), Pelestat 6321 (Pelestat 6321 available from Tomen America), polycaprolactone (Tone 787), PMMA (VO44 available from Atofina, now Total Petrochemicals, Inc. Chemical), Polystyrene (Styron 685 available from Dow Chemical Company).

Asymmetric Surface Structures

The present disclosure is also directed to optical bodies including optical films having asymmetric surface structures, and methods of making such optical bodies. The asymmetric surface structures can be created, for example, by coextruding strippable boundary layers with one or more optical films, followed by orientation, e.g., by stretching, of the optical body of the present disclosure with the strippable boundary layer or layers still in place. Where a rough strippable boundary layer is disposed between and adjacent to two optical films, the rough boundary layer may be used to impart asymmetrical surface structures into the adjacent surfaces of both optical films. Two or more boundary layers may be used in a similar manner to impart textures into surfaces of three or more optical films.

The asymmetric surface structures also can be created by other suitable methods, such as coating, casting or lamination. In some exemplary embodiments, asymmetric structures on optical films can be formed or further enhanced by extrusion blending of immiscible polymers with the optical film or one or more of its underskin layer. Subsequent orientation of the optical film can increase the asymmetry of the immiscible blend surface. The disperse phase polymer of the immiscible blend can have a refractive index match with the continuous phase polymer, however, the two or more polymers in the immiscible blend can also have some differences in refractive index.

Some suitable methods could benefit from pre-heating the optical film or films prior to applying one or more rough strippable boundary layers, such as where rough strippable boundary layers are laminated onto the optical film. In some exemplary embodiments, the strippable boundary layers can be formed directly on the optical film or with the optical film. During the deposition onto the optical film, after such deposition or during subsequent processing, under the appropriate conditions, the rough strippable skin layers can impart a surface texture having asymmetric (usually, elongated) surface structures to the optical film. As explained above, when the rough strippable boundary layers contain immiscible polymers that phase separate, the interface between the strippable boundary layer and the optical film becomes rough. This phase separation, and thus surface roughness, can be further enhanced by uniaxial or unbalanced biaxial orientation of the optical body.

In the exemplary embodiments having strippable boundary layer(s) including voids, such voids can contribute into creating the rough interface between the boundary layer including asymmetric surface structures. The average dimensions and aspect ratio of the voids may be controlled through careful manipulation of processing parameters and stretch ratios, or through selective use of compatibilizers.

Unbalanced biaxial orientation is defined as a higher draw ratio or degree of orientation in one direction than another. In some exemplary embodiments, the uniaxial or unbalanced biaxial orientation can facilitate production of a surface texture including asymmetric surface structures on the optical film, for example by aligning phase-separated polymer domains into asymmetric (usually, elongated) protrusions or depressions that leave corresponding (but not necessarily similarly shaped) asymmetric depressions or protrusions in the optical film. In other exemplary embodiments, the production of asymmetric (usually, elongated) surface structures on a surface of an optical film may be facilitated by uniaxial or unbalanced biaxial orientation without appreciable elongation of the disperse phase regions or voids in the rough strippable skin layers. In such exemplary embodiments, the major axis or the asymmetric structures is usually substantially collinear with the larger stretch direction. Yet in other exemplary embodiments, the asymmetric (usually, elongated) surface structures on an optical film may be produced when the optical body is not oriented or subjected to balanced biaxial orientation. In such exemplary embodiments, the major axis of the asymmetric structures is usually substantially collinear with the machine direction (MD).

Figure 4A:
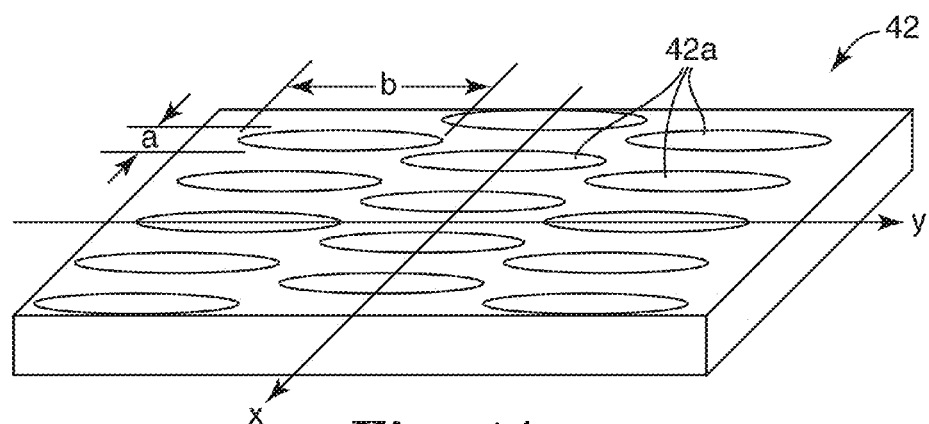
FIG. 4A is a schematic partial perspective view of an optical film constructed in accordance with an exemplary embodiment of the present disclosure, showing asymmetrical surface structures on a surface of an optical film.
Figure 4B:
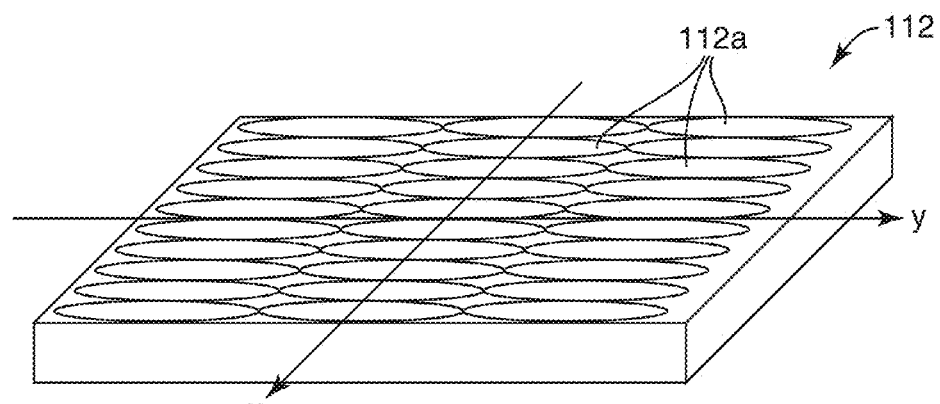
FIG. 4B is a schematic partial perspective view of an optical film constructed in accordance with another embodiment of the present disclosure, also showing asymmetrical surface structures on a surface of an optical film.
Figure 4C:
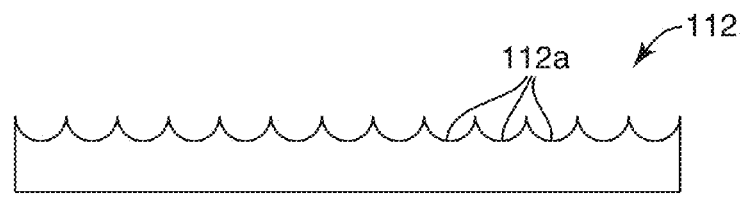
FIG. 4C is a schematic partial cross-sectional view of an optical film constructed in accordance with the embodiment of FIG. 4B sectioned along a minor axis of the optical film.

A perspective view of an optical film 42 having asymmetric elongated depressions 42a is shown schematically in FIG. 4A. Typical asymmetric elongated depressions according to the present disclosure each have a major dimension b aligned substantially along a first axis Y and a minor dimension a aligned substantially along a second axis X. The first axis Y is usually substantially collinear with the direction of the higher draw ratio or with the machine direction. As illustrated in FIGS. 4B and 4C, higher concentrations of the disperse phase in a rough strippable boundary layer can be used to increase the density of the depressions 112a in an optical film 112. FIG. 4B shows a perspective view of the exemplary optical film 112, and FIG. 4C shows its cross-section along the second axis X of the depressions 112a. Exemplary sizes for the minor and major dimensions vary considerably depending on the methods and materials used, and, in some exemplary embodiments, they even vary considerably across the same sample. Further, although the exemplary embodiment shown includes asymmetric depression, asymmetric protrusions on a surface of an optical film are also within the scope of the present disclosure, as well as asymmetric surface structures that are not easily characterized as either protrusions or depressions.

In other exemplary embodiments, however, average major and minor dimensions of asymmetric structures can be calculated. In such a case, exemplary values of the minor dimension sometimes can be from about 0.2 and larger, and exemplary values of the major dimension can be from about 0.22 and larger. Approximate typical exemplary sizes of the minor dimension were found to include 0.8, 1.3, 3, 3.5, 4, 5 and 600 microns. Approximate typical exemplary sizes of the major dimension were found to include 2.6, 3, 4, 7, 9, 12, 15, 17, 20, 24, 27, 40, 95, 600 and 700 microns. Some exemplary films may include structures that have a major dimension extending across the entire sample.

Exemplary aspect ratios of the asymmetric structures, defined as ratios of the major dimension to the minor dimension can be about 1.1 or larger. Some approximate other exemplary aspect ratios were found to include 1.4, 1.5, 2, 3, 4, 5, 6 and 23. In other exemplary embodiments the aspect ratio can exceed 100, especially where a particular feature extends across the entire sample under test. Exemplary average depths of depressions may be from about 0.2 micron to about 4 microns. Larger or smaller average depths may be desired in other exemplary embodiments, depending on the specific application, and in some exemplary embodiment can have exemplary sizes provided for the minor dimension.

The optical bodies constructed according to the present disclosure can be subjected to uniaxial or unbalanced biaxial orientation or relaxation, for example, at the draw ratios of about 1.1 to 1, 2 to 1, 3 to 1, 4 to 1, 5 to 1, 6 to 1 7 to 1, 8 to 1, or greater. In some exemplary embodiments, the draw ratios roughly correspond to the average aspect ratios of the elongated asymmetric structures imparted with the rough strippable boundary layers into the optical films of the present disclosure.

After stripping the rough strippable boundary layers, the underlying optical film usually has a surface including surface structures (e.g., depressions) corresponding to the surface structures (e.g., protrusions) found on the rough strippable boundary layers adjacent to the film surface, and, in some exemplary embodiments of the present disclosure, can have asymmetric surface structures, for example, elongated depressions corresponding to the protrusions (which may or may not be asymmetric or elongated) of an adjacent rough strippable boundary layer. The optical film according to the present disclosure can be characterized by its roughness average (Ra), which is a measure of the surface profile arithmetic average deviation from the center-line; the root mean square roughness average (Rq), which is the root mean square of the distance of the roughness profile from its mean line, and the difference in peaks (Rz), which is the difference of the average of the 5 highest peaks to the 5 lowest valleys.

Other characteristics useful for describing the surface roughness of the optical films of the present disclosure include (i) volume, defined as the amount of liquid it would take to submerge the dataset to its highest point; (ii) negative volume, defined as the volume above the sample surface and below the zero level; (iii) positive volume, defined as the volume below the sample surface and above the zero level; (iv) a surface area index, defined as the ratio of the surface area to the area of an ideal plane; (v) Rv, defined as the maximum depth along the assessment length; (vi) Rvm, defined as the average of the 4 maximum depths observed along the assessment lengths; and (vii) ECD, defined as the equivalent circular diameter—the diameter of a circle that has the same area as a depression. Another useful characteristic is the major axis (e.g., axis Y shown in FIGS. 4A and 4B), which is defined as the orientation of the major dimension of the best fit ellipse to an asymmetrical elongated depression.

Additional or alternative analyses, which may be used to characterize the rough surfaces according to the present disclosure include Bearing Ratio Analysis. The Bearing Ratio analysis calculates the bearing ratio, tp, and the ratio of the bearing area to the total surface area. The bearing area is the area of the surface cut by a plane at a particular height. The bearing ratio curve shows tp in relation to the profile level. The analysis also calculates Htp, the height between two bearing ratios. Thirdly, the analysis calculates Swedish Height, the bearing ratio when tp1=5% and tp2=90%. Fourthly, the analysis determines core roughness (Rk), reduced peak height (Rpk), reduced valley depth (Rvk), peak material component (Mr1) and valley material component (Mr2). These values are described as follows. Rp— Maximum Profile Peak Height: the height difference between the mean line and the highest point over the evaluation length. Rpk—Reduced Peak Height: the top portion of the surface that will be worn away during the run-in period. Rv—Maximum Profile Valley depth: the height difference between the mean line and the lowest point over the evaluation length. Rvk—Reduced Valley Depth: the lowest portion of the surface that will retain lubricant. Stylus X parameters are calculated as the average of these parameters over 1200 to 1274 lines. Yet other characteristics useful for describing the surface roughness of the optical films according to the present disclosure are described in Examples of U.S. Publication No. 2006-0093809 entitled "Optical Bodies and Methods for Making Optical Bodies", filed on Oct. 29, 2004.

In some exemplary embodiments, optical films constructed according to the present disclosure and having asymmetric structures may be characterized by a Bearing Ratio Rvk of at least about 130 nm, Bearing Ratio Rpk of at least about 200 nm, Stylus Rv of at least about 100 nm, or Stylus Rvk of at least about 50 nm. In other exemplary embodiments, optical films constructed according to the present disclosure and having asymmetric structures may have two or more of any of these characteristics.

In some embodiments of the present disclosure, roughness of at least one optical film surface after the rough strippable boundary layer is removed should be sufficient to produce at least some haze. Amounts of haze suitable for some exemplary embodiments include about 5% to about 95%, about 20% to about 80%, about 50% to about 90%, about 10% to about 30%, and about 35% to 80%. Other amounts of haze may be desired for other applications. In other exemplary embodiments, roughness of the film surface after the rough strippable boundary layer is removed should be sufficient to provide at least some redirection of light or to prevent coupling of the optical film surface to glass or another surface.

Material Compatibility and Methods

Optical bodies of the present disclosure can be made, for example, by coextrusion using a feedblock method. Exemplary manufacturing processes are described, for example, in U.S. Pat. Nos. 5,882,774, 6,352,761 and 6,827,886, and U.S. patent application Ser. Nos. 09/006,288 and 09/229,724, which are hereby incorporated herein by reference. Preferably, the materials of the optical bodies, and in some exemplary embodiments, of the first optical layers, the second optical layers, the optional non-optical layers, and of the strippable boundary layers are chosen to have similar rheological properties (e.g., melt viscosities) so that they can be co-extruded without flow instabilities. The effect of shear forces during coextrusion can be reduced by coextruding one or more outer skin layers when forming the optical bodies of the present disclosure. The materials of the outer skin layer or layers can be selected so that these layers may be removed from the optical body after or prior to any processing step.

The optical body exiting the feedblock manifold can then enter a shaping unit, such as a die. Alternatively, prior to entering the shaping unit, the polymeric stream may be split to form two or more streams that may then be recombined by stacking. This process is usually referred to as multiplication. Exemplary multipliers are described, for example, in U.S. Pat. Nos. 5,094,788 and 5,094,793, incorporated by reference herein. Strippable boundary layers may be added to the optical bodies of the present disclosure during coextrusion of the optical layers or optical film or after coextrusion of the optical layers or optical film, for example, prior to multiplication. In some exemplary embodiments, different strippable boundary layers may be added at different stages of the production process. After the optical body discharged from the shaping unit, it may be cast onto a chill roll, casting wheel or casting drum.

Subsequently, the optical body may be drawn or stretched to produce the finished article. Depending on the type of optical films included into the optical body, the drawing or stretching may be accomplished in one, two or more steps. Where one or more of the optical films included into an optical body of the present disclosure is a reflective polarizer, the optical body may be drawn uniaxially or substantially uniaxially in the transverse direction (TD), while allowed to relax in the machine direction (MD) as well as the normal direction (ND). Suitable methods and apparatuses that can be used to draw such exemplary embodiments of the present disclosure are described in U.S. Application Publication Nos. 2002/0190406, 2002/0180107, 2004/0099992 and 2004/0099993, the disclosures of which are hereby incorporated by reference herein.

Drawing Optical Bodies in Uniaxial or Substantially Uniaxial Manner

Figure 5:
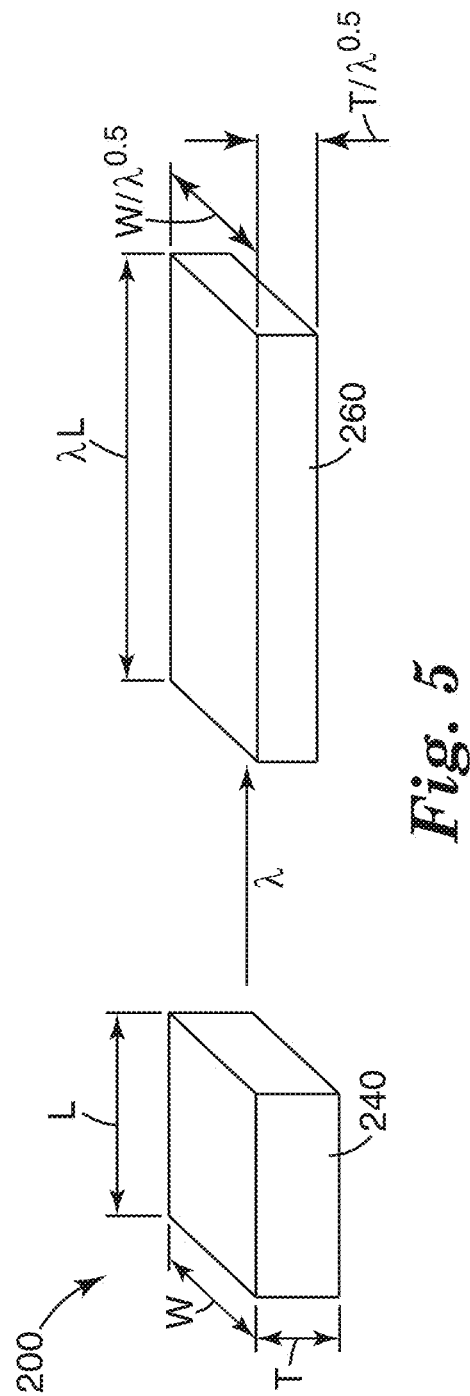
FIG. 5 illustrates uniaxially stretching an optical body.

The processes of the present disclosure may include stretching an optical body that can be described with reference to three mutually orthogonal axes corresponding to the machine direction (MD), the transverse direction (TD), and the normal direction (ND). These axes correspond to the width (W), length (L), and thickness (T) of the optical body 200 illustrated in FIG. 5. The stretching process stretches a region 200 of the optical body from an initial configuration 240 (corresponding to initial configuration 124 of FIG. 6) to a final configuration 260 (corresponding to final configuration 126 of FIG. 6). The machine direction is the general direction along which the film travels through a stretching device, for example, the apparatus illustrated in FIG. 6. The transverse direction (TD) is the second axis within the plane of the film and is orthogonal to the machine direction (MD). The normal direction (ND) is orthogonal to both MD and TD and corresponds generally to the thickness dimension of the polymer film.

Figure 6:
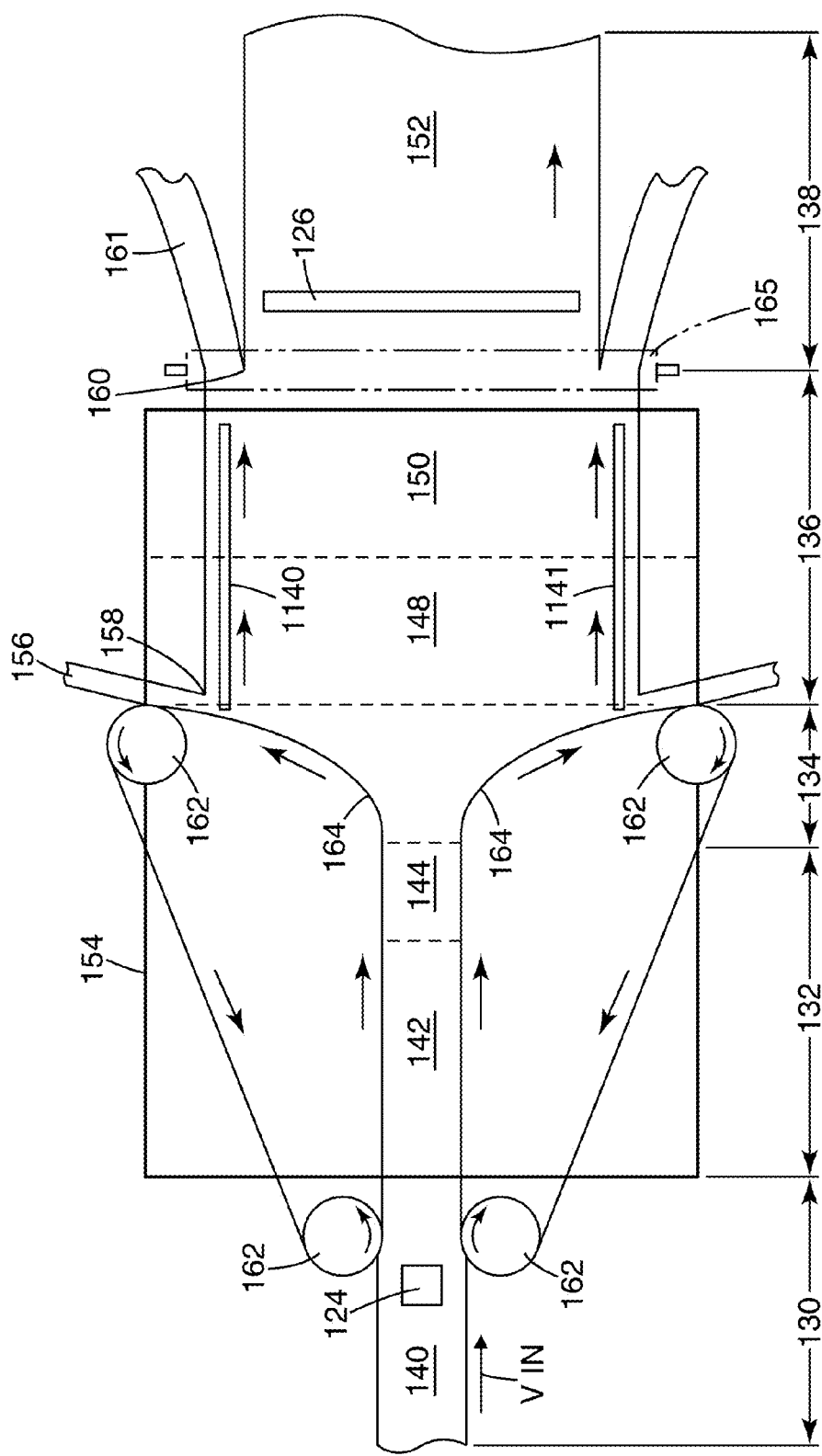
FIG. 6 is a schematic top view of an apparatus that may be used for processing optical bodies according to the present disclosure.

FIG. 6 illustrates one embodiment of a stretching apparatus and method of the present disclosure. The optical body can be provided to the stretching apparatus by any desirable method. For example, the optical body can be produced in a roll or other form and then provided to stretching apparatus. As another example, the stretching apparatus can be configured to receive the optical body from an extruder (if, for example, the optical body is generated by extrusion and ready for stretching after extrusion) or a coater (if, for example, the optical body is generated by coating or is ready for stretching after receiving one or more coated layers) or a laminator (if, for example the optical body is generated by lamination or is ready for stretching after receiving one or more laminated layers).

Generally, an optical body 140 is presented in region 130 to one or more gripping members that are configured and arranged to hold opposing edges of the optical body and convey the optical body along opposing tracks 164 defining predetermined paths. The gripping members (not shown) typically hold the optical body at or near its edges. The portions of the optical body held by the gripping members are often unsuitable for use after stretching so the position of the gripping members is typically selected to provide sufficient grip on the film to permit stretching while controlling the amount of waste material generated by the process.

Gripping members, such as clips, can be directed along the track by, for example, rollers 162 rotating a chain along the track with the gripping members coupled to the chain. The rollers are connected to a driver mechanism that controls the speed and direction of the film as it is conveyed through the stretching apparatus. Rollers can also be used to rotate and control the speed of belt-type gripping members.

Returning to FIG. 6, the apparatus optionally includes a preconditioning region 132 that typically is enclosed by an oven 154 or other apparatus or arrangement to heat the optical body in preparation for stretching. The preconditioning region can include a preheating zone 142, a heat soak zone 144, or both.

The optical film may be stretched in the primary stretching region 134. Typically, within the primary stretching region 134 the optical body is heated or maintained in a heated environment above the glass transition of the polymer(s) of the optical body. Within the primary stretching region 134, the gripping members follow generally diverging tracks to stretch the optical body by a desired amount. The tracks in the primary stretching region and in other regions of the apparatus can be formed using a variety of structures and materials. Outside of the primary stretching region, the tracks are typically substantially linear. The opposing linear tracks can be parallel or can be arranged to be converging or diverging. Within the primary stretching region, the tracks are generally diverging.

In all regions of the stretching apparatus, the tracks can be formed using a series of linear or curvilinear segments that are optionally coupled together. As an alternative or in particular regions or groups of regions, the tracks can be formed as a single continuous construction. In at least some embodiments, the tracks in the primary stretching region are coupled to, but separable from, the tracks of the preceding regions. The tracks 1140, 1141 in the succeeding post-conditioning or removal regions are typically separated from the tracks of the primary stretching region, as illustrated in FIG. 6. In some embodiments, the positions of one or more, and preferably all, of the track segments are adjustable (e.g., pivotable about an axis) so that the overall shape of the tracks can be adjusted if desired. Continuous tracks can also be used through each of the regions.

Typically, the portions of the optical body that were held by the gripping members through the primary stretching region are removed. To maintain a substantially uniaxial draw throughout substantially all of the draw history (as shown in FIG. 6), at the end of the transverse stretch, the rapidly diverging edge portions 156 are preferably severed from the stretched optical body 148 at a slitting point 158. A cut can be made at 158 and flash or unusable portions 156 can be discarded.

Release of the selvages from a continuous gripping mechanism can be done continuously; however, release from discrete gripping mechanisms, such as tenter clips, should preferably be done so that all the material under any given clip is released at once. This discrete release mechanism may cause larger upsets in stress that may be felt by the drawing web upstream. In order to assist the action of the isolating takeaway device, it is preferred to use a continuous selvage separation mechanism in the device, e.g. the "hot" slitting of the selvage from the central portion of a heated, drawn film.

The slitting location is preferably located near enough to the "gripline", e.g. the isolating takeaway point of first effective contact by the gripping members of the takeaway system, to minimize or reduce stress upsets upstream of that point. If the film is slit before the film is gripped by the take-away system, instable takeaway can result, for example, by film "snapback" along TD. The film is thus preferably slit at or downstream of the gripline. Slitting is a fracture process and, as such, typically has a small but natural variation in spatial location. Thus it may be preferred to slit slightly downstream of the gripline to prevent any temporal variations in slitting from occurring upstream of the gripline. If the film is slit substantially downstream from the gripline, the film between the takeaway and boundary trajectory will continue to stretch along TD. Since only this portion of the film is now drawing, it now draws at an amplified draw ratio relative to the boundary trajectory, creating further stress upsets that could propagate upstream, for example, undesirable levels of machine direction tension propagating upstream.

The slitting is preferably mobile and re-positionable so that it can vary with the changes in takeaway positions needed to accommodate variable final transverse draw direction ratio or adjustment of the position of the take-away system. An advantage of this type of slitting system is that the draw ratio can be adjusted while maintaining the draw profile simply by moving the take-away slitting point 158, preferably along MD. A variety of slitting techniques can be used including a heat razor, a hot wire, a laser, a focused beam of intense IR radiation or a focused jet of heated air.

The apparatus shown in FIG. 6 may optionally include a post-conditioning region 136. For example, the optical body may be set in zone 148 and quenched in zone 150. A takeaway system may be used to remove the optical body from the primary stretching region 134. In the illustrated embodiment, this takeaway system is independent of (i.e., isolated from or not directly connected to) the tracks upon which the film was conveyed through the primary stretching region. The takeaway system can use any film conveyance structures such as tracks 1140, 1141 with gripping members such as, for example, opposing sets of belts or tenter clips. In some embodiments, TD shrinkage control can be accomplished using tracks 1140, 1141 that are angled with respect to each other. For example, the tracks of the take-away system can be positioned to follow a slowly converging path (making an angle of no more than about 5°) through at least a portion of the post conditioning region to allow for TD shrinkage of the film with cooling. In other embodiments, the two opposing tracks can be diverging typically at an angle of no more than about 3° although wider angles can be used in some embodiments. This can be useful to increase the MD tension of the film in the primary stretching region to, for example, reduce property non-uniformity such as the variation of principal axes of refractive index across the film.

In some exemplary embodiments, the centerline of the take-away system is angled with respect to the centerline of the film as the film is conveyed through the tracks 164 of the primary stretching region. An angled take-away system, primary stretching zone, or both can be useful to provide films where the principal axis or axes of an property of the film, such as the refractive index axes or tear axis, is angled with respect to the film. In some embodiments, the angle that the take-away system makes with respect to the primary stretching zone is adjustable manually or mechanically using a computer-controlled driver or other control mechanism or both.

The exemplary process of FIG. 6 also includes a removal portion in region 138. Optionally a roller 165 may be used to advance the stretched film 152, but this component may be omitted. Another cut 160 may be made and unused portion 161 may be discarded. Film leaving the take-away system is typically wound on rolls for later use. Alternatively, direct converting may take place after take away.

The paths defined by the opposing tracks affect the stretching of the film in the MD, TD, and ND directions. The stretching (or drawing) transformation can be described as a set of draw ratios: the machine direction draw ratio (MDDR), the transverse direction draw ratio (TDDR), and the normal direction draw ratio (NDDR). When determined with respect to the film, the particular draw ratio is generally defined as the ratio of the current size (for example, length, width, or thickness) of the film in a desired direction (for example, TD, MD, or ND) and the initial size (for example, length, width, or thickness) of the film in that same direction. At any given point in the stretching process, TDDR corresponds to a ratio of the current separation distance of the boundary trajectories, L, and the initial separation distance of the boundary trajectories, $L_0$, at the start of the stretch. In other words, $TDDR=L/L_0=\lambda$. Some useful values of TDDR include about 1.5 to about 7 or more. Exemplary useful values of TDDR include about 2, 4, 5 and 6. Other exemplary useful values of TDDR lie in the ranges of about 4 to about 20, about 4 to about 12, about 4 to about 20, about 4 to about 8 and about 12 to about 20.

As explained in U.S. Patent Publication Nos. 2002/0190406, 2002/0180107, 2004/0099992 and 2004/0099993, substantially uniaxial drawing conditions, with an increase in dimension in the transverse direction, result in TDDR, MDDR, and NDDR approaching $\lambda$, $(\lambda)^{-1/2}$, and $(\lambda)^{-1/2}$, respectively, assuming constant density of the material. A perfectly uniaxially oriented film is one in which $MDDR=(NDDR)^{-1/2}=(TDDR)^{-1/2}$ throughout the draw.

A useful measure of the extent of uniaxial character, U, can be defined as:

$$U = \frac{\frac{1}{MDDR} - 1}{TDDR^{1/2} - 1}$$

For a perfect uniaxial draw, U is one throughout the draw. When U is less than one, the drawing condition is considered "subuniaxial". When U is greater than one, the drawing condition is considered "super-uniaxial". States of U greater than unity represent various levels of over-relaxing. These over-relaxed states produce MD compression from the boundary edge. U can be corrected for changes in density to give $U_f$ according to the following formula:

$$U_f = \frac{\frac{1}{MDDR} - 1}{\left(\frac{TDDR}{\rho_f}\right)^{1/2} - 1}$$

In some exemplary embodiments, the film is drawn in plane (i.e., the boundary trajectories and tracks are coplanar) such as shown in FIG. 6, but non-coplanar stretching trajectories are also within the scope of the present disclosure. With in-plane boundary trajectories, the result for a perfect uniaxial orientation is a pair of mirror symmetric, in-plane, parabolic trajectories diverging away from the in-plane MD centerline.

Uniaxial draw may be maintained along the entire history of the draw as long as the speed of the central point reduces at every point along the central trace from its initial speed by a factor of exactly the square root of the reciprocal of the instantaneous TDDR measured between the corresponding opposing points on the opposing boundary trajectories.

Various factors can affect the ability to achieve uniaxial orientation including, for example, non-uniform thickness of the polymer film, non-uniform heating of the polymer film during stretching, and the application of additional tension (for example, machine direction tension) from, for example, down-web regions of the apparatus. However, in many instances it is not necessary to achieve perfect uniaxial orientation. In some exemplary implementations of the present disclosure, any value of U>0 may be useful. Instead, a minimum or threshold U value or an average U value that is maintained throughout the draw or during a particular portion of the draw can be defined. For example, in some exemplary embodiments, an acceptable minimum/threshold or average U value can be 0.2, 0.5, 0.7, 0.75, 0.8, 0.85, 0.9, or 0.95, as desired, or as needed for a particular application. When a specific value of U is chosen, the equations above provide a specific relationship between MDDR and TDDR, which, when coupled with other relevant considerations, specify a broader class of boundary trajectories that also include the parabolic trajectories for U approaching unity. Trajectories that exhibit values of U below unity for at least a final portion of the draw are referred to herein as sub-parabolic trajectories.

The classes of trajectories described above are illustrative and should not be construed as limiting. A host of trajectory classes are considered to lie within the scope of the present invention. The primary stretching region can contain two or more different zones with different stretching conditions. For example, one trajectory from a first class of trajectories can be selected for an initial stretching zone and another trajectory from the same first class of trajectories or from a different class of trajectories can be selected for each of the subsequent stretching zones.

Although the present disclosure encompasses all boundary trajectories comprising a minimum value of U>0, typical embodiments of the present disclosure include all substantially uniaxial boundary trajectories comprising a minimum value of U of about 0.2, about 0.5, preferably about 0.7, more preferably approximately 0.75, still more preferably about 0.8 and even more preferably about 0.85. The minimum U constraint may be applied over a final portion of the draw defined by a critical TDDR preferably of about 2.5, still more preferably about 2.0 and more preferably about 1.5. In some embodiments, the critical TDDR may be 4, 5 or more. Above a critical TDDR, certain materials, e.g. certain monolithic and multilayer films comprising orientable and birefringent polyesters, may begin to lose their elasticity or capability of snap back, e.g. because of the development of structure such as strain-induced crystallinity.

As an example of acceptable substantially uniaxial applications, the off-angle characteristics of reflective polarizers are strongly impacted by the difference in the MD and ND indices of refraction when TD is the principal mono-axial draw direction. An index difference in MD and ND of 0.08 is acceptable in some applications. A difference of 0.04 is acceptable in others. In more stringent applications, a difference of 0.02 or less is preferred. For example, the extent of uniaxial character of 0.85 is sufficient in many cases to provide an index of refraction difference between the MD and ND directions in polyester systems containing polyethylene naphthalate (PEN) or copolymers of PEN of 0.02 or less at 633 nm for mono-axially transverse drawn films. For some polyester systems, such as polyethylene terephthalate (PET), a lower U value of 0.80 or even 0.75 may be acceptable because of lower intrinsic differences in refractive indices in non-substantially uniaxially drawn films.

For sub-uniaxial draws, the final extent of truly uniaxial character can be used to estimate the level of refractive index matching between the y (MD) and z (ND) directions by the equation $$\Delta n_{yz} = \Delta n_{yz}(U=0) \times (1-U)$$

where $\Delta n_{yz}$ is the difference between the refractive index in the MD direction (i.e., y-direction) and the ND direction (i.e., z-direction) for a value U and $\Delta n_{yz}(U=0)$ is that refractive index difference in a film drawn identically except that MDDR is held at unity throughout the draw. This relationship has been found to be reasonably predictive for polyester systems (including PEN, PET, and copolymers of PEN or PET) used in a variety of optical films. In these polyester systems, $\Delta n_{yz}(U=0)$ is typically about one-half or more the difference $\Delta n_{xy}(U=0)$, which is the refractive difference between the two in-plane directions MD (y-axis) and TD (x-axis). Typical values for $\Delta n_{xy}(U=0)$ range up to about 0.26 at 633 nm. Typical values for $\Delta n_{yz}(U=0)$ range up to 0.15 at 633 nm. For example, a 90/10 coPEN, i.e. a copolyester comprising about 90% PEN-like repeat units and 10% PET-like repeat units, has a typical value at high extension of about 0.14 at 633 nm. Films comprising this 90/10 coPEN with values of U of 0.75, 0.88 and 0.97 as measured by actual film draw ratios with corresponding values of $\Delta n_{yz}$ of 0.02, 0.01 and 0.003 at 633 nm have been made according to the methods of the present invention.

A variety of other boundary trajectories are available when U is subuniaxial at the end of the stretching period. In particular, useful boundary trajectories include coplanar trajectories where TDDR is at least 5, U is at least 0.7 over a final portion of the stretch after achieving a TDDR of 2.5, and U is less than 1 at the end of the stretch. Other useful trajectories include coplanar and non-coplanar trajectories where TDDR is at least 7, U is at least 0.7 over a final portion of the stretch after achieving a TDDR of 2.5, and U is less than 1 at the end of the stretch. Useful trajectories also include coplanar and non-coplanar trajectories where TDDR is at least 6.5, U is at least 0.8 over a final portion of the stretch after achieving a TDDR of 2.5, and U is less than 1 at the end of the stretch. Useful trajectories include coplanar and non-coplanar trajectories where TDDR is at least 6, U is at least 0.9 over a final portion of the stretch after achieving a TDDR of 2.5, and U is less than 1 at the end of the stretch. Useful trajectories also include coplanar and non-coplanar trajectories where TDDR is at least 7 and U is at least 0.85 over a final portion of the stretch after achieving a TDDR of 2.5.

Generally, various methods may be used for forming and processing optical bodies of the present disclosure, which may include extrusion blending, coextrusion, film casting and quenching, lamination and orientation, such as uniaxial and biaxial (balanced or unbalanced) stretching. As stated above, the optical bodies can take on various configurations, and thus the methods vary depending upon the configuration and the desired properties of the final optical body.

EXAMPLES

Exemplary embodiments of the present disclosure can be constructed as described in detail in the following examples.

in the rough strippable layers of the order of about 1 to about 3 percent were sufficient to impart haze in the range of about 60% to about 95%, as measured using a Haze-Guard Plus haze meter from BYK-Gardner in accordance with typical procedures described in ASTM D1003-00.

Several different rough strippable layer materials were evaluated using laboratory-scale co-extrusion equipment. Several constructions produced are shown in Table 1. The ε-caprolactone polymer used in this example was TONE™ P-787 available from Dow Chemical Company. The P-787 polymer has a melting temperature of 60° C. and a crystallization temperature of 18° C. Crystallization data from Dow Chemical Company indicates that the TONE™ polymers, as molded, exhibit approximately 50 percent crystallinity. In this experiment, cast webs were prepared with rough strippable layers containing about 0, 1, 3, and 5 percent of TONE™ P-787 blended with Finaplas 1571 syndiotactic polypropylene resin from Atofina, now Total Petrochemicals, Inc. The optical film was comprised of Tyril™ 100 styrene acrylonitrile (SAN) copolymer from Dow Chemical Company.

TABLE 1

Summary of Cast Web Constructions

| Continuous Phase | Disperse Phase | Disperse Phase Concentration (wt %) | Optical Film Material | Optical Film Haze (%) | Ra (nm) | Rq (nm) | Rz (μm) |
|---|---|---|---|---|---|---|---|
| Finaplas 1571 | None | 0 | Tyril 100 SAN | 0.5 | 12 | 16 | 0.5 |
| Finaplas 1571 | TONE ™ P-787 | 1 | Tyril 100 SAN | 63 | 181 | 345 | 5.7 |
| Finaplas 1571 | TONE ™ P-787 | 3 | Tyril 100 SAN | 95 | 579 | 887 | 9.3 |
| Finaplas 1571 | TONE ™ P-787 | 5 | Tyril 100 SAN | 95 | NM | NM | NM |

1. Two-Polymer Rough Strippable Skin Layers

Example 1

A rough surface was produced on an optical film by cast co-extrusion of a rough strippable layer onto an optical film during a film production process. The rough strippable layer included a blend of two mechanically miscible polymers, where one of the polymers was a homopolymer of ε-caprolactone. When the co-extruded cast web was stretched in a tenter oven during the optical film production process, the ε-caprolactone polymer in the rough strippable layers imparted a surface texture onto the optical film. This texture became apparent after the strippable layer was stripped away from the optical film.

The density and roughness of the texture of the rough surface were controlled by the percentage of ε-caprolactone homopolymer blended into the rough strippable layers, the degree of mixing in the extruder, quenching conditions during formation of the cast web, the cast web reheating temperature, the tenter oven stretch ratio, and tenter oven residence time. Percentages of ε-caprolactone homopolymer Some of these cast web samples were stretched using a batch stretcher, under the stretching conditions shown in Table 2.

TABLE 2

Summary of Stretching Conditions

| Draw Ratio | 1 × 6 (MD × TD) |
| Heating oven | 140° C. @ 75% fan speed |
| Preheat time | 150 seconds |

The stretched optical bodies appeared relatively transparent, for example, for about 1% of TONE™ P-787 in the Finaplas 1571 with both rough strippable layers adhered to the optical film the haze from the optical body was about 11%. However, when the rough strippable layers were removed from the film surfaces, the underlying SAN layers exhibited significant haze, as measured using a BYK-Gardner Hazegard haze meter. The haze levels and some surface roughness data for the Tyril 100 SAN layers with rough strippable layers containing different amounts of TONE™ P-787 in the Finaplas 1571 polypropylene are summarized in Table 1.

Some of the textured SAN copolymer films as well as the strippable layers used to impart the textures were subjected to scanning electron microscopy (SEM). The SEM photomicrographs in this and the following example were prepared by removing a section from the optical film sample and the corresponding rough strippable layer. The mating surfaces were mounted on aluminum stubs. The specimens were sputter coated with gold and were examined using a Model XL30 Scanning Electron Microscope, manufactured by FEI, operating in high-vacuum mode. All micrographs were taken at a viewing angle of 45° off the surface of the stub. Representative images were photomicrographed; each photomicrograph includes a length bar indicating the size scale of the features.

Figure 7A:
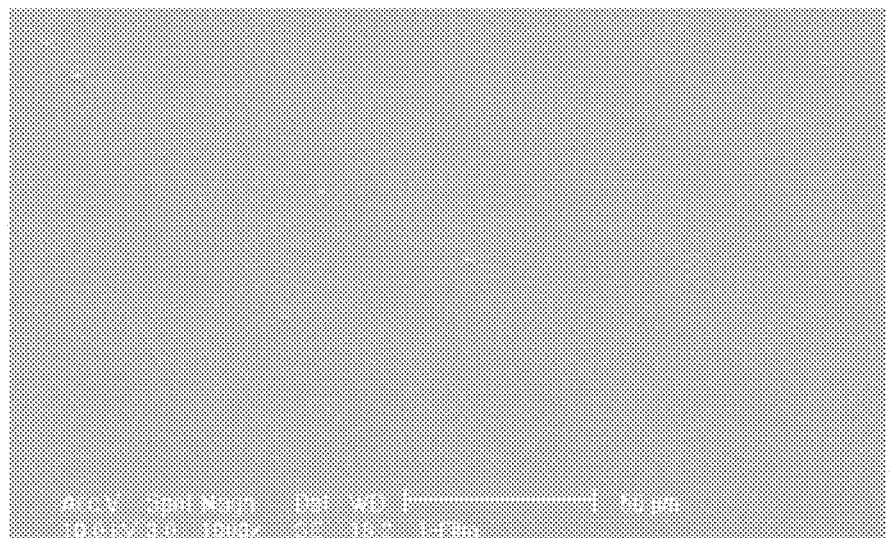
FIG. 7A shows a scanning electron microscopy (SEM) photomicrograph of a styrene acrylonitrile (SAN) film after the removal of rough strippable skin layers containing about 0% of TONE™ P-787 polycaprolactone (P-787)
Figure 7B:
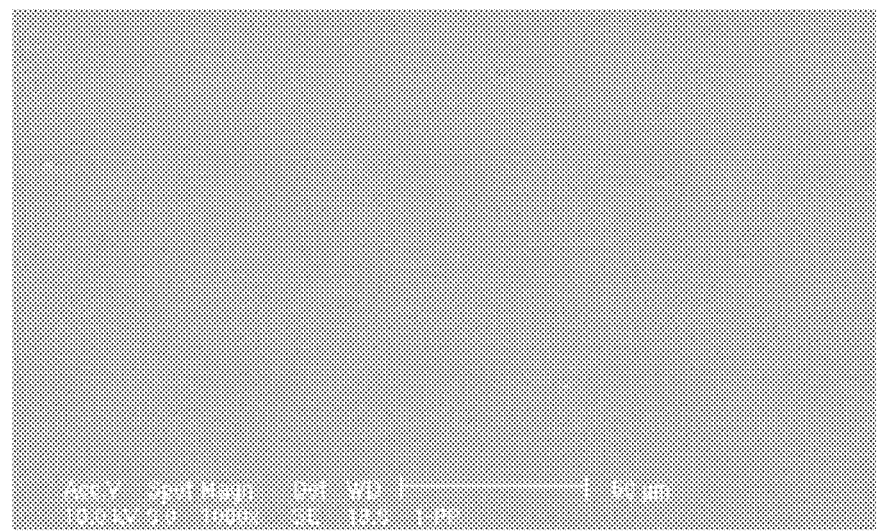
FIG. 7B shows an SEM photomicrograph of a rough strippable skin layer containing about 0% of P-787.
Figure 7C:
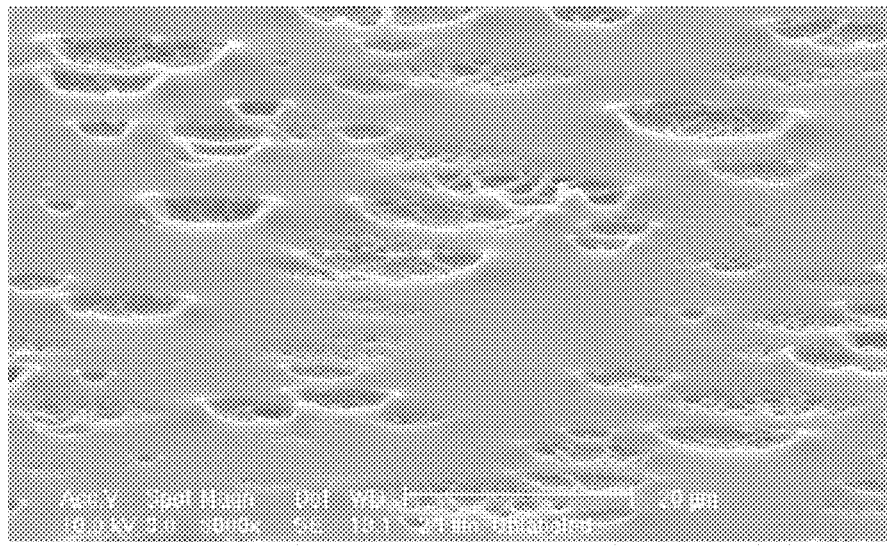
FIG. 7C shows an SEM photomicrograph of a SAN film after the removal of rough strippable skin layers containing about 1% of P-787.
Figure 7D:
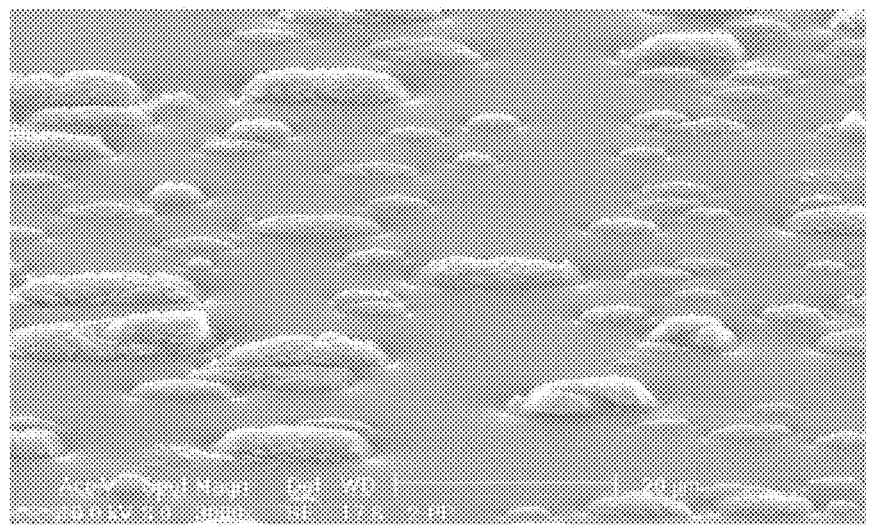
FIG. 7D shows an SEM photomicrograph of a rough strippable skin layer containing about 1% of P-787.
Figure 7G:
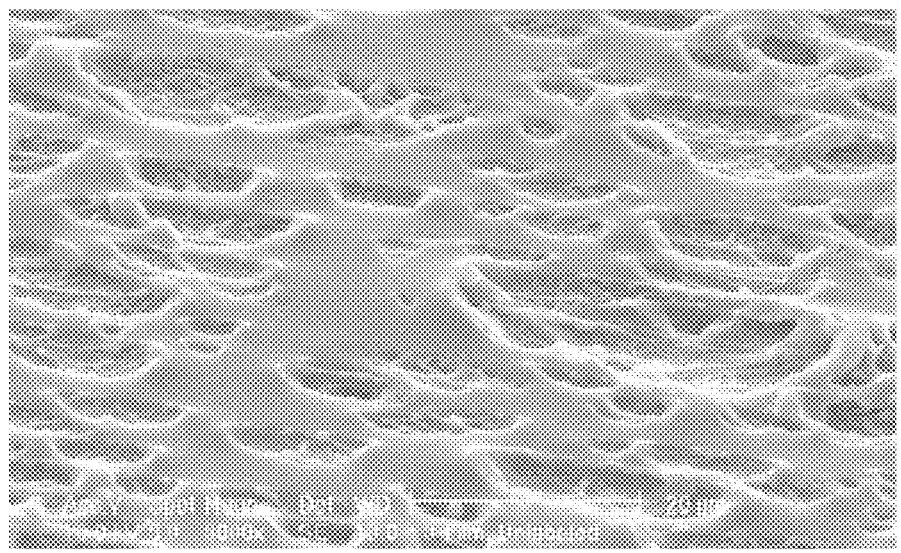
FIG. 7G shows an SEM photomicrograph of a SAN film after the removal of rough strippable skin layers containing about 3% of TONE™ P-787 polycaprolactone.
Figure 7H:
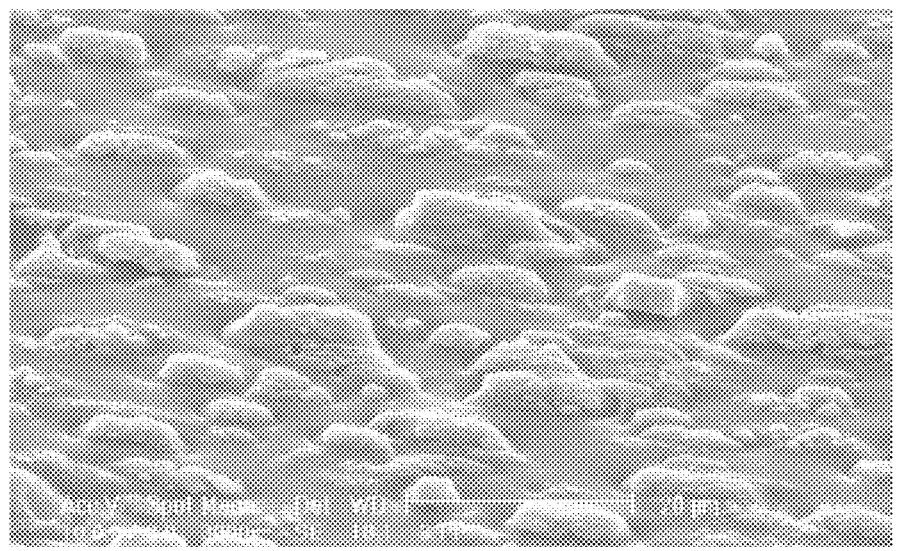
FIG. 7H shows an SEM photomicrograph of a rough strippable skin layer containing about 3% of P-787.

FIG. 7A shows an SEM photomicrograph of a SAN film after the removal of rough strippable layers containing about 0% of P-787. FIG. 7B shows an SEM photomicrograph of the rough strippable layer containing about 0% of P-787 used to impart the texture shown in FIG. 7A. FIG. 7C shows an SEM photomicrograph of a SAN film after the removal of rough strippable layers containing about 1% of P-787. FIG. 7D shows an SEM photomicrograph of a rough strippable layer containing about 1% of P-787 used to impart the texture of FIG. 7C. FIG. 7G shows an SEM photomicrograph of a SAN film after the removal of the rough strippable layers containing about 3% of P-787. FIG. 7H shows an SEM photomicrograph of a rough strippable layer containing about 3% of P-787.

Example 2

A multi-layer reflective polarizer was constructed with first optical layers comprising PEN (polyethylene naphthalate) and second optical layers comprising coPEN (copolyethylene naphthalate). The PEN and coPEN were coextruded through a multi-layer melt manifold and multiplier to form 825 alternating first and second optical layers. This multi-layer film also contained two internal and two external protective layers of the same coPEN as the second optical layers for a total of 829 layers. In addition, two external underskin layers were coextruded on both sides of the optical layer stack. The underskin layers were each about 25 micrometers thick and were comprised of styrene-acrylonitrile copolymer (SAN) (Tyril Crystone 880B from The Dow Chemical Company). Rough strippable layers comprised of a blend of 99.5 weight percent syndiotactic polypropylene (Finaplas 1571 from Atofina, now Total Petrochemicals, Inc.) and 0.5 weight percent of ϵ-caprolactone polymer (Tone P-787 from The Dow Chemical Company) were formed over the SAN layers. An extruded cast web of the above construction was then heated in a tentering oven with air at 143° C. for 120 seconds and then uniaxially oriented at a 5.4:1 draw ratio.

Figure 8A:
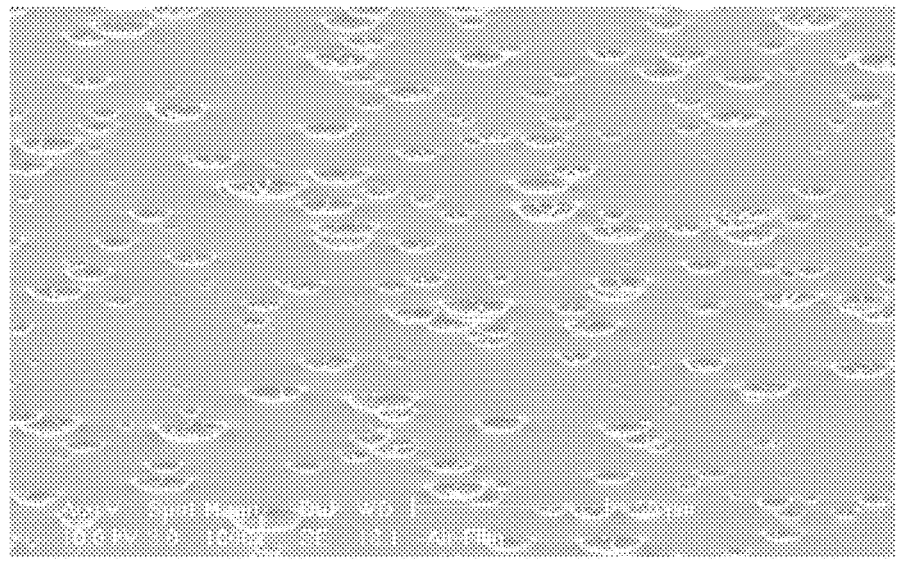
FIG. 8A shows an SEM photomicrograph of the air side optical film surface after the removal of rough strippable skin layers containing about 0.5% of P-787.
Figure 8B:
FIG. 8B shows an SEM photomicrograph of the air side of the rough strippable skin layer containing about 0.5% of P-787 used to impart the texture shown in FIG. 8A.
Figure 8C:
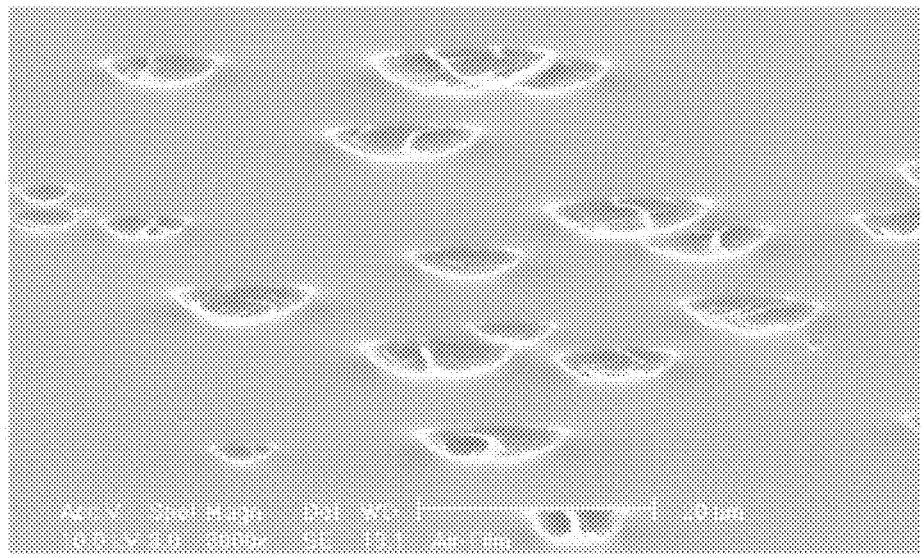
FIG. 8C shows an enlarged SEM photomicrograph of the air side optical film surface shown in FIG. 8A.
Figure 8D:
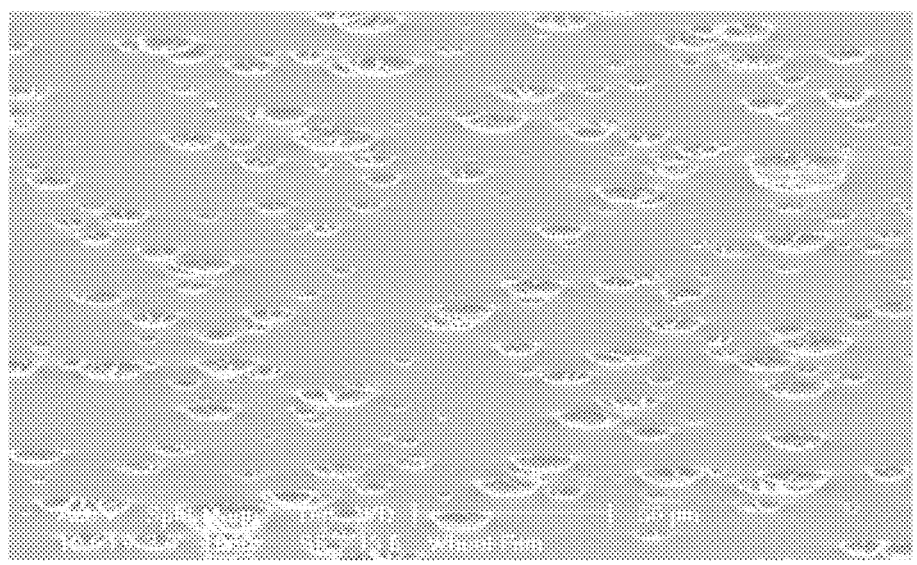
FIG. 8D shows an SEM photomicrograph of the wheel side optical film surface after the removal of rough strippable skin layers containing about 0.5% of P-787.
Figure 8E:
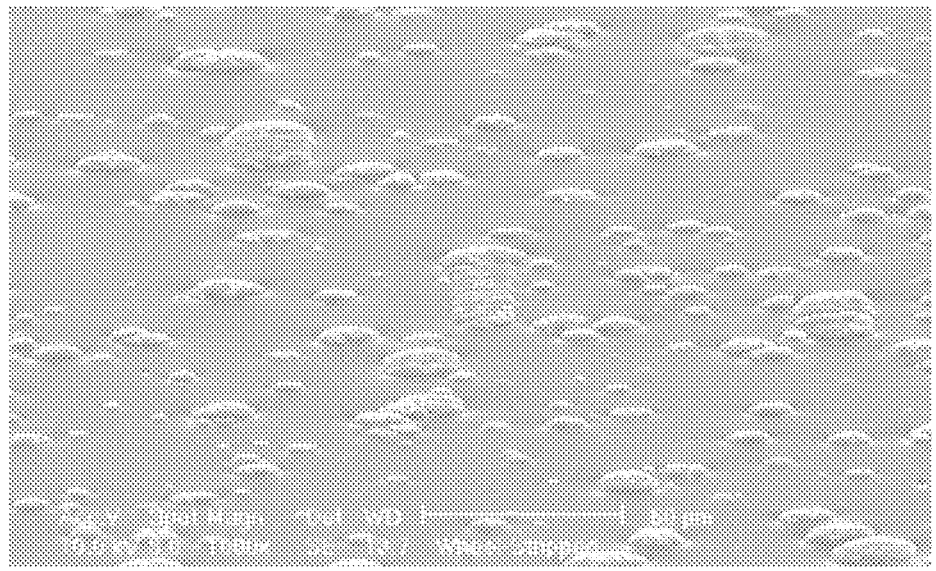
FIG. 8E shows an SEM photomicrograph of the wheel side rough strippable skin layer containing about 0.5% of P-787 used to impart the texture of FIG. 8D.
Figure 8F:
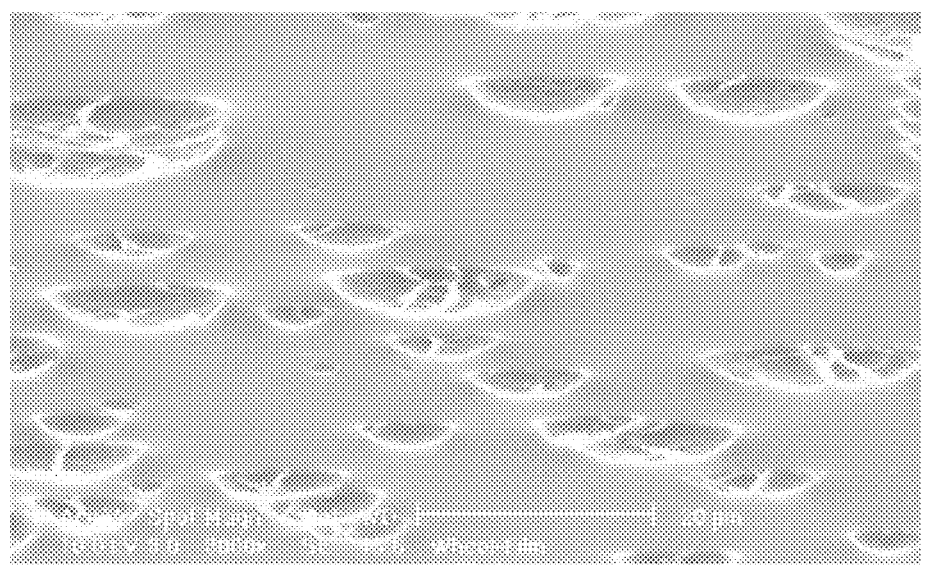
FIG. 8F shows an enlarged SEM photomicrograph of the wheel side optical film surface shown in FIG. 8D.

When the rough strippable layers were removed from the optical film, the optical film exhibited a 40% haze level. Scanning electron microscopy (SEM) photomicrographs of the surfaces of the optical film on both the "air" side (referring to the casting wheel configuration) and the "wheel" side of the film and of the removed strippable layers are shown in FIGS. 8A-F. FIG. 8A shows an SEM photomicrograph of the air side optical film surface after the removal of rough strippable layers containing about 0.5% of P-787. FIG. 8B shows an SEM photomicrograph of the air side of the rough strippable layer containing about 0.5% of P-787 used to impart the texture shown in FIG. 8A. FIG. 8C shows an enlarged SEM photomicrograph of the air side optical film surface shown in FIG. 8A. FIG. 8D shows an SEM photomicrograph of the wheel side optical film surface after the removal of rough strippable layers containing about 0.5% of P-787. FIG. 8E shows an SEM photomicrograph of the wheel side rough strippable layer containing about 0.5% of P-787 used to impart the texture of FIG. 8D. FIG. 8F shows an enlarged SEM photomicrograph of the wheel side optical film surface shown in FIG. 8D.

Some exemplary features on the film of Example 2 were found to have exemplary major dimensions of about 12 microns to about 15 microns and exemplary minor dimensions of about 3 microns to about 3.5 microns minor dimension with typical aspect ratios of about 4:1 to about 5:1. The exemplary major and minor dimensions were determined from the SEM micrographs. Typical feature dimensions presented in the table below were determined using a Wyko optical profiler Model NT3300 from Veeco Instruments.

The force needed to peel the rough strippable layer from the optical film was determined using the method described above. The sample strip was cut with the machine direction (MD) of the optical film parallel to the length direction of the strip. The typical peel force for the strippable layer of this example was determined to be about 3.5 grams per inch. The value of the peel adhesion force may be influenced by the stiffness and hence, by the thickness and material properties of the rough strippable layer. For the present example, the strippable layer thickness was approximately 0.75 mil. Different ranges of peel force values could be obtained if the rough strippable layer thickness were different.

The 0.5% P-787 sample of this example as well as the 1% and 3% P-787 samples from Example 1 above were also analyzed using a WYKO NT-3300 optical profiling system form Veeco Instruments. Additional analyses of the captured images were carried out using ADCIS Aphelion™ image analysis software and traditional images analysis techniques. The samples for interferometry were prepared by vacuum sputtering a thin metal coat onto the surface to increase the reflectivity. The summary of the topographic analysis of the samples described above is presented in Table 3. The surface area index shown in Table 3 is defined as the ratio of the measured surface area to the projected area (250 μm×250 μm).

TABLE 3

|  | 0.5% sample | 1% sample | 3% sample |
| --- | --- | --- | --- |
| % Area More Than 0.2 μm Below the Mean Surface | 22.5 +/− 2.5 | 31.5 +/− 1.6 | 49.4 +/− 0.6 |
| % Area More Than 0.3 μm Below the Mean Surface | 14.2 +/− 1.1 | 20.1 +/− 1.3 | 41.6 +/− 0.5 |
| Negative Volume in μm3 | 6581 +/− 504 | 8224 +/− 537 | 20856 +/− 903 |
| Surface Area Index | 1.145 +/− .019 | 1.128 +/− .006 | 1.453 +/− .020 |
| Stylus X Rv in μm | −1889 +/− 208 | −1420 +− 42 | −2613 +− 88 |
| Stylus X Rvm in μm | −994 +/− 90 | −916 +/− 39 | −1843 +/− 36 |
| Stylus X Number Valid Lines | 6261 | 5724 | 5298 |
| Stylus X Long Cutoff Freq in μm | 60 | 60 | 60 |
| Stylus X Assessment Length in μm | 240 | 240 | 240 |
| Stylus X Num Sample Lengths | 4 | 4 | 4 |

The summary of image analysis of the same three samples is presented in Table 4. In particular, the table mainly presents the averages and standard deviations for measurements of the individual structures (e.g., depressions) in the optical film surface. The major axis in this table is the orientation of the major directions of the best fit ellipses to the surface structures (e.g., depressions). The samples were aligned so that the major dimensions were generally parallel to the reference direction. Notably, the standard deviations show a relatively well aligned arrangement.

TABLE 4

|  |  | Area in μm2 | Aspect Ratio (min/max) | Major Axis in degrees | Height in μm | Width in μm | ECD in μm | Number per mm2 |
|---|---|---|---|---|---|---|---|---|
| 0.5% | Average | 29.6 | 0.43 | −0.28 | 3.97 | 8.71 | 5.08 | 4307 |
|  | Std. Dev. | 1.8 | 0.02 | 1.87 | 0.26 | 0.34 | 0.26 | 238 |
| 1% | Average | 22.7 | 0.32 | −0.98 | 2.94 | 8.42 | 4.24 | 9946 |
|  | Std. Dev. | 2.5 | 0.01 | 1.16 | 0.22 | 0.50 | 0.26 | 308 |
| 3% | Average | 19.3 | 0.34 | −3.72 | 2.77 | 6.83 | 3.54 | 15477 |
|  | Std. Dev. | 2.7 | 0.01 | 0.79 | 0.26 | 0.49 | 0.37 | 916 |

Average sizes of the major dimensions measured for the 0.5, 1 and 3% samples were found to be respectively 8.71+/−0.34, 8.42+/−0.50 and 6.83+/−0.49. Average sizes of the minor dimensions measured for the 0.5, 1 and 3% samples were found to be respectively 3.97+/−0.26, 2.94+/−0.22 and 2.77+/−0.26.

Example 3

A multi-layer optical film containing 896 layers was made via co-extrusion and orientation processes where PET was the first, high index material and coPET was the second, low index material. A feedblock method (such as that described in U.S. Pat. No. 3,801,429, incorporated by reference herein) was used to generate about 224 layers with a layer thickness range sufficient to produce an optical reflection band with a fractional bandwidth of about 30%. An approximate linear gradient in layer thickness was produced by the feedblock for each material, with the ratio of thickest to thinnest layers being about 1.30.

Isotropic copolyester (referred to as "coPET") used to form the low index optical layers was synthesized in a batch reactor with the following raw material charge: 79.2 kg dimethyl terephthalate, 31.4 kg dimethyl cyclohexane dicarboxylate, 54 kg cyclohexane dimethanol, 59.2 kg ethylene glycol, 16.5 kg neopentyl glycol, 1.2 kg trimethylol propane, 49.6 g zinc acetate, 20.7 g cobalt acetate, and 80 g antimony triacetate. Under pressure of 0.20 MPa, this mixture was heated to 254° C. while removing methanol. After 35.4 kg of methanol was removed, 69.2 g of triethyl phosphonoacetate was charged to the reactor and then the pressure was gradually reduced to 133 Pa while heating to 285° C. The condensation reaction by-product, ethylene glycol, was continuously removed until a polymer with an intrinsic viscosity of 0.64 dL/g, as measured in 60/40 wt. % phenol/o-dichlorobenzene, was produced. It had a Tg of 67° C. as measured by DSC using ASTM D3418 with a scan rate of 20° C./min and removal of the thermal history by taking the second heat Tg.

PET with an intrinsic viscosity (IV) of 0.60 dl/g was delivered to the feedblock by one extruder at a rate of 50 kg/hr and coPET-F was delivered to the feedblock by another extruder at a rate of 43 kg/hr. These melt streams were directed to the feedblock to create 224 alternating layers of PET and coPET-F with the two outside underskin layers of PET. The underskin layers were much thicker than the optical layers, the former containing about 20% of the total melt-flow of the PET (10% for each side).

The material stream then passed through an asymmetric two-time multiplier (such as described, for example in U.S. Pat. Nos. 5,094,788 and 5,094,793, incorporated by reference herein). The multiplier thickness ratio was about 1.25:1. Each set of 224 layers has the approximate layer thickness profile created by the feedblock, with the overall thickness factors determined by the multiplier and film extruder rates. The material stream then passed through an additional two times multiplier with the thickness ratio of about 1.55:1.

After the multipliers, rough strippable layers comprising a 50:50 blend of polypropylene copolymer (Atofina, now Total Petrochemicals, Inc. product PP8650) and polyethylene octene copolymer (Affinity 1450) were added to the melt stream. This immiscible polymer blend was fed to a third extruder at a rate of 22.7 kg/hr. The multi-layered melt stream then passed through a film die and onto a water-cooled casting wheel. The inlet water temperature of the casting wheel was 8° C. A high voltage pinning system was used to pin the extrudate to the casting wheel. The pinning wire was about 0.1 mm thick, and a voltage of 5.2 kV was applied. The pinning wire was positioned manually by an operator about 3 to 5 mm from the web at a point of contact with the casting wheel to obtain a cast film with smooth appearance. The casting wheel speed was 22.4 fpm to produce a cast film approximately 17 mils thick. The rough strippable layer extruder and associated melt process equipment was maintained at 254 C. The PET and CoPET extruders, feedblock, strippable-layer modules, multiplier, die, and associated melt process equipment were maintained at 266 C.

A 17.8 cm by 25.4 cm sample of the multi-layer film was fed into a standard film tenter for uniaxial stretching. The cast web piece was gripped by the tenter clips on the edges, as it is customary for continuously oriented films. The film near the clips could not contract in the machine direction, because the spacing between the tenter clips was fixed. However, because the web was not constrained on the leading edge or trailing edge, it contracted in the machine direction, the contraction being larger with the increased distance from the clips. With an aspect ratio large enough, the center of the sample was able to fully contract for a true uniaxial orientation, i.e., where the contraction is equal to the square root of the transverse direction stretch ratio. The sample was stretched in the TD, with initial clip distance of 20.3 cm to final clip distance of 142 cm, and then allowed to relax at the stretch temperature to 129 cm. The stretching was done at a tenter temperature of 99° C. with a stretch ratio of 6:1 and a stretch rate of 5 cm/s. The initial to final part size was not the same as the stretch ratio (6:1), because of the unstretched material within the tenter clips.

Figure 9:
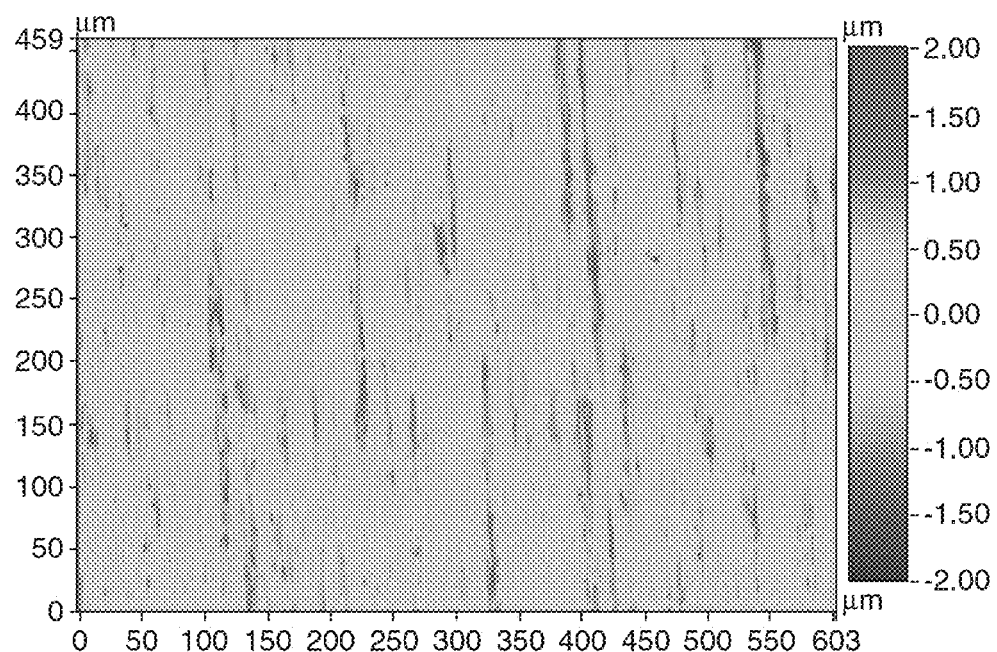
FIG. 9 shows a surface roughness analysis using optical interferometry of an example optical film.
Figure 10:
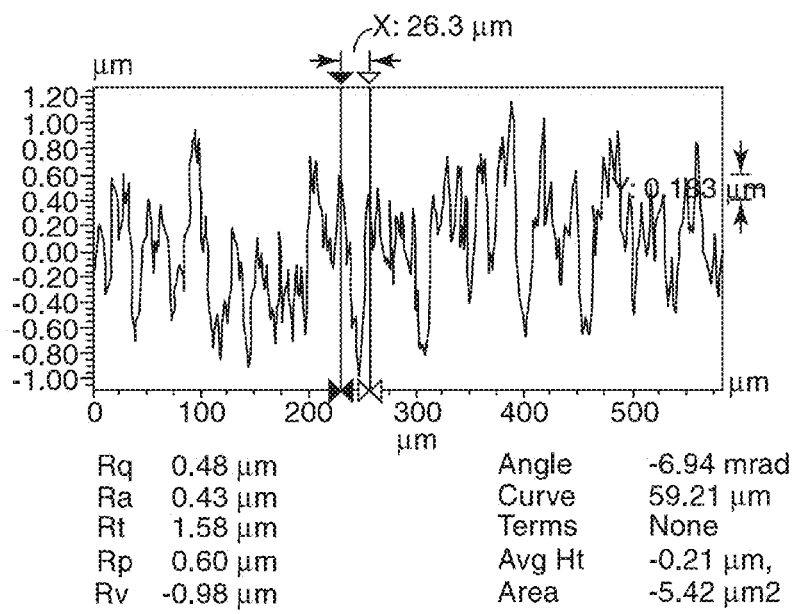
FIG. 10 shows a surface roughness analysis using optical interferometry of an example optical film shown in FIG. 9.
Figure 11:
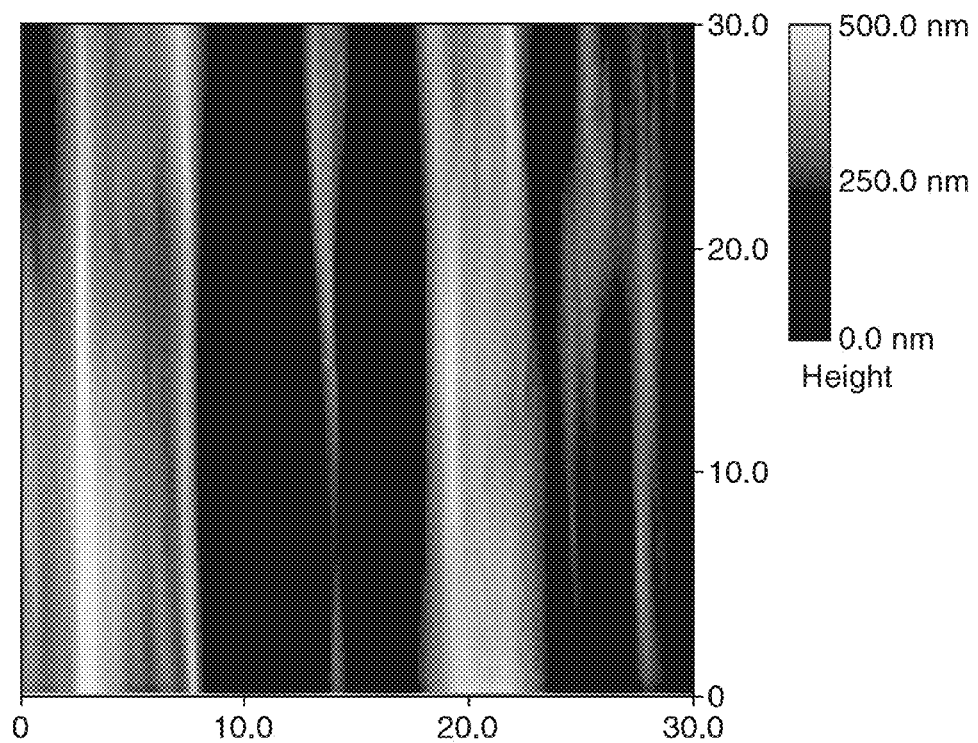
FIG. 11 shows a surface roughness analysis using optical interferometry of an example optical film.
Figure 12:
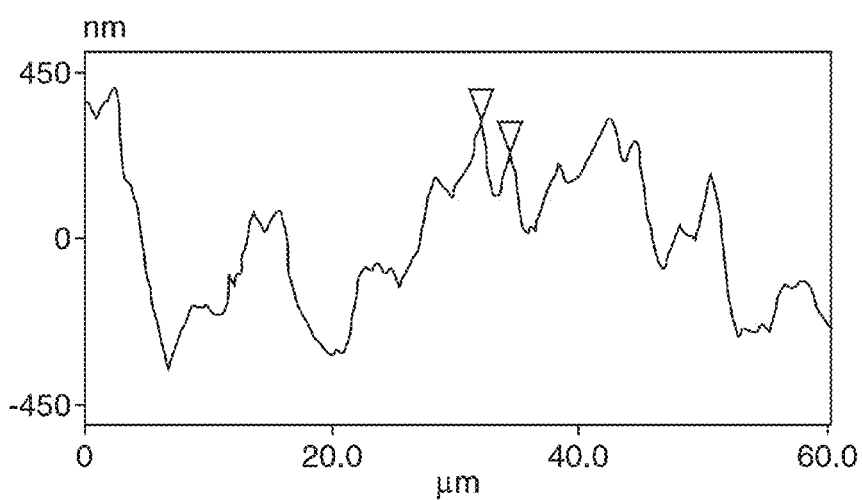
FIG. 12 shows a surface roughness analysis using optical interferometry of an example optical film shown in FIG. 11.

Upon stretching in the tenter, the strippable layers became hazy and rough. After stripping away the strippable layers, the outer surface of the underlying multi-layer reflective polarizer was rough with elongated structures similar and corresponding to the removed strippable layers. Haze of the resulting film was measured with a BYK-Gardner haze meter to be about 30%. When the textured optical film was placed on top of a recycling cube of diffuse light, the increase in brightness was measured to be about 67% higher than without the optical film. The recycling cube can be fabricated using a spot photometer and a suitable backlight with a polarizer placed between the two so that only one polarization of light from the backlight is measured by the photometer. Surface roughness of this film was measured with both AFM (Atomic Force Microscopy) and Wyko (optical interferometry in VSI mode). Wyko analysis measured a rough surface structure with Rq=435 nm, as shown in FIGS. 9 and 10. Alternatively, AFM analysis measured a rough surface structure with Rms=2.74 nm and Ra=1.84 nm, as shown in FIGS. 11 and 12. An approximate size of a typical minor dimension of the surface features produced in this examples was found to be characterized by a minor dimension of about 5 microns and by a major dimension of about 40 microns. However, some features showed much greater major dimensions and some even extended across the sample under test. Table 5 contains various surface characterizations of the exemplary embodiment described in Example 3. "BR" refers to Bearing Ratio and "SX" refers to Stylus X. The top row of data represents average values and the second row of data represents standard deviations.

TABLE 5

| BR Rvk | BR Rpk | Pos. Vol. | Neg. Vol. | Vol. | SArea Index | SX Rp | SX Rpk | SX Rv | SX Rvk |
|---|---|---|---|---|---|---|---|---|---|
| 490.87 | 406.87 | 34599.57 | 45612.61 | 187737.71 | 1.15 | 756.81 | 595.09 | 179.94 | 106.27 |
| 57.11 | 50.00 | 4184.44 | 3030.78 | 21128.58 | 0.01 | 144.06 | 211.95 | 17.70 | 33.73 |

Example 4

A multi-layer reflective polarizer was constructed with first optical layers comprising PEN (polyethylene naphthalate) and second optical layers comprising coPEN (copolyethylene naphthalate) using a low crystallinity polypropylene and amorphous polyester film. The PEN and coPEN were coextruded through a multi-layer melt manifold and multiplier to form 825 alternating first and second optical layers. This multi-layer film also contained two internal and two external underskin layers of the same coPEN as the second optical layers for a total of 829 layers. In addition, two underskin layers were coextruded on both sides of the optical layer stack. These underskin layers were about 18 micrometers thick and comprised of PMMA (VO44 from Atofina, now Total Petrochemicals, Inc.).

Figure 13:
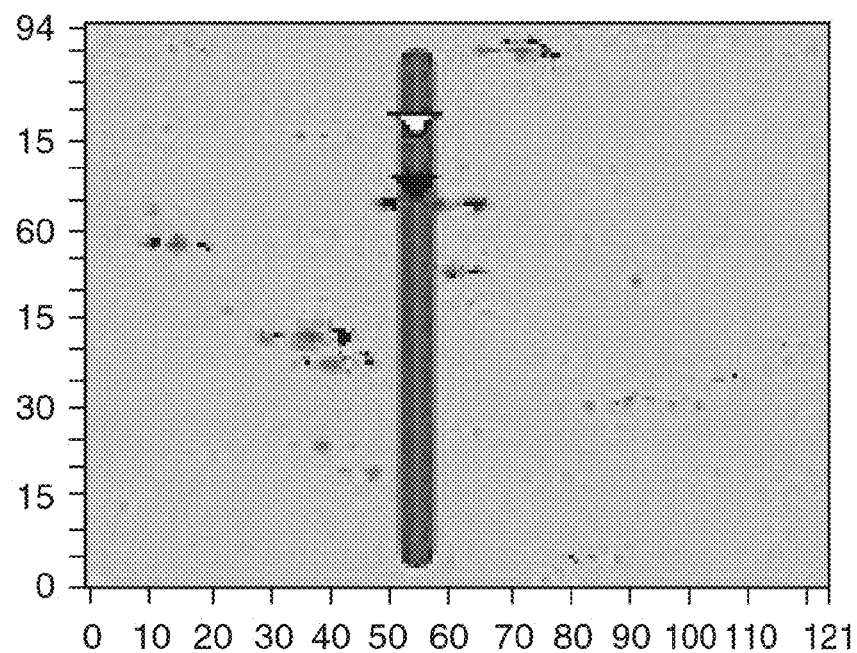
FIG. 13 shows a surface roughness analysis using optical interferometry of an example optical film.

Rough strippable layers formed from an immiscible polymer blend of 96 wt % syndiotactic polypropylene (PP1571 from Atofina, now Total Petrochemicals, Inc.) and 4 wt % anti-static polymer (Pelestat 300 from Sanyo Chemical Industries) were formed over the PMMA blend structural layers. An extruded cast web of the above construction was then heated in a tentering oven with air at 150° C. for 45 seconds and then uniaxially oriented at a 6:1 draw ratio. The resulting reflective polarizer was transparent with the immiscible polymer blend strippable layers intact. When these rough strippable layers were removed, however, the film became hazy due to surface roughness imparted into the PMMA layers by the immiscible polymer blend. Haze of about 39.8% was measured with a BYK-Gardner haze meter. Surface analysis of this film is shown in FIG. 13.

Example 5

Figure 14:
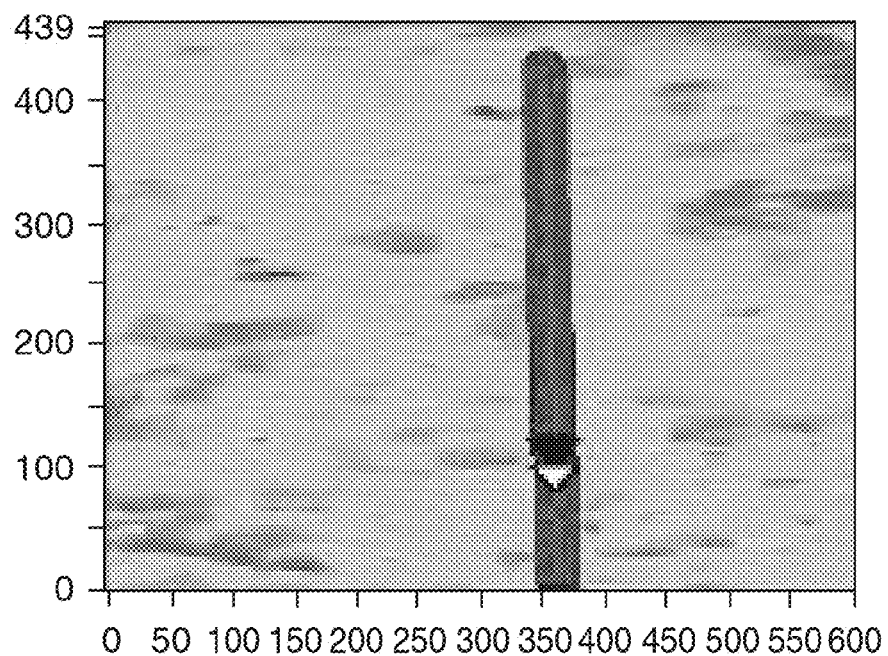
FIG. 14 shows a surface roughness analysis using optical interferometry of an example optical film.

An optical body was produced by coextruding an immiscible blend of 80 wt % syndiotactic polypropylene (P1571 from Atofina, now Total Petrochemicals, Inc.) and 20 wt % high density polyethylene (Chevron HDPE 9640) as rough strippable layers on the outside of SAN (Tyril 880 from DOW) optical film. This rough strippable layer represented a combination of low crystallinity polypropylene along with highly crystalline polyethylene. The resulting 3-layer cast web was preheated for 50 seconds at 145° C. and uniaxially oriented 6:1 at 100%/s draw rate. After removing the strippable immiscible blend strippable layer, the core SAN layer was 6.8 mils thick. Haze was measured with a BYK-Gardner haze meter to be about 7.1%. Surface roughness was analyzed with a Wyko interferometer to have an Rq of 130 nm and a Ra 120 nm as shown in FIG. 14.

Example 6

Figure 15:
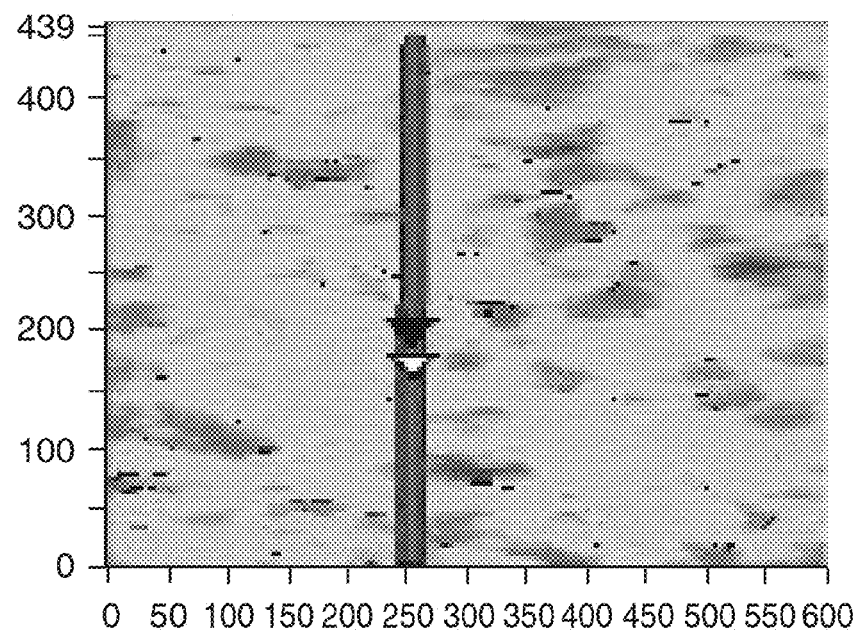
FIG. 15 shows a surface roughness analysis using optical interferometry of an example optical film.

A multi-layer optical film was produced by coextruding an immiscible blend of 60 wt % syndiotactic polypropylene (P1571 from Atofina, now Total Petrochemicals, Inc.) and 40 wt % high density polyethylene (Chevron-Philips HDPE 9640) as rough strippable layers on the outside of SAN (Tyril 880 from Dow Chemical Company). This rough strippable layer represented a combination of low crystallinity polypropylene along with highly crystalline polyethylene. The resulting 3-layer cast web was preheated for 50 seconds at 145° C. and uniaxially oriented 6:1 at 100% per second draw rate. After removing the strippable immiscible blend strippable layer, the core SAN layer was 5.9 mils thick. Haze was measured with a BYK-Gardner haze meter to be about 34.5%. Surface roughness was analyzed with a Wyko interferometer to have an Rq of 380 nm and a Ra 340 nm as shown in FIG. 15.

Example 7

Figure 16:
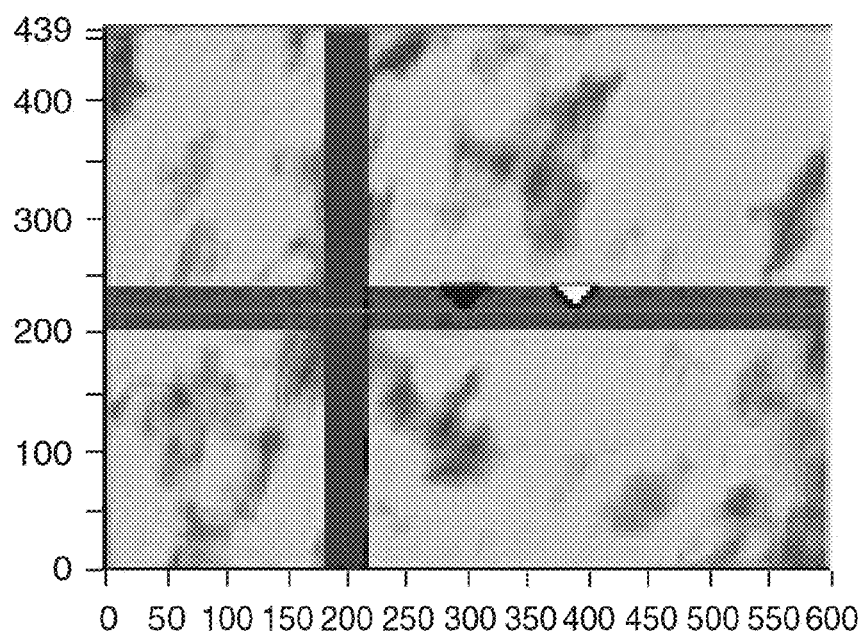
FIG. 16 shows a surface roughness analysis using optical interferometry of an example optical film.

An optical body was produced by coextruding an immiscible blend of 73 wt % syndiotactic polypropylene (P1571 from Atofina, now Total Petrochemicals, Inc.) and 27 wt % low density copolyethylene (Engage 8200) as rough strippable layers on the outside of SAN (Tyril 880 from DOW) optical film. This rough strippable layer represented a combination of low crystallinity polypropylene along with low crystallinity copolyethylene. The resulting 3-layer cast web was preheated for 50 seconds at 145° C. and uniaxially oriented 6:1 at 100% per second draw rate. After removing the strippable immiscible blend layer, the core SAN layer was 4.5 mils thick. Haze was measured with a BYK Gardner Haze meter to be about 4.5%. Surface roughness was analyzed with a Wyko interferometer to have an Rq of 80 nm and a Ra 70 nm as shown in FIG. 16.

Example 8

A random copolymer of propylene and ethylene (PP8650 from Atofina, now Total Petrochemicals, Inc.) was blended with a high density polyethylene (10462N from Dow Chemical Company) at 50/50 wt % and coextruded as rough strippable layers over a core-layer of polycarbonate (Lexan HF110 from GE Plastics Inc.) optical film to create an optical body according to the present disclosure. Extrusion rates of the polycarbonate core layer was 12.5 lbs/hr and each of the polyolefin blend layers was 10 lbs/hr. The tri-layer optical body was cast at a width and speed that created a polycarbonate film of 2.5 mils thickness and rough strippable layers of 2.0 mils thickness. The high density polyethylene was immiscible with the random propylene-ethylene copolymer and phase separated to produce protrusions on rough strippable layers, which were subsequently stripped away leaving a surface texture on the polycarbonate optical film. The peel force required to remove the immiscible blend rough strippable layers from the polycarbonate optical diffuser film was measured to be about 12 grams/inch with an I-mass tape peel force tester according to the method described above. A BYK-Gardner haze meter was used to measure a haze of about 94.2% in the polycarbonate optical diffuser film according to ASTM D1003.

Example 9

A random copolymer of propylene and ethylene (PP7825 from Atofina, now Total Petrochemicals, Inc.) was blended with a high density polyethylene (HDPE 9640 from Chevron-Philips) at 45 wt % and 5 wt % calcium carbonate $CaCO_3$. This immiscible polymeric blend was coextruded as strippable layers over a core-layer of polycarbonate (Lexan HF110) optical film to create an optical body according to the present disclosure. Extrusion rates of the polycarbonate core layer was 12.5 lbs/hr and each of the polyolefin blend layers was 10 lbs/hr. The tri-layer film was cast at a width and speed that created a polycarbonate film of 6.5 mils thickness and strippable layers of 5.0 mils thickness. The high density polyethylene was immiscible with the random propylene-ethylene copolymer and phase separated to form protrusions on the rough strippable layers, which were subsequently stripped away leaving a surface texture on the polycarbonate optical film. The peel force required to remove the immiscible blend rough strippable layers from the polycarbonate optical diffuser film was measured to be about 14 grams/inch with an I-mass tape peel force tester according to the method described above. A BYK-Gardner haze meter was used to measure a haze of about 96.7% the polycarbonate optical diffuser film according to TM 1101.

The following Table 6 shows average peel force values for some of the exemplified and other possible embodiments of the present disclosure. CoPEN-tbia refers to coPEN copolymers including naphthalate dicarboxylate subunits and t-butyl-isophthalic acid (tbia).

TABLE 6

| Continuous Phase Polymer | Disperse Phase Polymer | Disperse Phase Weight % | Optical Film Material | Average Peel Force (g/in) |
|---|---|---|---|---|
| Finaplas 1571 | P-787 | 0.5 | PEN/coPEN SAN underskins | 3.5 |
| PP8650 | 10462N | 50 | polycarbonate | 12 |
| PP7825 | HDPE CaCO3 | 45 5 | polycarbonate | 14 |
| P1571 | HDPE | 20 | SAN | 2.6 |
| P1571 | Engage 8200 | 27 | SAN | 75.2 |
| P1571 | SAN | 20 | SAN | 15.8 |
| P1571 | SAN | 40 | SAN | 94.8 |
| P1571 | CoPEN-tbia | 20 | CoPEN-tbia | 153.3 |

Example 10

Matte PET films were produced by coextruding a three-layer film that was comprised of one rough strippable layer, a PET core layer, and one smooth, strippable layer on the opposite side of the core layer from the rough, strippable layer. This way, only one surface of the PET core was embossed. The continuous phase of the rough, strippable layer was comprised of syndiotactic polypropylene (Finaplas 1571 from Atofina) and the disperse phase was linear-low density polyethylene (Marflex 7104, from Chevron-Phillips Chemical Co.). The smooth layer was Finaplas 1571 with no disperse phase. The optical properties of the film were controlled by varying the loading of the disperse phase. These films were oriented using a batch film stretcher at the conditions listed in Table 7.

TABLE 7

| Stretch Conditions | |
|---|---|
| Draw ratio | 3 × 3 (MD × TD) |
| Temperature | 100 C. |
| Preheat time | 100 sec. |

The optical properties were measured using a BYK-Gardener haze meter and the surface roughness properties were measured using a Wyko interferometer. The optical properties and surface roughness properties of two films are shown in Table 8. We measured the aspect ratio of the depressions left in the PET surface from optical micrographs at 900×.

TABLE 8

Optical and Surface Properties for Stretched Films

| Additive | Haze (%) | Ra (nm) | Rq (nm) | Da (mrad) | Major Axis (μm) | Minor Axis (μm) | Aspect Ratio |
|---|---|---|---|---|---|---|---|
| 10% Marflex 7104 | 26.3 | 191 | 243 | 77 | 4.2 | 3.8 | 1.1 |
| 30% Marflex 7104 | 56.7 | 375 | 482 | 146 | 7.1 | 5.2 | 1.4 |
| 30% PE 2517 | 17.8 | 183 | 226 | 69 | 95.4 | 4.3 | 23.2 |

Da is the average slope for the depressions as measured by the Wyko interferometer.

Example 11

Matte PET films were produced by coextruding a three-layer optical body that included one rough strippable layer, a PET core layer, and one smooth, strippable layer on the opposite side of the core layer from the rough, strippable layer. The rough strippable layer consisted of a blend of Finaplas 1571, available from Atofina Chemical Co., and Dowlex 2517, which is a linear-low-density polyethylene available from the Dow Chemical Company. The smooth layer consisted of Finaplas 1571 with no disperse phase. The loading of the dispersed phase in the rough strippable layer was varied to control the optical and surface properties. The films were stretched at the same conditions as the previous example (Table 7) and the optical and physical properties are also shown in Table 8. The surface depressions were found to have average aspect ratios that were greater than 20, indicating that the surface structure was highly oriented in the machine direction. The droplets of the dispersed phase were oriented by shear of the die during extrusion and by the drawing of the film after exiting the die.

Example 12

Matte PET films were produced by coextruding a two-layer film consisting of one rough, strippable layer and one PET layer and laminating this dual-layer film to commercially available, 5-mil PET film from DuPont. The rough strippable layer was comprised of Finaplas 1571 from Atofina as the continuous phase and Marflex 7104 from Chevron-Phillips Chemical Co. as the dispersed phase. The PET resin was from 3M Company. Both the strippable layer and the PET layer were 1 mil thick. The two-layer film was laminated onto the 5 mil PET film from DuPont at 50 fpm, so that the extruded PET layer was in contact with the commercial PET film. Removal of the strippable layer left a rough PET surface. The haze of the PET film was controlled by changing the loading of the dispersed phase in the strippable layer. The results for several films are shown in Table 9.

Figure 18:
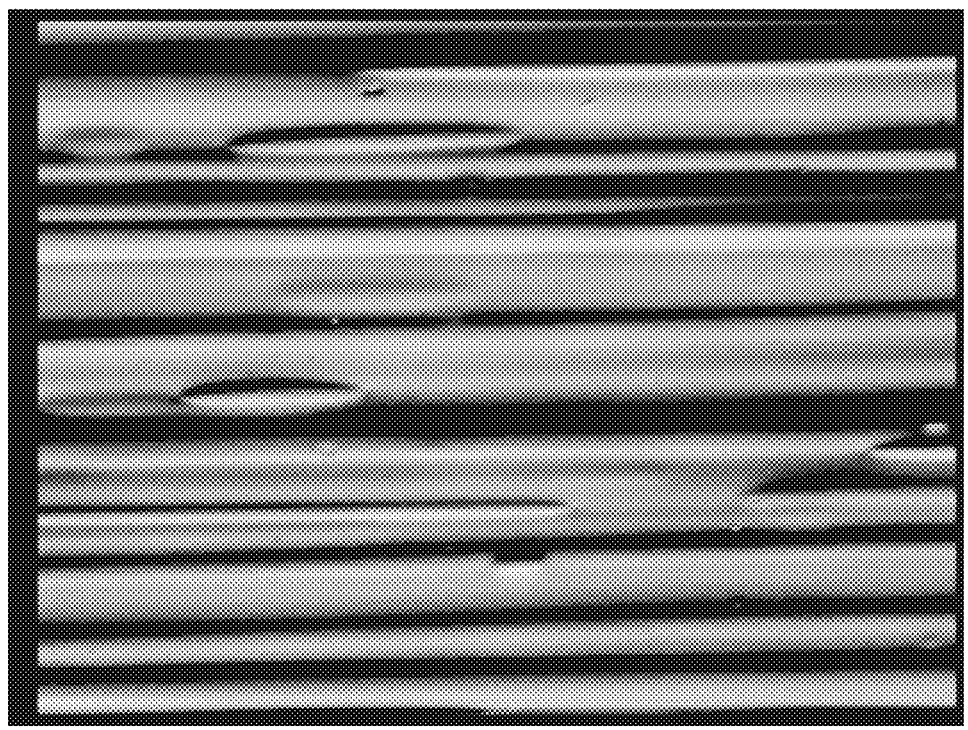
FIG. 18 is an SEM photomicrograph of an optical film having a rough surface according to another exemplary embodiment of the present disclosure.

PET film at 50 fpm such that the extruded PET layer was in contact with the commercial PET film. Removal of the strippable layer left a rough PET surface. The haze of the film was controlled by changing the loading of the dispersed phase in the strippable skin. The results for films with different Tyril 100 loadings are shown in Table 9. The droplets of Tyril 100 were elongated in the machine-direction during extrusion and embossed an asymmetric surface structure onto the extruded PET layer, as shown by the relatively high aspect ratios for 10% and 20% loadings. The aspect ratios are nearly 6, with the structure being oriented in the machine direction. At high Tyril 100 loadings, e.g., 50%, the surface structure is dramatically oriented into long, hemispherical channels, as shown in FIG. 18.

2. Three- or More-Polymer Rough Strippable Layers

The following examples utilized a rough strippable layer comprising at least 3 polymers for the purposes of controlling strippable layer adhesion and providing a higher surface feature density. Utilizing at least 2 disperse phases in the rough strippable layers facilitates imparting a texture into a surface of an optical film including features (typically, depressions) of different sizes, which can help improve haze. In some exemplary embodiments, more than 2 disperse sub-phases can impart smaller concave surface features (depressions) between larger concave surface features (depressions), and, in some exemplary embodiments, smaller concave surface features (depressions) within larger concave surface features (depressions).

Materials used in the following examples are available from different manufacturers as described: PEN (0.48 IV PEN from 3M Company), SAN (Tyril 880 from Dow Chemical), sPP (1571 available from Atofina, now Total Petrochemicals, Inc.), MDPE (Marflex TR130 available from Chevron-Philips), Admer (SE810 available from Mitsui Petrochemicals, Inc.), Xylex (Xylex 7200 available from GE Plastics Inc.), random propylene-ethylene copolymer (PP8650 available from Atofina, now Total Petrochemicals, Inc.), Pelestat 300 (Pelestat 300 available from Tomen America), Pelestat 6321 (Pelestat 6321 available from

TABLE 9

Optical and Surface Properties for Stretched Films

| Additive | Haze (%) | Ra (nm) | Rq (nm) | Da (mrad) | Major Axis (μm) | Minor Axis (μm) | Aspect Ratio |
|---|---|---|---|---|---|---|---|
| 15% Marflex 7104 | 30 | 238 | 302 | 65 | 4.7 | 4.0 | 1.2 |
| 20% Marflex 7104 | 40 | 386 | 495 | 80 | 6.7 | 5.2 | 1.3 |
| 10% Tyril 100 | 7 | 111 | 143 | 25 | 24.2 | 3.6 | 6.7 |
| 20% Tyril 100 | 13 | 181 | 237 | 34 | 27.1 | 4.6 | 5.9 |
| 50% Tyril 100 | 41 | 551 | 652 | 86 | — | 7.2 | — |

Example 13

Matte PET films were created by coextruding a two-layer film including one rough strippable layer and one PET layer and laminating this dual layer film to commercially available biaxially oriented PET film. The strippable layer was comprised of Tyril 100 from Dow Chemical Co. as the disperse phase and Finaplas 1571 from Atofina as the continuous phase. The PET for the second extruded layer was from 3M Co. and the commercial PET film was obtained from DuPont. The two-layer film laminated onto the commercial Tomen America), polycaprolactone (Tone 787), PMMA (VO44 available from Atofina, now Total Petrochemicals, Inc. Chemical), Polystyrene (Styron 685 available from Dow Chemical Company).

Example 14

An optical body was produced by coextrusion of an optical film comprising PEN (polyethylene naphthalate), a pair of underskin layers comprising SAN (styrene acrylonitrile), and a pair of rough strippable layers comprising a blend of 60 wt % sPP (syndiotactic polypropylene), 20 wt %

MDPE (medium density polyethylene), and 20 wt % SAN (styrene acrylonitrile). The core layer of the optical film was extruded using 1.5" single screw extruder operating at 555 F at a rate of 10 lbs/hr. The underskin layers were extruded using a 1.25" single screw extruder operating at 500 F at a rate of 10 lbs/hr. The pair of rough strippable layers were extrusion blended with a 25 mm twin screw extruder operating at 480 F and a screw speed of 150 rpm with the sPP at a feed rate of 6 lbs/hr, MDPE feed rate at 2 lbs/hr, and SAN feed rate at 2 lbs/hr. The core layer and the underskin layers were fed into a 3-layer feedblock attached to a rough strippable layer manifold, which fed into a film die, all operated at 530 F. This multi-layer polymer melt was co-extruded onto a casting wheel operating at 90 F and 5 fpm to produce a cast web approximately 30 mils in thickness.

The multi-layer cast web was then pre-heated at 290 F for 50 seconds and oriented in a batch orienter at a draw rate of 100%/second to a draw ratio of 5:1. The pair of rough strippable layers was then peeled off and the force required to remove these rough strippable layers was measured by the 180 peel test method previously described to be about 10.8 grams/inch. A Gardner haze meter was used to measure the relative diffusion of light transmitted through the film to have a haze value of about 15.8%.

Example 15

An optical body was produced as described in Example 14 by coextrusion of an optical film comprising PEN (polyethylene naphthalate), a pair of underskin layers comprising SAN (styrene acrylonitrile), and a pair of rough strippable layers comprising a blend of 60 wt % sPP (syndiotactic polypropylene), 30 wt % MDPE (medium density polyethylene), and 10 wt % SAN (styrene acrylonitrile). A BYK-Gardner haze meter was used to measure the relative diffusion of light transmitted through the film to have a haze value of about 15.4%.

Example 16

An optical body was produced as described in Example 14 by coextrusion of an optical film comprising PEN (polyethylene naphthalate), an inner pair of structural skin layers comprising SAN (styrene acrylonitrile), and an outer pair of strippable layers comprising a blend of 40 wt % sPP (syndiotactic polypropylene), 30 wt % MDPE (medium density polyethylene), and 30 wt % SAN (styrene acrylonitrile). A BYK-Gardner haze meter was used to measure the relative diffusion of light transmitted through the film to have a haze value of about 32.6%.

Example 17

A optical body was produced as described in Example 14 by coextrusion of an optical film comprising PEN (polyethylene naphthalate), a pair of underskin layers comprising SAN (styrene acrylonitrile), and a pair of rough strippable layers comprising a blend of 80 wt % sPP (syndiotactic polypropylene), 10 wt % MDPE (medium density polyethylene), and 10 wt % SAN (styrene acrylonitrile). A BYK-Gardner haze meter was used to measure the relative diffusion of light transmitted through the film to have a haze value of about 6.45%.

Example 18

An optical body was produced as described in example 14 by coextrusion of an optical film comprising PEN (polyethylene naphthalate), a pair of underskin layers comprising SAN (styrene acrylonitrile), and a pair of rough strippable layers comprising a blend of 60 wt % sPP (syndiotactic polypropylene), 10 wt % MDPE (medium density polyethylene), and 30 wt % SAN (styrene acrylonitrile). A BYK-Gardner haze meter was used to measure the relative diffusion of light transmitted through the film to have a haze value of about 19.5%.

Example 19

An optical body was produced by coextrusion of an optical film comprising PEN (polyethylene naphthalate), a pair of underskin layers comprising SAN (styrene acrylonitrile), and a pair of rough strippable layers comprising a blend of 70 wt % sPP (syndiotactic polypropylene), 20 wt % MDPE (medium density polyethylene), and 10 wt % Admer SE810 (modified polyethylene). The optical film core layer was extruded using 1.5" single screw extruder operating at 555 F at a rate of 10 lbs/hr. The pair of underskin layers were extruded using a 1.25" single screw extruder operating at 500 F at a rate of 10 lbs/hr. The pair of rough strippable layers were extrusion blended with a 25 mm twin screw extruder operating at 480 F and a screw speed of 200 rpm with the sPP at a feed rate of 7 lbs/hr, MDPE feed rate at 2 lbs/hr, and Admer feed rate at 1 lbs/hr. The core layer and underskin layers were fed into a 3-layer feedblock attached to an additional outer layer manifold which fed into a film die all operated at 530 F. This multi-layer polymer melt was co-extruded onto a casting wheel operating at 90 F and 5 fpm to produce a cast web approximately 30 mils in thickness.

The multi-layer cast web was then pre-heated at 290 F for 50 seconds and oriented in a batch orienter at a draw rate of 100%/second to a draw ratio of 5:1. The pair of rough strippable layers was then peeled off and the force required to remove these rough strippable layers was measured by the 180 peel test method previously described to be about 5.6 grams/inch. A Gardner haze meter was used to measure the relative diffusion of light transmitted through the film to have a haze value of about 4.7%.

Example 20

An optical body was produced as described in Example 19 by coextrusion of an optical film comprising PEN (polyethylene naphthalate), a pair of underskin layers comprising SAN (styrene acrylonitrile), and a pair of rough strippable layers comprising a blend of 65 wt % sPP (syndiotactic polypropylene), 30 wt % MDPE (medium density polyethylene), and 5 wt % Admer SE810 (modified polyethylene). A BYK-Gardner haze meter was used to measure the relative diffusion of light transmitted thru the film to have a haze value of about 7.9%.

Example 21

An optical body was produced as explained in Example 19 by coextrusion of an optical film comprising PEN (polyethylene naphthalate), a pair of underskin layers comprising SAN (styrene acrylonitrile), and a pair of rough strippable layers comprising a blend of 55 wt % sPP (syndiotactic polypropylene), 30 wt % MDPE (medium density polyethylene), and 15 wt % Admer SE810 (modified polyethylene). A BYK-Gardner haze meter was used to measure the relative diffusion of light transmitted thru the film to have a haze value of about 7.9%.

Example 22

An optical body was produced as explained in Example 19 by coextrusion of an optical film comprising PEN (polyethylene naphthalate), a pair of underskin layers comprising SAN (styrene acrylonitrile), and a pair of rough strippable layers comprising a blend of 85 wt % sPP (syndiotactic polypropylene), 10 wt % MDPE (medium density polyethylene), and 5 wt % Admer SE810 (modified polyethylene). A BYK-Gardner haze meter was used to measure the relative diffusion of light transmitted thru the film to have a haze value of about 1.47%.

Example 23

An optical body was produced as explained in Example 19 by coextrusion with a of a core layer comprising PEN (polyethylene naphthalate), an inner pair of structural skin layers comprising SAN (styrene acrylonitrile), and an outer pair of strippable layers comprising a blend of 75 wt % sPP (syndiotactic polypropylene), 10 wt % MDPE (medium density polyethylene), and 15 wt % Admer SE810 (modified polyethylene). A BYK-Gardner haze meter was used to measure the relative diffusion of light transmitted thru the film to have a haze value of about 1.7%.

Example 24

An optical body was produced by coextrusion of an optical film comprising PEN (polyethylene naphthalate), a pair of underskin layers comprising SAN (styrene acrylonitrile), and a pair of rough strippable layers comprising a blend of 70 wt % sPP (syndiotactic polypropylene), 20 wt % MDPE (medium density polyethylene), and 10 wt % Xylex 7200 (polycarbonate/copolyester blend). The optical film core layer was extruded using 1.5" single screw extruder operating at 555 F at a rate of 10 lbs/hr. The pair of underskin layers were extruded using a 1.25" single screw extruder operating at 500 F at a rate of 10 lbs/hr. The pair of rough strippable layers were extrusion blended with a 25 mm twin screw extruder operating at 480 F and a screw speed of 200 rpm with the sPP at a feed rate of 7 lbs/hr, MDPE feed rate at 2 lbs/hr, and Xylex feed rate at 1 lbs/hr. The core layer and underskin layers were fed into a 3-layer feedblock attached to a rough strippable layer manifold which fed into a film die all operated at 530 F. This multi-layer polymer melt was co-extruded onto a casting wheel operating at 90 F and 5 fpm to produce a cast web approximately 30 mils in thickness.

The multi-layer cast web was then pre-heated at 290 F for 50 seconds and oriented in a batch orienter at a draw rate of 100%/second to a draw ratio of 5:1. The pair of rough strippable layers was then peeled off and the force required to remove these rough strippable layers was measured by the 180 peel test method previously described to be about 65.2 grams/inch. A Gardner haze meter was used to measure the relative diffusion of light transmitted thru the film to have a haze value of about 45.3%.

Example 25

An optical body was produced as explained in Example 24 by coextrusion of an optical film comprising PEN (polyethylene naphthalate), a pair of underskin layers comprising SAN (styrene acrylonitrile), and a pair of rough strippable layers comprising a blend of 65 wt % sPP (syndiotactic polypropylene), 30 wt % MDPE (medium density polyethylene), and 5 wt % Xylex 7200 (polycarbonate/copolyester blend). A BYK-Gardner haze meter was used to measure the relative diffusion of light transmitted thru the film to have a haze value of about 41.8%.

Example 26

An optical body was produced as explained in Example 24 by coextrusion of an optical film comprising PEN (polyethylene naphthalate), a pair of underskin layers comprising SAN (styrene acrylonitrile), and a pair of rough strippable layers comprising a blend of 55 wt % sPP (syndiotactic polypropylene), 30 wt % MDPE (medium density polyethylene), and 15 wt % Xylex 7200 (polycarbonate/copolyester blend). A BYK-Gardner haze meter was used to measure the relative diffusion of light transmitted thru the film to have a haze value of about 93.1%.

Example 27

An optical body was produced as explained in Example 24 by coextrusion of an optical film comprising PEN (polyethylene naphthalate), a pair of underskin layers comprising SAN (styrene acrylonitrile), and a pair of rough strippable layers comprising a blend of 85 wt % sPP (syndiotactic polypropylene), 10 wt % MDPE (medium density polyethylene), and 5 wt % Xylex 7200 (polycarbonate/copolyester blend). A BYK-Gardner haze meter was used to measure the relative diffusion of light transmitted thru the film to have a haze value of about 14.5%.

Example 28

An optical body was produced as explained in Example 24 by coextrusion of an optical film comprising PEN (polyethylene naphthalate), a pair of underskin layers comprising SAN (styrene acrylonitrile), and a pair of rough strippable layers comprising a blend of 75 wt % sPP (syndiotactic polypropylene), 10 wt % MDPE (medium density polyethylene), and 15 wt % Xylex 7200 (polycarbonate/copolyester blend). A BYK-Gardner haze meter was used to measure the relative diffusion of light transmitted thru the film to have a haze value of about 21%.

Example 29

An optical body including a multilayer polarizer film was constructed with first optical layers created from a polyethylene naphthalate and second optical layers created from co(polyethylene naphthalate), underskin layers created from a cycloaliphatic polyester/polycarbonate blend (Xylex 7200), and rough strippable layers created from an immiscible blend of PP8650, Tone 787, and Pelestat 300.

The copolyethylene-hexamethylene naphthalate polymer (CoPEN5050HH) used to form the first optical layers was synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254 degrees C. at a pressure of two atmospheres ($2 \times 10^5$ N/m$^2$) and the mixture was allowed to react while removing the methanol reaction product. After completing the reaction and removing the methanol (approximately 42.4 kg) the reaction vessel was charged with triethyl phosphonoacetate (55 g) and the pressure was reduced to one torr (263 N/m²) while heating to 290 degrees C. The condensation by-product, ethylene glycol, was continuously removed until a polymer with intrinsic viscosity 0.55 dl/g as measured in a 60/40 weight percent mixture of phenol and o-dichlorobenzene is produced. The CoPEN5050HH polymer produced by this method had a glass transition temperature (Tg) of 85 degrees C. as measured by differential scanning calorimetry at a temperature ramp rate of 20 degrees C. per minute.

The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5050HH layers were the second optical layers. In addition to the first and second optical layers, a set of non-optical layers, also comprised of CoPEN5050HH were coextruded as PBL (protective boundary layers) on either side of the optical layer stacks. Two sets of underskin layers were also coextruded on the outer side of the PBL non-optical layers through additional melt ports. Xylex 7200 was used to form the underskin layers. The rough strippable layers were made from PP8650 (polypropylene-ethylene copolymer) blended with 6 wt % Tone P-787 (polycaprolactone) and 1.5 wt % Pelestat 300 (modified polyethylene available from Tomen/Sanyo). The construction was, therefore, in order of layers: polypropylene mixture rough strippable layer, Xylex 7200 underskin layer, 825 alternating layers of optical layers one and two, Xylex 7200 underskin layer, and a further polypropylene mixture rough strippable layer.

The multilayer extruded film was cast onto a chill roll at 5 meters per minute (15 feet per minute) and heated in an oven at 150° C. (302° F.) for 30 seconds, and then uniaxially oriented at a 5.5:1 draw ratio. A reflective polarizer film of approximately 125 microns (5 mils) thickness was produced after removal of the strippable polypropylene mixture strippable layers. Peel force required to remove these strippable layers was measured with the 180 degree peel test to be 20 grams/inch. This multilayer film was measured to have a haze level of 58% as measured with a BYK-Gardner haze meter.

Example 30

An optical body including a multilayer reflective polarizer film was constructed with first optical layers created from a polyethylene naphthalate and second optical layers created from co(polyethylene naphthalate), underskin layers created from a cycloaliphatic polyester/polycarbonate blend (Xylex 7200), and rough strippable layers created from an immiscible blend of PP8650, Tone 787, and Marflex TR130. The copolyethylene-hexamethylene naphthalate polymer (CoPEN5050HH) used to form the first optical layers was synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254 degrees C. at a pressure of two atmospheres ($2 \times 10^5$ N/m²) and the mixture was allowed to react while removing the methanol reaction product. After completing the reaction and removing the methanol (approximately 42.4 kg) the reaction vessel was charged with triethyl phosphonoacetate (55 g) and the pressure was reduced to one ton (263 N/m²) while heating to 290 degrees C. The condensation by-product, ethylene glycol, was continuously removed until a polymer with intrinsic viscosity 0.55 dl/g as measured in a 60/40 weight percent mixture of phenol and o-dichlorobenzene is produced. The CoPEN5050HH polymer produced by this method had a glass transition temperature (Tg) of 85 degrees C. as measured by differential scanning calorimetry at a temperature ramp rate of 20 degrees C. per minute. The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5050HH layers were the second optical layers. In addition to the first and second optical layers, a set of non-optical layers, also comprised of CoPEN5050HH were coextruded as PBL (protective boundary layers) on either side of the optical layer stacks. Two sets of strippable layers were also coextruded on the outer side of the PBL non-optical layers through additional melt ports. Xylex 7200 was used to form the internal set of skin layers. The strippable layers were made from PP8650 (random propylene-ethylene copolymer) blended with 4 wt % Tone P-787 (polycaprolactone) and 15 wt % Marflex TR130 (medium density polyethylene). The construction was, therefore, in order of layers: polypropylene mixture outer strippable layer, Xylex 7200 inner skin layer, 825 alternating layers of optical layers one and two, Xylex 7200 inner skin layer, and a further polypropylene mixture outer strippable layer.

The multilayer extruded film was cast onto a chill roll at 5 meters per minute (15 feet per minute) and heated in an oven at 150° C. (302° F.) for 30 seconds, and then uniaxially oriented at a 5.5:1 draw ratio. A reflective polarizer film of approximately 125 microns (5 mils) thickness was produced after removal of the rough strippable polypropylene mixture layers. Peel force required to remove these rough strippable layers was measured with the 180 degree peel test to be about 15 grams/inch. This multilayer film was measured to have a haze level of about 47.9% as measured with a BYK-Gardner haze meter.

Example 32

An optical body including a multilayer reflective polarizer film was constructed with first optical layers created from a polyethylene naphthalate and second optical layers created from co(polyethylene naphthalate), underskin layers created from a cycloaliphatic polyester/polycarbonate blend (Xylex 7200), and external rough strippable layers created from an immiscible blend of PP8650, Tone P-787, and PMMA-VO44.

The copolyethylene-hexamethylene naphthalate polymer (CoPEN5050HH) used to form the first optical layers was synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254 degrees C. at a pressure of two atmospheres ($2 \times 10^5$ N/m²) and the mixture was allowed to react while removing the methanol reaction product. After completing the reaction and removing the methanol (approximately 42.4 kg) the reaction vessel was charged with triethyl phosphonoacetate (55 g) and the pressure was reduced to one torr (263 N/m²) while heating to 290 degrees C. The condensation by-product, ethylene glycol, was continuously removed until a polymer with intrinsic viscosity 0.55 dl/g as measured in a 60/40 weight percent mixture of phenol and o-dichlorobenzene is produced. The CoPEN5050HH polymer produced by this method had a glass transition temperature (Tg) of 85 degrees C. as measured by differential scanning calorimetry at a temperature ramp rate of 20 degrees C. per minute.

The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5050HH layers were the second optical layers. In addition to the first and second optical layers, a set of non-optical layers, also comprised of CoPEN5050HH were coextruded as PBL (protective boundary layers) on either side of the optical layer stacks. Two sets of underskin layers were also coextruded on the outer side of the PBL non-optical layers through additional melt ports. Xylex 7200 was used to form the set of underskin layers. The rough strippable layers were made from PP8650 (polypropylene-ethylene copolymer) blended with 6 wt % Tone P-787 (polycaprolactone) and 20 wt % PMMA (VO44). The construction was, therefore, in order of layers: polypropylene mixture rough strippable layer, Xylex 7200 underskin layer, 825 alternating layers of optical layers one and two, Xylex 7200 underskin layer, and a further polypropylene mixture rough strippable layer.

The multilayer extruded film was cast onto a chill roll at 5 meters per minute (15 feet per minute) and heated in an oven at 150° C. (302° F.) for 30 seconds, and then uniaxially oriented at a 5.5:1 draw ratio. A reflective polarizer film of approximately 125 microns (5 mils) thickness was produced after removal of the rough strippable polypropylene mixture layers. Peel force required to remove these rough strippable layers was measured with the 180 degree peel test to be about 31 grams/inch. This multilayer film was measured to have a haze level of about 49% as measured with a BYK-Gardner haze meter.

Example 33

An optical body including a multilayer reflective polarizer film was constructed with first optical layers created from a polyethylene naphthalate and second optical layers created from co(polyethylene naphthalate), underskin layers created from a cycloaliphatic polyester/polycarbonate (Xylex 7200) blended with polystyrene (Styron 685) and Pelestat 6321, and rough strippable layers created from an immiscible blend of PP8650, PP6671, and Tone P-787.

The copolyethylene-hexamethylene naphthalate polymer (CoPEN5050HH) used to form the first optical layers was synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254 degrees C. at a pressure of two atmospheres ($2 \times 10^5$ N/m$^2$) and the mixture was allowed to react while removing the methanol reaction product. After completing the reaction and removing the methanol (approximately 42.4 kg) the reaction vessel was charged with triethyl phosphonoacetate (55 g) and the pressure was reduced to one ton (263 N/m$^2$) while heating to 290 degrees C. The condensation by-product, ethylene glycol, was continuously removed until a polymer with intrinsic viscosity 0.55 dl/g as measured in a 60/40 weight percent mixture of phenol and o-dichlorobenzene is produced. The CoPEN5050HH polymer produced by this method had a glass transition temperature (Tg) of 85 degrees C. as measured by differential scanning calorimetry at a temperature ramp rate of 20 degrees C. per minute.

The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5050HH layers were the second optical layers. In addition to the first and second optical layers, a set of non-optical layers, also comprised of CoPEN5050HH were coextruded as protective boundary layers on either side of the optical layer stack. Underskin layers were also coextruded on the outer side of the underskin layers through additional melt ports. Xylex 7200 blended with 15 wt % Styron 685 and 4 wt % Pelestat 6321 was used to form the underskin layers. The rough strippable layers were made from PP8650 (polypropylene-ethylene copolymer) blended with 16 wt % Tone 787 (polycaprolactone) and 41 wt % PP6671 (polypropylene-ethylene copolymer) and 2 wt % Pelestat 300. The construction was, therefore, in order of layers: polypropylene mixture rough strippable layer, Xylex/Styron/Pelestat blend underskin layer, 825 alternating layers of optical layers one and two, Xylex/Styron/Pelestat blend underskin layer, and a further polypropylene mixture rough strippable layer.

The multilayer extruded film was cast onto a chill roll at 5 meters per minute (15 feet per minute) and heated in an oven at 150° C. (302° F.) for 30 seconds, and then uniaxially oriented at a 5.5:1 draw ratio. A reflective polarizer film of approximately 125 microns (5 mils) thickness was produced after removal of the rough strippable polypropylene mixture layers. Peel force required to remove these rough strippable layers was measured with the 180 degree peel test to be about 31 grams/inch. This multilayer film was measured to have a haze level of about 51% as measured with a BYK-Gardner haze meter.

FIG. 17 is a table summarizing % haze and average peel force for exemplary embodiments described in Examples 14-33 and additional exemplary embodiments. Table 10 contains various surface characterizations of the exemplary embodiments described in Examples 14-35 and 27-28.

TABLE 10

| Example | | Bearing Ratio Rvk | Bearing Ratio Rpk | Positive Volume | Negative Volume | Volume | SArea Index | Stylus X Rp | Stylus X Rpk | Stylus X Rv | Stylus X Rvk |
|---|---|---|---|---|---|---|---|---|---|---|---|
| 14 | Average | 239.58 | 559.68 | 5348 | 6788 | 143113 | 1.031 | 1402.43 | 525.09 | −427.42 | 158.81 |
|  | Std. Dev | 31.68 | 183.41 | 1351 | 1076 | 72815 | 0.015 | 465.10 | 192.06 | 114.41 | 31.67 |
| 15 | Average | 339.00 | 482.75 | 29081 | 31299 | 427432 | 1.025 | 1676.98 | 349.08 | −470.41 | 149.59 |
|  | Std. Dev | 10.36 | 74.81 | 2844 | 3080 | 214770 | 0.002 | 227.28 | 68.62 | 44.49 | 22.30 |
| 16 | Average | 530.53 | 1150.04 | 10519 | 17560 | 251793 | 1.114 | 2871.76 | 1062.36 | −1025.78 | 337.08 |
|  | Std. Dev | 61.44 | 309.00 | 4664 | 6838 | 131908 | 0.054 | 792.89 | 335.20 | 482.79 | 122.04 |

TABLE 10-continued

| Example | | Bearing Ratio Rvk | Bearing Ratio Rpk | Positive Volume | Negative Volume | Volume | SArea Index | Stylus X Rp | Stylus X Rpk | Stylus X Rv | Stylus X Rvk |
|---|---|---|---|---|---|---|---|---|---|---|---|
| 17 | Average | 132.84 | 283.26 | 11900 | 7261 | 265566 | 1.014 | 1120.87 | 255.19 | −322.52 | 102.53 |
| | Std. Dev | 10.36 | 165.23 | 2919 | 1237 | 270682 | 0.009 | 554.53 | 148.56 | 92.63 | 45.23 |
| 18 | Average | 212.89 | 992.45 | 6005 | 3224 | 220444 | 1.121 | 2735.12 | 1057.33 | −723.50 | 202.73 |
| | Std. Dev | 17.33 | 258.35 | 1007 | 71 | 160602 | 0.033 | 465.95 | 276.32 | 174.89 | 82.31 |
| 19 | Average | 250.43 | 195.11 | 20984 | 26821 | 118265 | 1.002 | 299.55 | 86.81 | −357.77 | 132.71 |
| | Std. Dev | 35.68 | 34.25 | 2150 | 3668 | 13952 | 0.000 | 40.90 | 9.33 | 36.33 | 13.65 |
| 20 | Average | 330.73 | 285.60 | 24222 | 32052 | 301322 | 1.004 | 303.92 | 74.12 | −195.02 | 70.44 |
| | Std. Dev | 21.26 | 66.03 | 2917 | 3052 | 362906 | 0.002 | 89.07 | 20.04 | 27.41 | 9.28 |
| 21 | Average | 360.86 | 375.56 | 29085 | 41853 | 284944 | 1.008 | 542.25 | 123.19 | −251.18 | 81.44 |
| | Std. Dev | 46.90 | 88.80 | 6516 | 6592 | 228376 | 0.004 | 244.09 | 53.49 | 61.76 | 27.60 |
| 22 | Average | 155.57 | 154.35 | 7879 | 5822 | 23331 | 1.013 | 314.88 | 83.27 | −178.85 | 51.43 |
| | Std. Dev | 113.19 | 25.51 | 1319 | 1043 | 6534 | 0.020 | 99.31 | 32.64 | 77.07 | 11.60 |
| 23 | Average | 132.47 | 97.08 | 9408 | 8680 | 37228 | 1.002 | 195.22 | 43.29 | −123.22 | 40.94 |
| | Std. Dev | 53.71 | 28.60 | 891 | 1046 | 4344 | 0.001 | 102.60 | 23.20 | 21.08 | 8.64 |
| 24 | Average | 1970.44 | 1118.73 | 70098 | 133729 | 967813 | 1.101 | 1780.98 | 448.56 | −881.34 | 291.28 |
| | Std. Dev | 691.10 | 338.54 | 14179 | 16999 | 744353 | 0.039 | 865.51 | 206.18 | 297.28 | 99.05 |
| 25 | Average | 1881.65 | 1324.61 | 23934 | 29268 | 132425 | 1.418 | 2455.68 | 746.10 | −1909.35 | 572.62 |
| | Std. Dev | 786.75 | 619.47 | 11123 | 7468 | 43684 | 0.228 | 912.87 | 387.01 | 1456.76 | 299.03 |
| 27 | Average | 320.02 | 173.88 | 19117 | 21653 | 85654 | 1.014 | 302.04 | 73.02 | −454.20 | 145.76 |
| | Std. Dev | 34.70 | 30.25 | 2218 | 2211 | 11875 | 0.004 | 62.54 | 10.21 | 8.27 | 2.69 |
| 28 | Average | 483.64 | 306.74 | 27353 | 37288 | 148554 | 1.030 | 596.28 | 128.61 | −550.73 | 199.42 |
| | Std. Dev | 24.57 | 52.72 | 673 | 2309 | 7101 | 0.003 | 97.65 | 14.51 | 11.79 | 6.44 |

3. Strippable Layers Including Beads as the Disperse Phase

Example 1

Beads Made of Inorganic Material

Matte PET optical films were produced by coextruding a two-layer optical body that included one rough strippable layer and an optical film consisting of a PET core layer. The rough strippable layer included 40 wt % syndiotactic polypropylene (PP 1571 from Atofina, now Total Petrochemicals, Inc), 40 wt % of a random copolymer of propylene and ethylene (PP 8650 from Atofina, now Total Petrochemicals, Inc) and 20 wt % of solid glass beads with a mean diameter of 11 microns (Spheriglass A5000 from Potters Industries, Inc.). The resulting two-later film was preheated at 100° C. for 100 sec, then biaxially oriented to 3×3 at a draw rate of 10% per second in each direction. The optical properties were measured using a BYK-Gardener haze meter and the surface roughness properties were measured using a Wyko interferometer. The PET optical film had a haze value of about 23.9%, Ra of about 428 nm, Rq of about 612 nm, and Da of about 58 mrad.

Example 2

Beads Made of Inorganic Material

Matte PET optical films were produced by coextruding a two-layer optical body that included one rough strippable layer and an optical film consisting of a PET core layer. The rough strippable layer included 44.5 wt % syndiotactic polypropylene (PP 1571 from Atofina, now Total Petrochemicals, Inc), 44.5 wt % of a random copolymer of propylene and ethylene (PP 8650 from Atofina, now Total Petrochemicals, Inc) and 11 wt % of solid glass beads with a mean diameter of 11 microns (Spheriglass A5000 from Potters Industries, Inc.). The resulting two-later film was preheated at 100° C. for 100 sec, then biaxially oriented to 3×3 at a draw rate of 10% per second in each direction. The optical properties were measured using a BYK-Gardener haze meter and the surface roughness properties were measured using a Wyko interferometer. The PET optical film had a haze value of about 14.1%, Ra of about 303 nm, Rq of about 599 nm, and Da of about 48 mrad.

Example 3

Beads Made of Inorganic Material

Matte PET optical films were produced by coextruding a two-layer optical body that included one rough strippable layer and an optical film consisting of a PET core layer. The rough strippable layer included 34 wt % syndiotactic polypropylene (PP 1571 from Atofina, now Total Petrochemicals, Inc), 34 wt % of a random copolymer of propylene and ethylene (PP 8650 from Atofina, now Total Petrochemicals, Inc) and 32 wt % of solid ceramic microspherical beads (Zeeospheres W610 from 3M Co.). The resulting two-layer film was preheated at 100° C. for 100 sec and then biaxially oriented to 3×3 at a draw rate of 10% per second in each direction. The haze value of the PET optical film was about 49.8%, as measured using a BYK-Gardener haze meter.

Example 4

Beads Made of Organic Material

Matte PET optical films were produced by coextruding a two-layer optical body that included one rough strippable layer and an optical film consisting of a PET core layer. The rough strippable layer included about 48.4 wt % syndiotactic polypropylene (PP 1571 from Atofina, now Total Petrochemicals, Inc), about 48.4 wt % of a random copolymer of propylene and ethylene (PP 8650 from Atofina, now Total Petrochemicals, Inc) and about 3.2 wt % of crosslinked polystyrene beads (SBX-6 from Sekisui Plastics Co.). The resulting two-later film was preheated at 100° C. for 100 sec and then biaxially oriented to 3×3 at a draw rate of 10% per second in each direction. The haze value of the PET optical film was about 9.6% as measured using a BYK-Gardener haze meter.

Example 5

Beads Made of Organic Material

Matte PET optical films were produced by coextruding a two-layer optical body that included one rough strippable layer and an optical film consisting of a PET core layer. The rough strippable layer included about 46.25 wt % syndiotactic polypropylene (PP 1571 from Atofina, now Total Petrochemicals, Inc), about 46.25 wt % of a random copolymer of propylene and ethylene (PP 8650 from Atofina, now Total Petrochemicals, Inc) and about 7.5 wt % of crosslinked polystyrene beads (SBX-6 from Sekisui). The resulting two-layer film was preheated at 100° C. for 100 sec and then biaxially oriented to 3×3 at a draw rate of 10% per second in each direction. The haze value of the PET optical film was about 18.1% as measured using a BYK-Gardener haze meter.

4. Prophetic Examples

The invention can be further understood by reference to the following prophetic examples:

Prophetic Example 1

A low melting and low crystallinity polypropylene or polyethylene copolymer loaded with silica particles can be co-extruded as outer rough strippable layers with a multi-layer optical film, such as DBEF, made with PEN higher refractive index layers, coPEN lower refractive index layers, and coPEN under-skin layers, to create an optical body according to the present disclosure. The low melting and low crystallinity polypropylene or polyethylene copolymer and silica rough strippable layers can be subsequently stripped away leaving a surface texture on the coPEN under-skin layers of the optical film.

Prophetic Example 2

An optical body similar to that described in Prophetic Example 1 can be constructed, with the exception that styrene acrylonitrile (SAN) under-skin layers replace the coPEN under-skin layers. The rough strippable layers, thus, can be subsequently stripped away leaving a surface texture on the SAN under-skin layers of the optical film.

Prophetic Example 3

An optical body similar to that described in Prophetic Example 1 can be constructed, with the exception that talc would replace the silica particles blended into the low melting and low crystallinity polypropylene or polyethylene copolymer.

Prophetic Example 4

An optical body similar to that described in Prophetic Example 1 can be constructed, with the exception that the multi-layer optical film is made from PET and coPMMA with PET under-skin layers. The rough strippable skin layers, thus, can be subsequently stripped away leaving a surface texture on the PET under-skin layers of the multi-layer optical film.

Prophetic Example 5

An optical body similar to that described in Prophetic Example 4 can be constructed, with the exception that the multi-layer optical film is made from PET and coPMMA with coPMMA under-skin layers. The rough strippable layers, thus, can be subsequently stripped away leaving a surface texture on the coPMMA under-skin layers of the multi-layer optical film.

Prophetic Example 6

An optical body similar to that described in Prophetic Example 1 can be constructed, with the exception that the multi-layer optical film is made from PEN and PMMA with PEN under-skin layers. The rough strippable layers can be subsequently stripped away leaving a surface texture on the PEN under-skin layers of the multi-layer optical film.

Prophetic Example 7

An optical body similar to that described in Prophetic Example 6 can be constructed, with the exception that the multi-layer optical film is made from PEN and PMMA with PMMA under-skin layers. The rough strippable layers can be subsequently stripped away leaving a surface texture on the PMMA under-skin layers of the multi-layer optical film.

Prophetic Example 8

A single-layer optical film can be co-extruded with one or more rough strippable layers to leave a surface texture on one or more of its surfaces. The textured single-layer optical film can then be laminated to other structures, such as a multi-layer reflector or polarizer, to provide enhanced optical and/or physical properties.

Prophetic Example 9

Optical bodies can be constructed with an additional smooth outer strippable layer, as illustrated. The smooth outer strippable layer can include a material that is also included into the rough strippable layer or layers and can be removed with the rough strippable layer or separately therefrom. The additional smooth outer strippable layer would contain a negligible amount of rough particles, and, thus, could decrease extruder die lip build-up and flow patterns that could otherwise be caused by such particles.

Thus, the present disclosure provides optical bodies including strippable boundary layers and methods for producing such optical bodies that could significantly increase production capacity and decrease labor costs, because at least twice as much product can be stretched concurrently. Converting costs also can be reduced, because each converted piece will yield at least two parts of the film product. The resulting optical body can be left intact during shipment and handling until a customer is ready to use the films. This allows one or more surfaces of the optical film to be protected by the adjacent boundary layer.

Although the present invention has been described with reference to the exemplary embodiments specifically described herein, those of skill in the art will recognize that changes may be made in form and detail without departing from the spirit and scope of the present disclosure.

What is claimed is:

1. A method of processing an optical body, the method comprising:
   providing an optical body comprising at least one strippable boundary layer between a first optical film and a second optical film; and
   stretching the optical body;

wherein in the stretched optical body a surface of the strippable boundary layer disposed adjacent to the first optical film comprises a first plurality of surface structures with a first shape and the adjacent surface of the first optical film comprises a second plurality of asymmetric surface structures substantially corresponding to said first plurality of surface structures, wherein the asymmetrical surface structures have a second shape comprising at least one dimension different from a corresponding dimension of the first shape, and wherein at least one of the first and second optical films comprises a polymeric multilayer optical film.

2. The method of claim 1, wherein the optical body is stretched biaxially.

3. The method of claim 1, wherein the optical body is stretched substantially uniaxially.

4. The method of claim 3, wherein stretching the optical body comprises:
conveying the optical body into a stretching region;
stretching the optical body to increase a transverse dimension of the optical body while conveying the opposing edges of the optical body along generally diverging paths in a machine direction, wherein the generally diverging paths are configured and arranged to provide a machine direction draw ratio (MDDR), a normal direction draw ratio (NDDR) and a transverse direction draw ratio (TDDR) that approach the following relationship:

$$MDDR=NDDR=(TDDR)^{-1/2}$$

during the stretching.

5. The method of claim 4, wherein the diverging paths comprise a curvilinear segment.

6. The method of claim 4, wherein the diverging paths are linear approximations of a curvilinear segment.

7. The method of claim 4, wherein the diverging paths are coplanar.

8. The method of claim 4, wherein the minimum value of the extent of uniaxial character, U, is at least 0.7, wherein U is defined as $$U=(1/MDDR-1)/(TDDR^{1/2}-1).$$

9. The method of claim 4, wherein the optical body is stretched to a draw ratio in excess of four within the stretcher by moving the opposing edge portions along diverging non-linear paths, wherein, during the stretching, the minimum value of the extent of uniaxial character, U, is at least 0.7 over a final portion of the stretching after achieving a TDDR of 2.5 and U is less than 1 at the end of the stretching, wherein U is defined as $$U=(1/MDDR-1)/(TDDR^{1/2}-1)$$

wherein MDDR is the machine direction draw ratio and TDDR is the transverse direction draw ratio as measured between the diverging paths.

10. The method of claim 1, wherein in the stretched optical body at least one of the first and second optical films comprises a reflective polarizer.

11. The method of claim 1, wherein stretching the film comprises stretching the optical body to a draw ratio in excess of four.

12. The method of claim 1, further comprising providing the optical body to the stretcher in a continuous manner from a roll of film.

13. The method of claim 1, further comprising coextruding the optical body in-line with stretching.

14. The method of claim 13, wherein coextruding the optical body comprises multiplication and the at least one boundary layer is added prior to multiplication.

15. The method of claim 1, wherein the stretched film comprises at least one material with indices of refraction in a length direction corresponding to the machine direction and a thickness direction that are substantially the same but substantially different from an index of refraction in a width direction.

* * * * *